United States Patent
Choi et al.

(10) Patent No.: US 12,047,317 B2
(45) Date of Patent: *Jul. 23, 2024

(54) METHOD, DEVICE, AND SYSTEM FOR TRANSMITTING AND RECEIVING REFERENCE SIGNAL AND DATA CHANNEL IN WIRELESS COMMUNICATION SYSTEM

(71) Applicant: WILUS INSTITUTE OF STANDARDS AND TECHNOLOGY INC., Gyeonggi-do (KR)

(72) Inventors: Kyungjun Choi, Gyeonggi-do (KR); Minseok Noh, Seoul (KR); Jinsam Kwak, Gyeonggi-do (KR)

(73) Assignee: WILUS INSTITUTE OF STANDARDS AND TECHNOLOGY INC., Gyeonggi-Do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/693,111

(22) Filed: Mar. 11, 2022

(65) Prior Publication Data

US 2022/0200754 A1    Jun. 23, 2022

Related U.S. Application Data

(63) Continuation of application No. 17/233,766, filed on Apr. 19, 2021, which is a continuation of application
(Continued)

(30) Foreign Application Priority Data

Feb. 3, 2017 (KR) .................. 10-2017-0015865
Sep. 30, 2017 (KR) .................. 10-2017-0128459
Nov. 7, 2017 (KR) .................. 10-2017-0147671

(51) Int. Cl.
    *H04L 5/00*      (2006.01)

(52) U.S. Cl.
CPC .......... *H04L 5/0048* (2013.01); *H04L 5/0007* (2013.01)

(58) Field of Classification Search
CPC ... H04L 5/0048; H04L 5/0007; H04L 5/0044; H04L 1/00; H04L 5/0051; H04L 1/004;
(Continued)

(56) References Cited

U.S. PATENT DOCUMENTS 10,637,701 B2   4/2020   Noh et al.
10,903,957 B2   1/2021   Ko et al.
(Continued)

FOREIGN PATENT DOCUMENTS

CN    103095637    5/2013
CN    103503532    1/2014
(Continued)

OTHER PUBLICATIONS

International Search Report for PCT/KR2018/001523 dated May 8, 2018 and its English translation from WIPO (now published as WO 2018/143756).
(Continued)

*Primary Examiner* — Ajit Patel
*Assistant Examiner* — Wilfred Thomas
(74) *Attorney, Agent, or Firm* — Womble Bond Dickinson (US) LLP

(57) ABSTRACT

Provided is a wireless communication user equipment that wirelessly communicates. The wireless communication user equipment includes a communication module; and a processor configured to control the communication module. The processor is configured to receive a demodulation reference signal (DM-RS) of data channel and receive the data channel based on the DM-RS of the data channel, wherein a time-frequency resource mapped to the DM-RS is predetermined. When the time-frequency resource mapped
(Continued)

to the transmission of the DM-RS of the data channel overlaps with the time-frequency resource mapped to a different purpose from the transmission of the DM-RS, the processor is configured not to receive the DM-RS in a resource element (RE) overlapping with the time-frequency resource mapped to the different purpose in the time-frequency resource mapped to the transmission of the DM-RS. The DM-RS is a reference signal specific to the wireless communication device.

12 Claims, 35 Drawing Sheets

Related U.S. Application Data

No. 16/522,633, filed on Jul. 25, 2019, now Pat. No. 11,012,209, which is a continuation of application No. PCT/KR2018/001523, filed on Feb. 5, 2018.

(58) Field of Classification Search
CPC ...... H04L 5/005; H04W 72/04; H04W 72/12; H04W 72/0446; H04W 72/0453; H04W 72/23

See application file for complete search history.

(56) References Cited

U.S. PATENT DOCUMENTS

| | | | |
|---|---|---|---|
| 2012/0113842 | A1 | 5/2012 | Zhang et al. |
| 2012/0250663 | A1 | 10/2012 | Han et al. |
| 2013/0201975 | A1 | 8/2013 | Chen et al. |
| 2013/0329543 | A1 | 12/2013 | Ogawa et al. |
| 2014/0241150 | A1 | 8/2014 | Ng et al. |
| 2014/0307680 | A1 | 10/2014 | Zhang et al. |
| 2014/0313970 | A1 | 10/2014 | Seo et al. |
| 2015/0180625 | A1 | 6/2015 | Park et al. |
| 2015/0181573 | A1 | 6/2015 | Takeda et al. |
| 2015/0223211 | A1 | 8/2015 | Seo et al. |
| 2015/0230211 | A1 | 8/2015 | You et al. |
| 2015/0245322 | A1 | 8/2015 | Shimezawa et al. |
| 2015/0256312 | A1 | 9/2015 | Yi et al. |
| 2015/0296533 | A1 | 10/2015 | Park |
| 2016/0028518 | A1 | 1/2016 | Zhao et al. |
| 2016/0043849 | A1 | 2/2016 | Lee et al. |
| 2016/0080121 | A1 | 3/2016 | Kim et al. |
| 2016/0119901 | A1 | 4/2016 | Zhang et al. |
| 2016/0127102 | A1 | 5/2016 | Kim et al. |
| 2016/0192385 | A1 | 6/2016 | Tooher et al. |
| 2016/0212752 | A1 | 7/2016 | Xu et al. |
| 2016/0270059 | A1 | 9/2016 | Chen et al. |
| 2016/0302180 | A1 | 10/2016 | Nory et al. |
| 2018/0294859 | A1 | 10/2018 | Niu et al. |
| 2018/0302203 | A1 | 10/2018 | Kim et al. |
| 2018/0316452 | A1 | 11/2018 | Chen et al. |
| 2018/0323923 | A1* | 11/2018 | Wang .................. H04J 11/0073 |
| 2018/0323931 | A1 | 11/2018 | Kiyoshima et al. |
| 2019/0053229 | A1* | 2/2019 | Kim .................. H04W 72/0446 |
| 2019/0124649 | A1 | 4/2019 | Lunttila et al. |
| 2019/0124688 | A1 | 4/2019 | Golitschek Edler von Elbwart et al. |
| 2019/0173646 | A1* | 6/2019 | Wu .................. H04L 25/0224 |
| 2020/0021410 | A1 | 1/2020 | Choi et al. |
| 2020/0092036 | A1 | 3/2020 | Xu |
| 2021/0242993 | A1 | 8/2021 | Choi et al. |

FOREIGN PATENT DOCUMENTS

| | | |
|---|---|---|
| CN | 103581094 | 2/2014 |
| CN | 103875295 | 6/2014 |
| CN | 104009831 | 8/2014 |
| CN | 104054378 | 9/2014 |
| CN | 104412684 | 3/2015 |
| CN | 104981989 | 10/2015 |
| CN | 105391484 | 3/2016 |
| CN | 105553602 | 5/2016 |
| CN | 110268666 | 9/2019 |
| CN | 114745075 | 7/2022 |
| CN | 114745088 | 7/2022 |
| WO | 2014/046516 | 3/2014 |
| WO | 2016/182955 | 11/2016 |
| WO | 2018/143756 | 8/2018 |

OTHER PUBLICATIONS

Written Opinion of the International Searching Authority for PCT/KR2018/001523 dated May 8, 2018 and its English translation by Google Translate (now published as WO 2018/143756).
Qualcomm Incorporated, "Downlink Data Channel Design for Shortened TTI", R1-1611640, 3GPP TSG RAN WG1#87, Reno, Nevada, USA, Nov. 5, 2016. See sections 2.3, 2.4.
International Preliminary Report on Patentability (Chapter I) for PCT/KR2018/001523 dated Aug. 6, 2019 and its English translation from WIPO (published as WO 2018/143756).
Notice of Allowance for U.S. Appl. No. 16/522,633 dated Feb. 18, 2021 (now published as US 2020/0021410).
Office Action for U.S. Appl. No. 16/522,633 dated Sep. 15, 2020 (now published as US 2020/0021410).
Office Action dated Jun. 7, 2023 for U.S. Appl. No. 17/233,766.
Office Action dated May 27, 2022 for Chinese Patent Application No. 201880009423.6 and its English translation provided by Applicant's foreign counsel.
Office Action dated Nov. 25, 2022 for U.S. Appl. No. 17/233,766.
Advisory Action dated Sep. 29, 2023 for U.S. Appl. No. 17/233,766.
Notice of Allowance dated Dec. 12, 2023 for U.S. Appl. No. 17/233,766.
Office Action dated Dec. 15, 2023 for Korean Patent Application No. 10-2019-7021625 and its English translation provided by Applicant's foreign counsel.
LG Electronics: "Handling the Conflict of PSS/SSS and DM-RS in NCT", 3GPP TSG RAN WG1#69, R1-122275, Prague, Czech Republic, May 12, 2012, pp. 1-7.
Samsung: "On QCL for NR", 3GPP TSG RAN WG1 #AH, R1-1700934, Spokane, USA, Jan. 10, 2017, pp. 1-7.
Office Action dated Feb. 7, 2024 for Chinese Patent Application No. 202210242259.1 and its English translation provided by Applicant's foreign counsel.
HTC: "Transmissions of PSS/SSS and DM-RS in Unsynchronised New Carriers", 3GPP TSG RAN WG1 Meeting #69, R1-122320, Prague, Czech Republic, May 12, 2012, pp. 1-4.
Huawei, HiSilicon: "DM-RS patterns for additional carrier types", 3GPP TSG RAN WG1 Meeting #69, R1-122519, Prague, Czech Republic, May 12, 2012, pp. 1-6.
Intel Corporation: "Downlink DM-RS design for Nr", 3GPP TSG RAN WG1 Nr Ad-Hoc meeting, R1-1700352, Spokane, USA, Jan. 10, 2017, pp. 1-5.
Office Action dated Feb. 7, 2024 for Chinese Patent Application No. 202210242262.3 and its English translation provided by Applicant's foreign counsel.
Office Action dated Feb. 8, 2024 for Chinese Patent Application No. 202210242263.8 and its English translation provided by Applicant's foreign counsel.

* cited by examiner

METHOD, DEVICE, AND SYSTEM FOR TRANSMITTING AND RECEIVING REFERENCE SIGNAL AND DATA CHANNEL IN WIRELESS COMMUNICATION SYSTEM

CROSS-REFERENCE TO RELATED APPLICATIONS

This application is a continuation of U.S. patent application Ser. No. 17/233,766 filed on Apr. 19, 2021, which is a continuation of U.S. patent application Ser. No. 16/522,633 filed on Jul. 25, 2019, issued as U.S. Pat. No. 11,012,209 on May 18, 2021, which is a continuation of International Patent Application No. PCT/KR2018/001523 filed on Feb. 5, 2018, which claims the priority to Korean Patent Application No. 10-2017-0015865 filed in the Korean Intellectual Property Office on Feb. 3, 2017, Korean Patent Application No. 10-2017-0128459 filed in the Korean Intellectual Property Office on Sep. 30, 2017, and Korean Patent Application No. 10-2017-0147671 filed in the Korean Intellectual Property Office on Nov. 7, 2017, the entire contents of which are incorporated herein by reference.

TECHNICAL FIELD

The present invention relates to a wireless communication system. More specifically, the present invention relates to a wireless communication method, device, and system for transmitting and receiving a reference signal and a data channel.

BACKGROUND ART

In order to meet the increasing demand for wireless data traffic after the commercialization of 4G communication system, efforts are made to develop an improved 5G communication system. For this reason, the 5G communication system is called a communication system after the 4G network (i.e., Beyond 4G network) or a system after the LTE system (i.e., Post LTE). To achieve a high data transfer rate, the 5G communication system is considered to be implemented in a very high frequency (i.e., mmWave) band (for example, a 60 GHz band).

In order to alleviate the path loss of the radio wave and to increase the transmission distance of the radio wave in the very high frequency band, in the 5G communication system, beamforming, massive MIMO, Full-Dimensional MIMO (FD-MIMO), array antenna, analog beam-forming, and large scale antenna technologies are being discussed. In addition, technologies of an evolved small cell, advanced small cell, cloud radio access network (cloud RAN), ultra-dense network, Device to Device communication (D2D), wireless backhaul, moving networks, cooperative communication, Coordinated Multi-Points (CoMP), and interference cancellation are being developed for network improvement of the 5G communication system. Also, Advanced Coding Modulation (ACM) schemes such as Hybrid FSK and QAM Modulation (FQAM) and Sliding Window Superposition Coding (SWSC) and advanced multiple access schemes such as Filter Bank Multi Carrier (FBMC), non-orthogonal multiple access (NOMA), and sparse code multiple access (SCMA) are being considered in the 5G communication system.

Meanwhile, the Internet for a human-centric connection network where humans generate and consume information has evolved into the Internet of Things (IoT) network, which exchanges information among distributed components such as objects. Internet of Everything (IoE) technology, which combines IoT technology with big data processing technology through connection with cloud servers, is also emerging. In order to implement IoT, technology elements such as sensing technology, wired/wireless communication and network infrastructure, service interface technology, and security technology are required, so that in recent years, technologies such as sensor network, Machine to Machine (M2M), and Machine Type Communication (MTC) have been studied for connection between objects. In the IoT environment, an intelligent Internet Technology (IT) service that collects and analyzes data generated from connected objects may be provided to create new value in human life. Through the fusion and mixture of existing information technology (IT) and various industries, IoT may be applied to fields such as smart home, smart building, smart city, smart car or connected car, smart grid, healthcare, smart home appliance, and advanced medical service.

Accordingly, various attempts have been made to apply the 5G communication system to the IoT network. For example, technologies such as a sensor network, a Machine to Machine (M2M), and a Machine Type Communication (MTC) are implemented by techniques such as beamforming, MIMO, and array antennas. The application of the cloud RAN as the big data processing technology described above is an example of the fusion of 5G technology and IoT technology. Generally, a mobile communication system has been developed to provide voice service while ensuring the user's mobility.

However, the mobile communication system is gradually expanding not only the voice but also the data service, and now it has developed to the extent of providing high-speed data service. However, a more advanced mobile communication system is required due to a phenomenon of resource shortage and a demand of high-speed services in the currently deployed mobile communication system.

DISCLOSURE

Technical Problem

It is an object of the present invention to provide a method and device for efficiently transmitting a signal in a wireless communication system, in particular, a cellular wireless communication system. In addition, it is an object of the present invention to provide a method, device, and system for transmitting and receiving a reference signal and a data channel.

The technical object of the present invention is not limited to the above technical objects, and other technical problems that are not mentioned will be apparent to those skilled in the art from the following description.

Technical Solution

A wireless communication system according to an embodiment of the present invention includes a communication module; and a processor configured to control the communication module. When a time-frequency resource mapped to a demodulation-reference signal (DM-RS) of a data channel does not overlap with a time-frequency resource mapped to a different purpose from a transmission of the DM-RS, the processor is configured to receive the DM-RS in the time-frequency resource mapped to the transmission of the DM-RS and receive the data channel based on the DM-RS. In addition, when the time-frequency resource mapped to the transmission of the DM-RS of the data channel overlaps with the time-frequency resource mapped to the different purpose from the transmission of the DM-RS, the processor is configured not to expect the reception of the DM-RS in a resource element (RE) overlapping with the time-frequency resource mapped to the different purpose in the time-frequency resource mapped to the transmission of the DM-RS. In this case, the DM-RS is a reference signal specific to the wireless communication device.

When the time-frequency resource mapped to the transmission of the DM-RS of the data channel overlaps with the time-frequency resource mapped to the different purpose from the transmission of the DM-RS, the processor may be not to receive the DM-RS in an RE corresponding to the same orthogonal frequency divisional multiplexing (OFDM) symbol index as an OFDM symbol index of an RE overlapping with the time-frequency resource mapped to the different purpose in the time-frequency resource mapped to the transmission of the DM-RS.

When the time-frequency resource mapped to the transmission of the DM-RS of the data channel overlaps with the time-frequency resource mapped to the different purpose from the transmission of the DM-RS, the processor may be configured to monitor a punctured DM-RS in a resource located behind the time-frequency resource mapped to the different purpose. In this case, the punctured DM-RS may be a DM-RS that is not transmitted due to the time-frequency resource mapped to the different purpose.

When the time-frequency resource mapped to the transmission of the DM-RS of the data channel overlaps with the time-frequency resource mapped to the different purpose from the transmission of the DM-RS, the processor may be configured to monitor the punctured DM-RS in an OFDM symbol located immediately after the time-frequency resource mapped to the different purpose.

The DM-RS may be a first DM-RS of the data channel.

When the time-frequency resource mapped to the transmission of the DM-RS of the data channel overlaps with the time-frequency resource mapped to the different purpose from the transmission of the DM-RS, the processor may be configured to determine whether to monitor the punctured DM-RS in a resource transmitted after transmission of the time-frequency resource mapped to the different purpose based on whether an additional DM-RS of the data channel is present.

When the time-frequency resource mapped to the transmission of the DM-RS of the data channel overlaps with the time-frequency resource mapped to the different purpose from the transmission of the DM-RS, the processor may determine whether to monitor the punctured DM-RS in a resource transmitted after transmission of the time-frequency resource mapped to the different purpose based on whether a signal quasi-co-located with a port of the DM-RS is present.

The processor may be configured to determine that a DM-RS overlap signal which is transmitted through the time-frequency resource mapped to the different purpose is quasi-co-located with the port of the DM-RS, and receive the data channel based on the DM-RS overlap signal.

The processor may be configured to estimate a state of a channel through which the data channel is transmitted based on the DM-RS overlap signal, and demodulate the data channel based on the state of the channel.

The processor may be configured to estimate at least one of a delay spread, a Doppler spread, a Doppler shift, an average gain, and an average delay of a channel through which the data channel is transmitted, based on the DM-RS overlap signal.

The time-frequency resource mapped to the different purpose may be a resource emptied without transmission.

The time-frequency resource mapped to the different purpose may be a synchronization signal/physical broadcast (SS/PBCH) block. In this case, the SS/PBCH block may include a synchronization signal and information on the wireless communication system.

The data channel may be a physical downlink shared channel (PDSCH).

The data channel may be a physical uplink shared channel (PUSCH).

An operation method of a user equipment of a wireless communication system according to an embodiment of the present invention includes when the time-frequency resource mapped to a demodulation-reference signal (DM-RS) of a data channel does not overlap with a time-frequency resource mapped to a different purpose from the transmission of the DM-RS, receiving the DM-RS in the time-frequency resource mapped to the transmission of the DM-RS and receiving the data channel based on the DM-RS, and when the time-frequency resource mapped to the transmission of the DM-RS of the data channel overlaps with the time-frequency resource mapped to the different purpose from the transmission of the DM-RS, not expecting the reception of the DM-RS in a resource element (RE) overlapping with a time-frequency resource mapped to the different purpose in the time-frequency resource mapped to the transmission of the DM-RS. In this case, the DM-RS is a reference signal specific to the wireless communication device.

The not expecting the reception of the DM-RS may include, when the time-frequency resource mapped to the transmission of the DM-RS of the data channel overlaps with the time-frequency resource mapped to the different purpose from the transmission of the DM-RS, not expecting to receive the DM-RS in an RE corresponding to the same orthogonal frequency divisional multiplexing (OFDM) symbol index as an OFDM symbol index of an RE overlapping with the time-frequency resource mapped to the different purpose in the time-frequency resources mapped to the transmission of the DM-RS.

The not expecting the reception of the DM-RS may further include monitoring a punctured DM-RS in a resource located after the time-frequency resource mapped to the different purpose. In this case, the punctured DM-RS may be a DM-RS that is not transmitted due to the time-frequency resource mapped to the different purpose.

The monitoring the punctured DM-RS may include monitoring the punctured DM-RS in an OFDM symbol located immediately after the time-frequency resource mapped to the different purpose.

The DM-RS may be a first DM-RS of the data channel.

The monitoring the punctured DM-RS may include determining whether to monitor the punctured DM-RS in a resource transmitted after transmission of the time-frequency resource mapped to the different purpose based on whether an additional DM-RS of the data channel is present.

Advantageous Effects

A wireless communication system according to an embodiment of the present invention, in particular, a cellular wireless communication system provides a method and device for efficiently transmitting signals. In addition, a wireless communication system according to an embodiment of the present invention provides a wireless communication method using transmitting and receiving a reference signal and a data channel, and a device therefor.

Effects obtainable from various embodiments of the present disclosure are not limited to the above-mentioned effects, and other effects not mentioned above may be clearly derived and understood to those skilled in the art from the following description.

MODE FOR CARRYING OUT THE INVENTION

Figure 1:
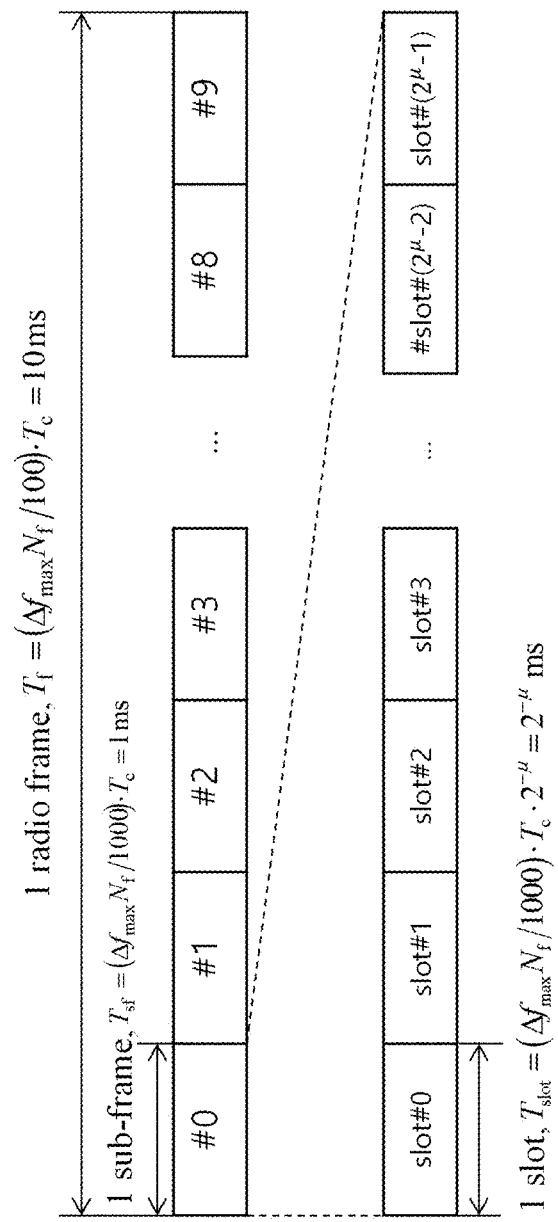
FIG. 1 shows an example of a radio frame structure used in a wireless communication system.

Terms used in this specification may be currently widely used general terms in consideration of functions in the present invention but may vary according to the intents of those skilled in the art, customs, or the advent of new technology. Additionally, in certain cases, there may be terms the applicant selects arbitrarily and in this case, their meanings are described in a corresponding description part of the present invention. Accordingly, terms used in this specification should be interpreted based on the substantial meanings of the terms and contents over the whole specification.

Throughout the specification, when a portion is referred to as being "connected" to another portion, it includes not only "directly connected" but also "electrically connected" with another element therebetween. Furthermore, when it is described that one comprises (or includes or has) some elements, it should be understood that it may comprise (or include or has) only those elements, or it may comprise (or include or have) other elements as well as those elements if there is no specific limitation. In addition, the limitations of "more than or equal to" or "less than or equal to" based on a certain threshold value may be appropriately replaced with "more than" or "less than", respectively.

The following techniques may be used in various wireless access systems such as code division multiple access (CDMA), frequency division multiple access (FDMA), time division multiple access (TDMA), orthogonal frequency division multiple access (OFDMA), single carrier frequency division multiple access (SC-FDMA), and the like. CDMA may be implemented in radio technology such as Universal Terrestrial Radio Access (UTRA) or CDMA2000. TDMA may be implemented in a radio technology such as Global System for Mobile communications (GSM)/General Packet Radio Service (GPRS)/Enhanced Data Rates for GSM Evolution (EDGE). OFDMA may be implemented with radio technology such as IEEE 802.11 (Wi-Fi), IEEE 802.16 (WiMAX), IEEE 802-20, and Evolved UTRA (E-UTRA). UTRA is part of the Universal Mobile Telecommunications System (UMTS). 3rd Generation Partnership Project (3GPP) Long term evolution (LTE) is part of Evolved UMTS (E-UMTS) using E-UTRA and LTE-Advanced (A) is an evolved version of 3GPP LTE. 3GPP New Radio (NR) is a system designed separately from LTE/LTE-A, and is a system for supporting enhanced Mobile Broadband (eMBB), Ultra-Reliable and Low Latency Communication (URLLC), and massive Machine Type Communication (mMTC) services, which are requirements of IMT-2020. For the clear description, 3GPP NR is mainly described, but the technical idea of the present invention is not limited thereto.

Unless otherwise specified in this specification, a base station may refer to a next generation node B (gNB) as defined in 3GPP NR. Furthermore, unless otherwise specified, a terminal may refer to a user equipment (UE).

This application claims priority to Korean Patent Application Nos. 10-2017-0015865 (2017 Feb. 3), 10-2017-0128459 (2017 Sep. 30), and 10-2017-0147671 (2017 Nov. 7) and the embodiments and descriptions described in each of the above applications which are the basis of priority are to be included in the detailed description of the present application.

FIG. 1 shows an example of a radio frame structure used in a wireless communication system.

Referring to FIG. 1, the radio frame used in the 3GPP NR system may have a length of 10 ms ($\Delta f_{max} N_f/100)*T_c$). In addition, the radio frame includes 10 equal sized subframes (SF). Herein, $\Delta f_{max}=480*10^3$ Hz, $N_f=4096$, $T_c=1/(\Delta f_{ref} * N_{f,ref})$, $\Delta f_{ref}=15*10^3$ Hz, and $N_{f,ref}=2048$. Numbers from 0 to 9 may be respectively allocated to 10 subframes within one radio frame. Each subframe has a length of 1 ms and may include one or more slots according to a subcarrier spacing. More specifically, in the 3GPP NR system, the subcarrier spacing that may be used is $15*2^\mu$ kHz, and $\mu$ can have a value of $\mu$=0, 1, 2, 3, 4 as subcarrier spacing configuration. That is, 15 kHz, 30 kHz, 60 kHz, 120 kHz and 240 kHz may be used for subcarrier spacing. One subframe having a length of 1 ms may include $2^\mu$ slots. At this time, the length of each slot is $2^{-\mu}$ ms. Numbers from 0 to $2^{\mu-1}$ may be respectively allocated to $2\mu$ slots within one subframe. In addition, numbers from 0 to $10*2^{\mu-1}$ may be respectively allocated to slots within one subframe. The time resource may be distinguished by at least one of a radio frame number (also referred to as a radio frame index), a subframe number (also referred to as a subframe number), and a slot number (or a slot index).

Figure 2:
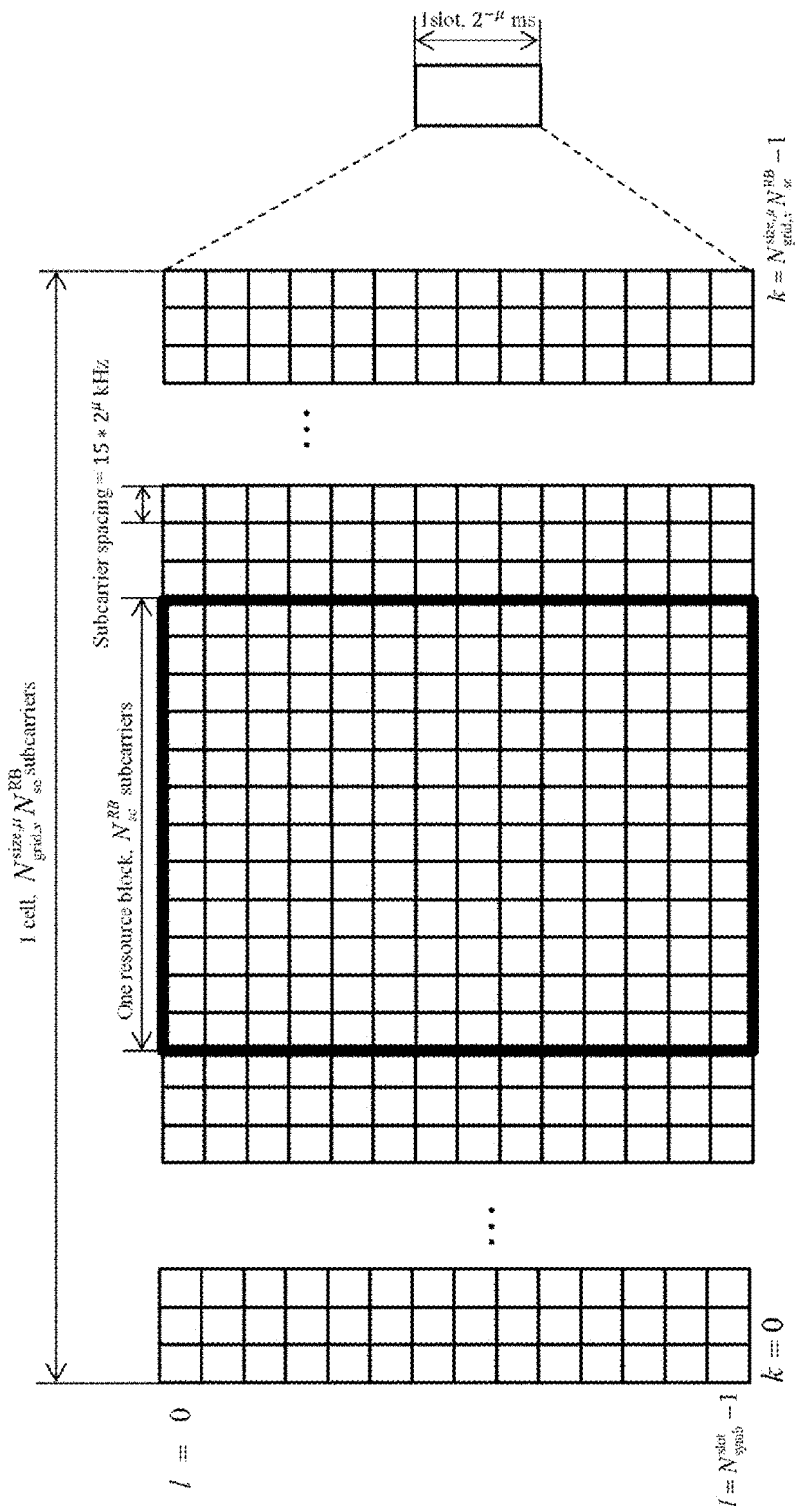
FIG. 2 shows an example of a downlink (DL)/uplink (UL) slot structure in a wireless communication system.

FIG. 2 shows an example of a downlink (DL)/uplink (UL) slot structure in a wireless communication system. In particular, FIG. 2 shows the structure of the resource grid of the 3GPP NR system.

There is one resource grid per antenna port. Referring to FIG. 2, a slot includes a plurality of OFDM symbols in a time domain and includes a plurality of resource blocks (RBs) in a frequency domain. An OFDM symbol also means one symbol duration. Referring to FIG. 2, a signal transmitted in each slot may be represented by a resource grid consisting of $N^{size, \mu}_{grid, x} * N^{RB}_{sc}$ subcarriers, and $N^{slot}_{symb}$ OFDM symbols. Here, x=DL for the downlink resource grid, and x=UL for the uplink resource grid. $N^{size, \mu}_{grid, x}$ denotes the number of resource blocks (downlink or uplink according to x) according to a subcarrier spacing configuration $\mu$, and $N^{slot}_{symb}$ denotes the number of OFDM symbols in a slot. $N^{RB}_{sc}$ is the number of subcarriers constituting one RB and $N^{RB}_{sc}=12$. An OFDM symbol may be referred to as a cyclic shift OFDM (CP-OFDM) symbol or a discrete Fourier transform spreading OFDM (DFT-s-OFDM) symbol according to a multiple access scheme. The number of OFDM symbols included in one slot may vary according to the length of a cyclic prefix (CP). For example, in the case of a normal CP, one slot includes 14 OFDM symbols, but in the case of an extended CP, one slot may include 12 OFDM symbols. In a specific embodiment, the extended CP may only be used at 60 kHz subcarrier spacing. In FIG. 2, for convenience of description, one slot includes 14 OFDM symbols by way of example, but embodiments of the present invention may be applied in a similar manner to a slot having a different number of OFDM symbols. Referring to FIG. 2, each OFDM symbol includes $N^{size, \mu}_{grid, x} * N^{RB}_{sc}$ subcarriers in the frequency domain. The type of subcarrier may be divided into a data subcarrier for data transmission, a reference signal subcarrier for transmission of a reference signal, and a guard band. The carrier frequency is also referred to as the center frequency (fc).

An RB may be defined by $N^{slot}_{symb}$ (e. g., 14) consecutive OFDM symbols in the time domain and may be defined by $N^{RB}_{sc}$ (e. g., 12) consecutive subcarriers in the frequency domain. As a reference, a resource including one OFDM symbol and one subcarrier may be referred to as a resource element (RE) or a tone. Therefore, one RB may include $N^{slot}_{symb} * N^{RB}_{sc}$ resource elements. Each resource element in the resource grid may be uniquely defined by a pair of indexes (k, l) in one slot. k may be an index numbered from 0 to $N^{size, \mu}_{grid, x} * N^{RB}_{sc} - 1$ in the frequency domain, and I may be an index numbered from 0 to $N^{slot}_{symb} - 1$ in the time domain.

On the other hand, one RB may be mapped to one physical resource block (PRB) and one virtual resource block (VRB). The PRB may be defined by $N^{slot}_{symb}$ (e. g., 14) consecutive OFDM symbols in the time domain. Further, the PRB may be defined by $N^{RB}_{sc}$ (e. g., 12) consecutive subcarriers in the frequency domain. Therefore, one PRB may include $N^{RB}_{sc} * N^{slot}_{symb}$ resource elements.

In order for the user equipment to receive a signal from the base station or to transmit a signal to the base station, the time/frequency synchronization of the user equipment may be synchronized with the time/frequency synchronization of the base station. This is because the base station and the user equipment need to be synchronized, so that user equipment can determine the time and frequency parameters required for demodulating the DL signal and transmitting the UL signal at the correct time.

Each symbol of a radio frame operating in a time division duplex (TDD) or an unpaired spectrum may be configured as at least one of a DL symbol, an UL symbol, and a flexible symbol. A radio frame operating in a DL carrier in a frequency division duplex (FDD) or a paired spectrum may be configured with a DL symbol or a flexible symbol. A radio frame operating in an UL carrier may be configured with an UL symbol or a flexible symbol. In the DL symbol, DL transmission is possible, but UL transmission is impossible. In the UL symbol, UL transmission is possible, but DL transmission is impossible. The flexible symbol may be determined to be used as a DL or an UL according to another signal. Information on the type of each symbol, i. e., DL symbols, UL symbols, and flexible symbols, may be configured with a cell-specific or common radio resource connection (RRC) signal. In addition, information on the type of each symbol may additionally be configured with a UE-specific or dedicated RRC signal. The base station uses the cell common RRC signal to signal period of the cell common slot configuration, the number of slots having DL symbols only from the beginning of the period of the cell common slot configuration, the number of DL symbols from the first symbol of the next slot immediately after the DL having DL symbols only, the number of slots having UL symbols only from the end of the period of the cell common slot configuration, and the number of UL symbols from the last slot of the immediately preceding slot having UL symbols only. Here, symbols not configured with a UL symbol and a DL symbol are flexible symbols. When information on a symbol type is configured with a UE-specific RRC signal, the base station may signal whether the flexible symbol is a DL symbol or an UL symbol in a cell common RRC signal. In this case, the UE-specific RRC signal can not override DL symbol or UL symbol configured with the cell common RRC signal into another symbol type. The UE-specific RRC signal can signal the number of DL symbols among the $N^{slot}_{symb}$ symbols of the corresponding slot for each slot, and the number of UL symbols among the $N^{slot}_{symb}$ symbols of the slot. In this case, the DL symbol of the slot may be consecutively configured from the first symbol of the slot. In addition, UL symbols of the slots may be consecutively configured from the last symbol of the slot. In this case, symbols not configured with a UL symbol and a DL symbol in a slot are flexible symbols. The type of symbol configured with the above RRC signal may be referred to as a semi-static DL/UL configuration. A flexible symbol of a semi-static DL/UL configuration configured with the RRC signal may be indicated by a DL symbol, a UL symbol, or a flexible symbol as dynamic slot format information (SFI). In this case, the DL symbol or UL symbol configured with the RRC signal is not overridden to another symbol type. Table 1 will illustrate the dynamic SFI that the base station can indicate to the user equipment. In Table 1, D denotes a DL symbol, U denotes a UL symbol, and X denotes a flexible symbol. As shown in Table 1, up to two DL/UL switching in one slot may be allowed.

TABLE 1

| | Symbol number in a slot | | | | | | | | | | | | | |
|---|---|---|---|---|---|---|---|---|---|---|---|---|---|---|
| index | 0 | 1 | 2 | 3 | 4 | 5 | 6 | 7 | 8 | 9 | 10 | 11 | 12 | 13 |
| 0 | D | D | D | D | D | D | D | D | D | D | D | D | D | D |
| 1 | U | U | U | U | U | U | U | U | U | U | U | U | U | U |
| 2 | X | X | X | X | X | X | X | X | X | X | X | X | X | X |
| 3 | D | D | D | D | D | D | D | D | D | D | D | D | D | X |
| 4 | D | D | D | D | D | D | D | D | D | D | D | D | X | X |
| 5 | D | D | D | D | D | D | D | D | D | D | D | X | X | X |
| 6 | D | D | D | D | D | D | D | D | D | D | X | X | X | X |
| 7 | D | D | D | D | D | D | D | D | D | X | X | X | X | X |
| 8 | X | X | X | X | X | X | X | X | X | X | X | X | X | U |
| 9 | X | X | X | X | X | X | X | X | X | X | X | X | U | U |
| 10 | X | U | U | U | U | U | U | U | U | U | U | U | U | U |
| 11 | X | X | U | U | U | U | U | U | U | U | U | U | U | U |
| 12 | X | X | X | U | U | U | U | U | U | U | U | U | U | U |
| 13 | X | X | X | X | U | U | U | U | U | U | U | U | U | U |
| 14 | X | X | X | X | X | U | U | U | U | U | U | U | U | U |
| 15 | X | X | X | X | X | X | U | U | U | U | U | U | U | U |
| 16 | D | X | X | X | X | X | X | X | X | X | X | X | X | X |
| 17 | D | D | X | X | X | X | X | X | X | X | X | X | X | X |
| 18 | D | D | D | X | X | X | X | X | X | X | X | X | X | X |
| 19 | D | X | X | X | X | X | X | X | X | X | X | X | X | U |
| 20 | D | D | X | X | X | X | X | X | X | X | X | X | X | U |
| 21 | D | D | D | X | X | X | X | X | X | X | X | X | X | U |
| 22 | D | X | X | X | X | X | X | X | X | X | X | X | U | U |
| 23 | D | D | X | X | X | X | X | X | X | X | X | X | U | U |
| 24 | D | D | D | X | X | X | X | X | X | X | X | X | U | U |
| 25 | D | X | X | X | X | X | X | X | X | X | X | U | U | U |
| 26 | D | D | X | X | X | X | X | X | X | X | X | U | U | U |
| 27 | D | D | D | X | X | X | X | X | X | X | X | U | U | U |
| 28 | D | D | D | D | D | D | D | D | D | D | D | D | X | U |
| 29 | D | D | D | D | D | D | D | D | D | D | D | X | X | U |
| 30 | D | D | D | D | D | D | D | D | D | D | X | X | X | U |
| 31 | D | D | D | D | D | D | D | D | D | D | D | X | U | U |
| 32 | D | D | D | D | D | D | D | D | D | D | X | X | U | U |
| 33 | D | D | D | D | D | D | D | D | D | X | X | X | U | U |
| 34 | D | X | U | U | U | U | U | U | U | U | U | U | U | U |
| 35 | D | D | X | U | U | U | U | U | U | U | U | U | U | U |
| 36 | D | D | D | X | U | U | U | U | U | U | U | U | U | U |
| 37 | D | X | X | U | U | U | U | U | U | U | U | U | U | U |
| 38 | D | D | X | X | U | U | U | U | U | U | U | U | U | U |
| 39 | D | D | D | X | U | U | U | U | U | U | U | U | U | U |
| 40 | D | X | X | X | U | U | U | U | U | U | U | U | U | U |
| 41 | D | D | X | X | X | U | U | U | U | U | U | U | U | U |
| 42 | D | D | D | X | X | U | U | U | U | U | U | U | U | U |
| 43 | D | D | D | D | D | D | D | X | X | X | X | X | X | U |
| 44 | D | D | D | D | D | X | X | X | X | X | X | X | U | U |
| 45 | D | D | D | D | D | X | U | U | U | U | U | U | U | U |
| 46 | D | D | D | D | D | X | U | D | D | D | D | D | X | U |

TABLE 1-continued

| | Symbol number in a slot | | | | | | | | | | | | | |
|---|---|---|---|---|---|---|---|---|---|---|---|---|---|---|
| index | 0 | 1 | 2 | 3 | 4 | 5 | 6 | 7 | 8 | 9 | 10 | 11 | 12 | 13 |
| 47 | D | D | X | U | U | U | U | D | D | X | U | U | U | U |
| 48 | D | X | U | U | U | U | U | D | X | U | U | U | U | U |
| 49 | D | D | D | D | X | X | U | D | D | D | D | X | X | U |
| 50 | D | D | X | X | U | U | U | D | D | X | X | U | U | U |
| 51 | D | X | X | U | U | U | U | D | X | X | U | U | U | U |
| 52 | D | X | X | X | X | U | D | X | X | X | X | X | X | U |
| 53 | D | D | X | X | X | X | U | D | D | X | X | X | X | U |
| 54 | X | X | X | X | X | X | X | D | D | D | D | D | D | D |
| 55 | D | D | X | X | X | U | U | U | D | D | D | D | D | D |
| 56~255 | Reserved | | | | | | | | | | | | | |

Figure 3:
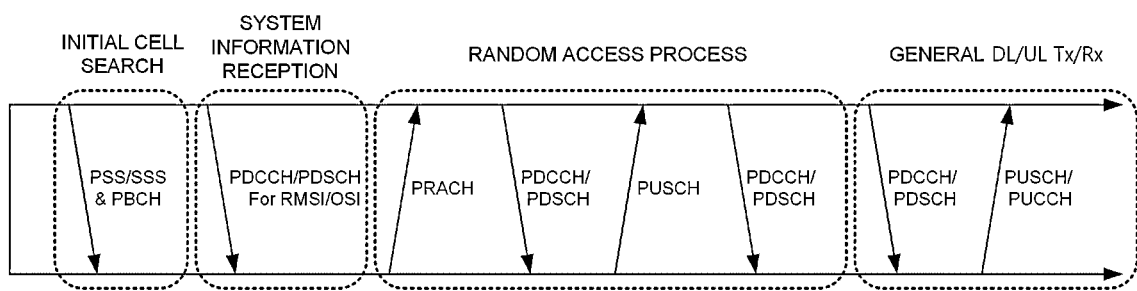
FIG. 3 is a diagram for explaining a physical channel used in a 3GPP system and a general signal transmission method using the physical channel.

FIG. 3 is a diagram for explaining a physical channel used in a 3GPP system and a general signal transmission method using the physical channel. When the power of the user equipment is turned on or the user equipment enters a new cell, the user equipment performs an initial cell search (S301). Specifically, the user equipment may synchronize with the BS in the initial cell search. For this, the user equipment may receive a Primary Synchronization Signal (PSS) and a Secondary Synchronization Signal (SSS) from a base station, synchronize with the base station, and obtain information such as a cell ID. Thereafter, the user equipment may receive the physical broadcast channel from the base station and obtain the in-cell broadcast information. Upon completion of the initial cell search, the user equipment receives a Physical Downlink Control Channel (PDSCH) according to the Physical Downlink Control Channel (PDCCH) and information in the PDCCH, so that the user equipment can obtain more specific system information than the system information obtained through the initial cell search (S302). When the user equipment initially accesses the base station or does not have radio resources for signal transmission, the user equipment may perform a random access procedure on the base station (steps S303 to S306). For this, the user equipment may transmit a specific sequence as a preamble through a Physical Random Access Channel (PRACH) (S303 and S305) and receive a response message for the preamble on the PDCCH and the corresponding PDSCH from the base station (S304 and S306). In case of the contention-based RACH, a contention resolution procedure may be additionally performed. After the above-described procedure, the user equipment receives PDCCH/PDSCH (S307) and transmits a Physical Uplink Shared Channel (PUSCH)/Physical Uplink Control Channel (PUCCH) (S308) as a general phase/DL signal transmission procedure. In particular, the user equipment may receive DL Control Information (DCI) through the PDCCH. The DCI may include control information such as resource allocation information for the user equipment. Also, the format of the DCI may vary depending on the intended use of the DCI. The control information that the user equipment transmits to or receives from the base station through the UL includes a DL/UL ACK/NACK signal, a Channel Quality Indicator (CQI), a Precoding Matrix Index (PMI), a Rank Indicator (RI). In the 3GPP NR system, the user equipment may transmit control information such as HARQ-ACK and CSI described above through the PUSCH and/or PUCCH.

Figure 4:
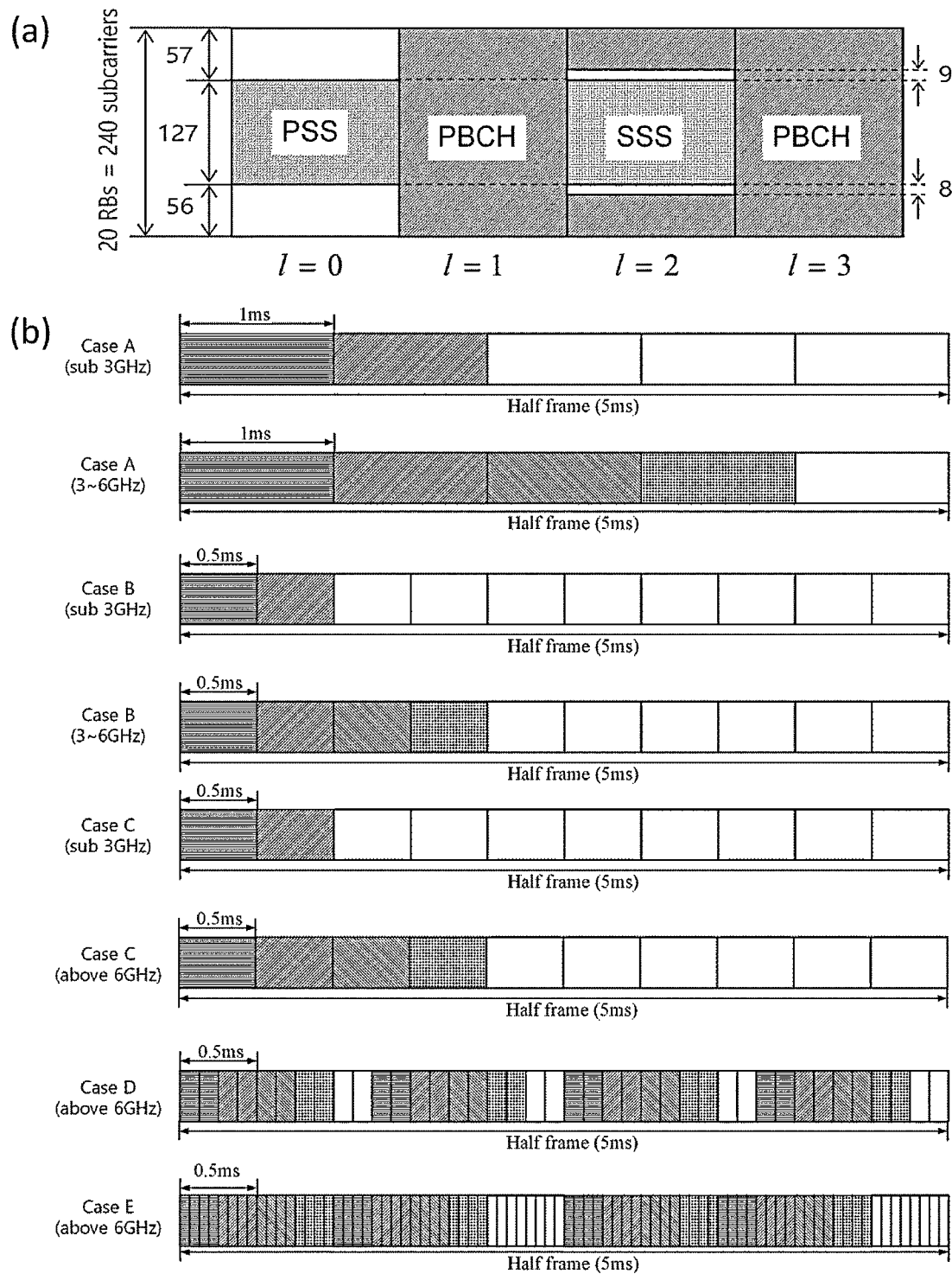
FIG. 4 shows an SS/PBCH block for initial cell access.

FIG. 4 shows an SS/PBCH block for initial cell access.

When the user equipment turns on the power and tries to access a new cell, the user equipment may obtain time and frequency synchronization with the cell and perform an initial cell search procedure. The user equipment can detect the physical cell identity NcellID of the cell in the initial cell search procedure. For this, the user equipment may receive a synchronization signal, for example, a primary synchronization signal (PSS) and a secondary synchronization signal (SSS), from a base station, and synchronize with the base station. In this case, the user equipment may obtain information such as a cell identity (ID). Referring to FIG. 4(a), a synchronization signal will be described in more detail. The synchronization signal may be divided into PSS and SSS. The PSS may be used to obtain time domain synchronization and/or frequency domain synchronization, such as OFDM symbol synchronization and slot synchronization. The SSS may be used to obtain frame synchronization and cell group ID. Referring to FIG. 4(a) and Table 2, the SS/PBCH block includes 20 RBs (=240 subcarriers) as the frequency axis, and is includes 4 OFDM symbols as the time axis. Here, in the SS/PBCH block, PSS is the first OFDM symbol and SSS in the third OFDM symbol are transmitted in 56, 57, . . . , 182 subcarriers. Here, the lowest subcarrier index of the SS/PBCH block is numbered from 0. In the first OFDM symbol in which the PSS is transmitted, the base station does not transmit a signal in the remaining subcarriers, that is, 0, 1, . . . , 55, 183, 184, . . . , 239 subcarriers. In the third OFDM symbol in which the SSS is transmitted, the base station does not transmit a signal in 48, 49, . . . , 55, 183, 184, . . . , 191 subcarriers. In the SS/PBCH block, the base station transmits the PBCH signal to the remaining RE except the above signal.

TABLE 2

| Channel or signal | OFDM symbol number/relative to the start of an SS/PBCH block | Subcarrier number k relative to the start of an SS/PBCH block |
|---|---|---|
| PSS | 0 | 56, 57, . . . , 182 |
| SSS | 2 | 56, 57, . . . , 182 |
| Set to 0 | 0 | 0, 1, . . . , 55, 183, 184, . . . , 239 |
| | 2 | 48, 49, . . . , 55, 183, 184, . . . , 191 |
| PBCH | 1, 3 | 0, 1, . . . , 239 |
| | 2 | 0, 1, . . . , 47, 192, 193, . . . , 239 |
| DM-RS for PBCH | 1, 3 | 0 + v, 4 + v, 8 + v, . . . , 236 + v |
| | 2 | 0 + v, 4 + v, 8 + v, . . . , 44 + v 192 + v, 196 + v, . . . , 236 + v |

The SS may represent a total of 1008 unique physical layer cell IDs through a combination of 3 PSSs and 336 SSs. Specifically, the physical layer cell ID is grouped into 336 physical-layer cell-identifier groups, where each group includes 3 unique identifiers such that each physical-layer cell ID is part of only one physical-layer cell-identifier group. Therefore, the physical layer cell identifier NcellID=3N(1)ID+N(2)ID may be defined by a number N(1)ID ranging from 0 to 335 indicating a physical-layer cell-identifier group and a number N(2)ID ranging from 0 to 2 indicating a physical-layer identifier in the physical-layer cell-identifier group. The user equipment may detect the PSS and identify one of the three unique physical-layer identifiers. In addition, the user equipment may detect the SSS and identify one of the 336 physical layer cell IDs associated with the physical-layer identifier. The PSS signal is as follows.

$$d_{PSS}(n) = 1 - 2x(m)$$

$$m = (n + 43N_{ID}^{(2)}) \bmod 127$$

$$0 \le n < 127$$

Here, $x(i+7)=(x(i+4)+x(i)) \bmod 2$
$[x(6)\ x(5)\ x(4)\ x(3)\ x(2)\ x(1)\ x(0)]=[1\ 1\ 1\ 0\ 1\ 1\ 0]$ is given.
SSS is as follows.

$$d_{SSS}(n) = [1 - 2x_0((n + m_0) \bmod 127)][1 - 2x_1((n + m_1) \bmod 127)]$$

$$m_0 = 15\left\lfloor\frac{N_{ID}^{(1)}}{112}\right\rfloor + 5N_{ID}^{(2)}$$

$$m_1 = N_{ID}^{(1)} \bmod 112$$

$$0 \le n < 127$$

$$x_0(i+7) = (x_0(i+4) + x_0(i)) \bmod 2$$

Here, $x_1(i+7)=(x_1(i+1)+x_1(i)) \bmod 2$
$[x_1(6)\ x_1(5)\ x_1(4)\ x_1(3)\ x_1(2)\ x_1(0)]=[0\ 0\ 0\ 0\ 0\ 1]$ is given.

A radio frame with a 10 ms duration may be divided into two half frames with a duration of 5 ms. Referring to FIG. 4(b), a description will be made of a slot in which SS/PBCH blocks are transmitted in each half frame. A slot in which the SS/PBCH block is transmitted may be any one of the cases A, B, C, D, and E. In the case A, the subcarrier spacing is 15 kHz and the starting time point of the SS/PBCH block is {2, 8}+14*n symbols. In this case, n=0, 1 at a carrier frequency of 3 GHz or less. At frequencies below 6 GHz above 3 GHz, n=0, 1, 2, or 3. In the case B, the subcarrier spacing is 30 kHz and the starting time point of the SS/PBCH block is {4, 8, 16, 20}+28*n. In this case, n=0, 1 at a carrier frequency of 3 GHz or less. At frequencies below 6 GHz above 3 GHz, n=0 or 1. In the case C, the subcarrier spacing is 30 kHz and the starting time point of the SS/PBCH block is {2, 8}+14*n. In this case, n=0 or 1 at a carrier frequency of 3 GHz or less. At frequencies below 6 GHz above 3 GHz, n=0, 1, 2, or 3. In the case D, the subcarrier spacing is 120 kHz and the starting time point of the SS/PBCH block is {4, 8, 16, 20}+28*n. In this case, at a carrier frequency of 6 GHz or more, n=0, 1, 2, 3, 5, 6, 7, 8, 10, 11, 12, 13, 15, 16, 17, or 18. In the case E, the subcarrier spacing is 240 kHz and the starting time point of the SS/PBCH block is {8, 12, 16, 20, 32, 36, 40, 44}+56*n. In this case, at a carrier frequency of 6 GHz or more, n=0, 1, 2, 3, 5, 6, 7, or 8.

Figure 5:
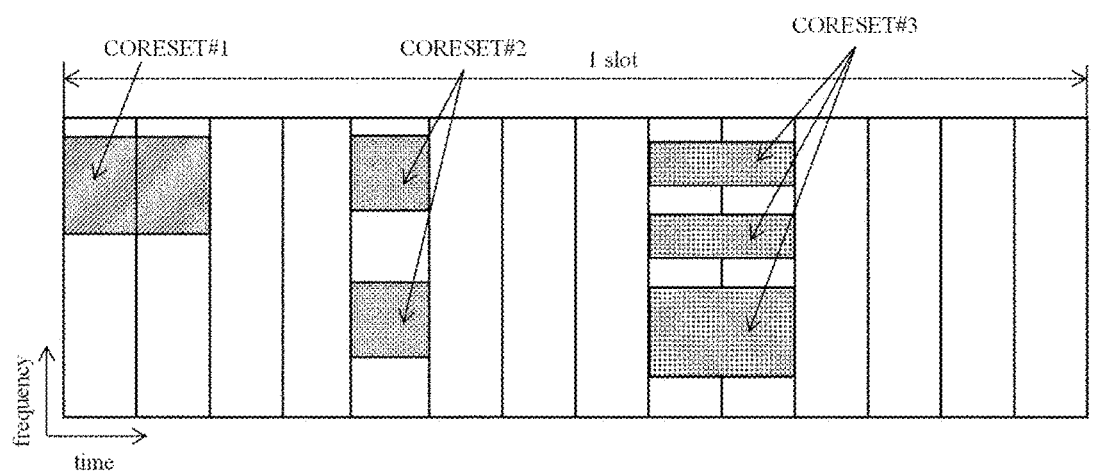
FIG. 5 is a diagram illustrating a control resource set (CORESET) in which a physical downlink control channel (PDCCH) in a 3GPP NR system can be transmitted.

FIG. 5 is a diagram illustrating a control resource set (CORESET) in which a physical downlink control channel (PDCCH) in a 3GPP NR system may be transmitted.

CORESET is a time-frequency resource in which PDCCH, that is, a user equipment control signal, is transmitted. Referring to FIG. 5, the user equipment may decode the PDCCH mapped in the CORESET by receiving only time-frequency resources defined by CORESET, instead of attempting to decode the PDCCH by receiving all the frequency bands. The base station may configure one or more CORESETs for each cell to the user equipment.

CORESET may be configured with up to three consecutive symbols on the time axis. In addition, CORESET may be configured continuously or discontinuously in 6 PRBs units on the frequency axis. In the embodiment of FIG. 5, CORESET #1 is configured with consecutive PRBs, and CORESET #2 and CORESET #3 are configured with discontinuous PRBs. CORESET may be located in any symbol in the slot. For example, CORESET #1 in FIG. 5 starts at the first symbol of the slot, CORESET #2 starts at the fifth symbol of the slot, and CORESET #9 starts at the ninth symbol of the slot.

In order to transmit the PDCCH to the user equipment, each CORESET may have at least one search space. In the present invention, the search space is all the time-space resource combinations to which the user equipment's PDCCH may be transmitted. The search space may include a common search space that the user equipment of the 3GPP NR must commonly search and a Terminal-specific or UE-specific search space that a specific user equipment must search. The common search space is set to monitor the PDCCH that is set so that all the user equipments in the cell belonging to the same base station commonly search, and the specific user equipment search space may be set for each user equipment to monitor the PDCCH allocated to each user equipment in different search space positions according to the user equipment, but the corresponding UE-specific search space may be partially overlapped with the search space of other user equipments due to the limited control region to which the PDCCH may be mapped.

For convenience of explanation, a PDCCH scrambled with a group common RNTI (or common control RNTI, CC-RNTI) already known to transmit UL scheduling information or DL scheduling information to one or more user equipments is referred to as a UE group common PDCCH or a common PDCCH. In addition, a PDCCH scrambled with a UE-specific RNTI that a specific user equipment already knows to transmit UL scheduling information or DL scheduling information to one specific user equipment is referred to as a UE-specific PDCCH. The RNTI used by one or more user equipments in the 3GPP NR may include at least one of SI-RNTI, P-RNTI, RA-RNTI, and TPC-RNTI. The UE-specific RNTI may include at least one of a C-RNTI and an SPS C-RNTI. The base station can attach a CRC to each control information according to the RNTI value determined according to the purpose. The base station may perform rate matching to match the amount of resources s used for PDCCH transmission after performing tailed biting convolution coding. The base station may multiplex the PDCCH(s) to be transmitted in the subframe using a CCE-based PDCCH structure and map the multiplexed PDCCH to a resource to be transmitted. The number of CCEs used for one PDCCH may be defined as an aggregation level. In a specific embodiment, the aggregation level may be any of 1, 2, 4, 8, and 16.

The PDCCH signals each user equipment or user equipment group of at least one of information related to resource allocation of a paging channel (PCH) and a downlink-shared channel (DL-SCH), a UL scheduling grant, and HARQ information. The base station can transmit a paging channel (PCH) and a downlink-shared channel (DLSCH) through a PDSCH. The base station may transmit data excluding specific control information or specific service data through the PDSCH. In addition, the user equipment may receive data excluding specific control information or specific service data through the PDSCH.

The base station may include, in the PDCCH, information on to which user equipment (one or more user equipments)

PDSCH data is transmitted and how the PDSCH data is to be received and decoded by the corresponding user equipment, and transmit the PDCCH. For example, it is assumed that a specific PDCCH is CRC masked with an Radio Network Temporary Identity (RNTI) called "A", and information on data transmitted using a radio resource (e.g., frequency location) called "B" and a DCI format called "C", that is, transmission format information (e.g., transmission block size, modulation scheme, coding information, etc.) is transmitted through a specific subframe. In this case, the user equipment in the cell monitors the PDCCH using the RNTI information the user equipment has, and when there is more than one user equipment with an "A" RNTI, the corresponding user equipment receives the PDCCH and receives the PDSCH indicated by "B" and "C" through the information of the received PDCCH.

Table 3 shows the physical uplink control channel (PUCCH) used in the wireless communication system.

TABLE 3

| PUCCH format | Length in OFDM symbols | Number of bits |
| --- | --- | --- |
| 0 | 1-2 | ≤2 |
| 1 | 4-14 | ≤2 |
| 2 | 1-2 | >2 |
| 3 | 4-14 | >2 |
| 4 | 4-14 | >2 |

The PUCCH may be used to transmit the following control information.

Scheduling Request (SR): Information used to request a UL UL-SCH resource.

HARQ-ACK: A response to the PDCCH and/or a response to a DL data packet on the PDSCH.

It indicates whether PDCCH or PDSCH has been successfully received. The HARQ-ACK response includes positive ACK (simply ACK), negative ACK (hereinafter NACK), Discontinuous Transmission (DTX), or NACK/DTX. Here, the term HARQ-ACK is interchangeably used with HARQ ACK/NACK and ACK/NACK. In general, ACK may be represented by 1 and NACK may be represented by 0.

Channel State Information (CSI): This is feedback information on the DL channel Multiple Input Multiple Output (MIMO)-related feedback information includes a Rank Indicator (RI) and a Precoding Matrix Indicator (PMI). CSI may be divided into CSI part 1 and CSI part 2 according to the information indicated by CSI.

In the 3GPP NR system, five PUCCH formats may be used to support various service scenarios and various channel environments and frame structures.

PUCCH format 0 is a format may deliver 1-bit or 2-bit HARQ-ACK information. PUCCH format 0 may be transmitted through one OFDM symbol or two OFDM symbols on the time axis and one PRB on the frequency axis. When PUCCH format 0 is transmitted in two OFDM symbols, the same sequence to the two symbols may be transmitted through different PRBs. Through this, the user equipment can obtain a frequency diversity gain. More specifically, the user equipment may determine a value mcs of a cyclic shift according to Mbit bits UCI (Mbit=1 or 2), and map a sequence obtained by cyclic-shifting a base sequence having a length of 12 to a predetermined value mcs to 12 REs of one PRB of one OFDM symbol and transmit it. In a case where the number of cyclic shifts usable by the user equipment is 12 and Mbit=1, when the user equipment transmits UCI 0 and UCI 1, the user equipment may arranges the difference value of the two cyclic shifts to 6. In addition, when Mbit=2 and the user equipment transmits UCI 00, UCI 01, UCI 11, UCI 10, the user equipment can arrange the difference of four cyclic shift values to 3.

PUCCH format 2 may deliver Uplink Control Information (UCI) exceeding 2 bits. PUCCH format 2 may be transmitted through one OFDM symbol or two OFDM symbols on the time axis and one PRB on the frequency axis. When PUCCH format 2 is transmitted in two OFDM symbols, the same sequence to the two different OFDM symbols may be transmitted through different PRBs. Through this, the user equipment can obtain a frequency diversity gain. More specifically, Mbit bits UCI (Mbit>2) is bit-level scrambled, QPSK-modulated, and mapped to the PRB(s) of the OFDM symbol. Here, the number of PRBs may be any one of 1, 2, . . . , 16.

PUCCH format 1 may deliver 1-bit or 2-bit HARQ-ACK information. PUCCH format 1 may be transmitted through consecutive OFDM symbols on the time axis and one PRB on the frequency axis. Here, the number of OFDM symbols occupied by PUCCH format 1 may be one of 4, 5, 6, 7, 8, 9, 10, 11, 12, 13, and 14. More specifically, Mbit=1 UCI may be BPSK-modulated. The user equipment generates a complex valued symbol d(0) by QPSK modulation of Mbit=2 UCI and multiplies the generated d(0) by a sequence of length 12 to obtain a signal. The user equipment transmits the obtained signal by spreading the even-numbered OFDM symbol to which PUCCH format 1 is allocated through the time axis orthogonal cover code (OCC). PUCCH format 1 determines the maximum number of different user equipments multiplexed in the same PRB according to the length of the OCC to be used. In the odd-numbered OFDM symbols of PUCCH format 1, DMRS is spread with OCC and mapped.

PUCCH format 3 or PUCCH format 4 may deliver a UCI exceeding 2 bits. PUCCH format 3 or PUCCH format 4 may be transmitted through consecutive OFDM symbols on the time axis and one PRB on the frequency axis. The number of OFDM symbols occupied by PUCCH format 3 or PUCCH format 4 may be one of 4, 5, 6, 7, 8, 9, 10, 11, 12, 13, and 14. Specifically, the user equipment modulates Mbit bits UCI (Mbit>2) with n/2-BPSK or QPSK to generate a complex valued symbol d(0), d(Msymb−1). The user equipment may not apply block-wide spreading to PUCCH format 3. However, the user equipment may apply block-wise spreading to one RB (12 subcarriers) using a length-12 PreDFT-OCC so that PUCCH format 4 can have two or four multiplexing capacities. The user equipment performs transmit precoding (or DFT-precoding) on the spread signal and mapping it to each RE to transmit the spread signal.

In this case, the number of PRBs occupied by PUCCH format 2, PUCCH format 3, or PUCCH format 4 may be determined according to the length and maximum code rate of the UCI transmitted by the user equipment. When the user equipment uses PUCCH format 2, the user equipment can transmit HARQ-ACK information and CSI information together through the PUCCH. When the number of PRBs that the user equipment can transmit is greater than the maximum number of PRBs that PUCCH format 2, or PUCCH format 3, or PUCCH format 4 is capable of using, the user equipment may transmit only the remaining UCI information without transmitting some UCI information according to the priority of the UCI information.

PUCCH format 1, PUCCH format 3, or PUCCH format 4 may be configured through the RRC signal to indicate frequency hopping in a slot. When frequency hopping is configured, the index of the PRB to be frequency hopped may be configured with the RRC signal. When PUCCH format 1, or PUCCH format 3, or PUCCH format 4 is transmitted through N OFDM symbols on the time axis, the first hop may have floor (N/2) OFDM symbols and the second hop may have ceiling(N/2) OFDM symbols.

PUCCH format 1, PUCCH format 3, or PUCCH format 4 may be configured to be repeatedly transmitted in a plurality of slots. In this case, the number K of slots in which the PUCCH is repeatedly transmitted may be configured by the RRC signal. The repeatedly transmitted PUCCHs is required to start at an OFDM symbol of the same position in each slot, and have the same length. When one OFDM symbol among OFDM symbols of a slot in which the user equipment is required to transmit a PUCCH is indicated as a DL symbol by an RRC signal, the user equipment may not transmit the PUCCH in a corresponding slot and delay the transmission of the PUCCH to the next slot to transmit the PUCCH.

In the 3GPP NR system, a user equipment can perform transmission/reception using a bandwidth equal to or less than the bandwidth of a carrier (or cell). For this, the user equipment may be configured with the Bandwidth part (BWP) consist of a continuous bandwidth which is a part of the carrier's bandwidth. A user equipment operating according to TDD or operating in an unpaired spectrum may be configured with up to four DL/UL BWP pairs in one carrier (or cell). In addition, the user equipment may activate one DL/UL BWP pair. A user equipment operating according to FDD or operating in paired spectrum can receive up to four DL BWPs on a DL carrier (or cell) and up to four UL BWPs on a UL carrier (or cell). The user equipment may activate one DL BWP and one UL BWP for each carrier (or cell). The user equipment may or may not perform reception or transmission in a time-frequency resource other than the activated BWP. The activated BWP may be referred to as an active BWP.

The base station may indicate using the downlink control information (DCI) that the user equipment switch from one BWP to another BWP. Switching from one BWP to another BWP by the user equipment may indicate that the user equipment deactivates the BWP used by the user equipment and activates the new BWP. In a carrier (or cell) operating in TDD, the base station may include a Bandwidth part indicator (BPI) indicating the BWP to be activated in the DCI scheduling PDSCH or PUSCH to change the DL/UL BWP pair of the user equipment. The user equipment may receive the DCI scheduling the PDSCH or PUSCH and may identify the DL/UL BWP pair activated based on the BPI. For a DL carrier (or cell) operating as an FDD, the base station may include a BPI indicating the BWP to be activated in the DCI scheduling PDSCH to change the DL BWP of the user equipment. For a UL carrier (or cell) operating as an FDD, the base station may include a BPI indicating the BWP to be activated in the DCI scheduling PUSCH to change the UL BWP of the user equipment.

Figure 6:
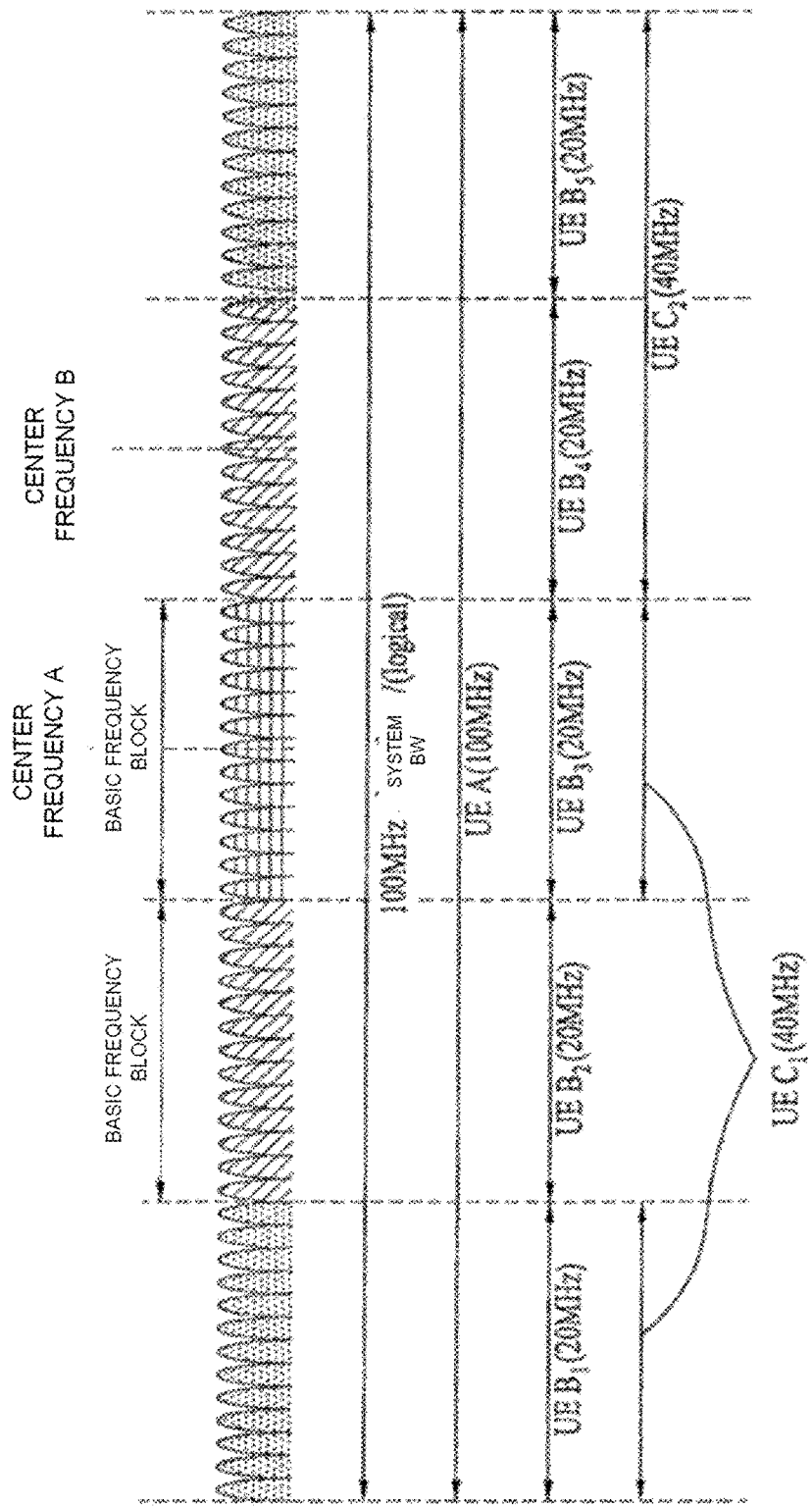
FIG. 6 is a conceptual diagram illustrating carrier aggregation.

Hereinafter, a carrier aggregation technique will be described. FIG. 6 is a conceptual diagram illustrating carrier aggregation.

Carrier aggregation is a method in which the user equipment uses a plurality of frequency blocks or cells (in the logical sense) including UL resources (or component carriers) and/or DL resources (or component carriers) as one large logical frequency band in order for a wireless communication system to use a wider frequency band. Hereinafter, for convenience of description, the term "component carrier" is used.

Referring to FIG. 6, as an example of a 3GPP NR system, a total System Bandwidth (System BW) may have a maximum bandwidth of 100 MHz as a logical bandwidth. The total system bandwidth includes five component carriers, and each component carrier may be capable of having a bandwidth of up to 20 MHz. A component carrier may include one or more physically contiguous subcarriers. Although it is shown in FIG. 6 that each of the component carriers has the same bandwidth, this is merely an example, and each component carrier may have a different bandwidth. Also, although each component carrier is shown as being adjacent to each other in the frequency axis, the drawings are shown in a logical concept, and each component carrier may be physically adjacent to one another, or may be spaced apart.

Different center frequencies may be used for each component carrier. Also, one common center carrier may be used in a physically adjacent component carrier. Assuming that all the component carriers are physically adjacent in the embodiment of FIG. 6, the center carrier A may be used in all the component carriers. Further, assuming that the respective component carriers are not physically adjacent to each other, the center carrier A and the center carrier B may be used in each of the component carriers.

In this specification, the component carrier may correspond to the system band of the legacy system. By defining the component carrier with respect to the legacy system by the wireless communication system, it is possible to provide backward compatibility in a wireless communication environment in which an evolved user equipment and a legacy user equipment coexist, and system design may be facilitated. For example, when the 3GPP NR system supports carrier aggregation, each of the component carriers may correspond to the system band of the 3GPP NR system. In addition, in the 3GPP NR system, up to 16 component carriers may be aggregated.

When the total system band is extended by carrier aggregation, the frequency band used for communication with each user equipment may be defined in units of a component carrier. The user equipment A can use 100 MHz, which is the total system band, and performs communication using all five component carriers. The user equipments B1 to B5 can use only 20 MHz bandwidth and perform communication using one component carrier. The user equipments C1 and C2 can use a 40 MHz bandwidth and perform communication using two component carriers, respectively. The two component carriers may be logically/physically adjacent or non-adjacent. The user equipment C1 represents the case of using two non-adjacent component carriers, and user equipment C2 represents the case of using two adjacent component carriers.

In the case of the 3GPP NR system, several component carriers may be used as shown in FIG. 6. The combination of the DL component carrier or the corresponding DL component carrier and the UL component carrier corresponding thereto may be referred to as a cell. Also, the correspondence relationship between the DL component carrier and the UL component carrier may be indicated through the system information.

Figure 7:
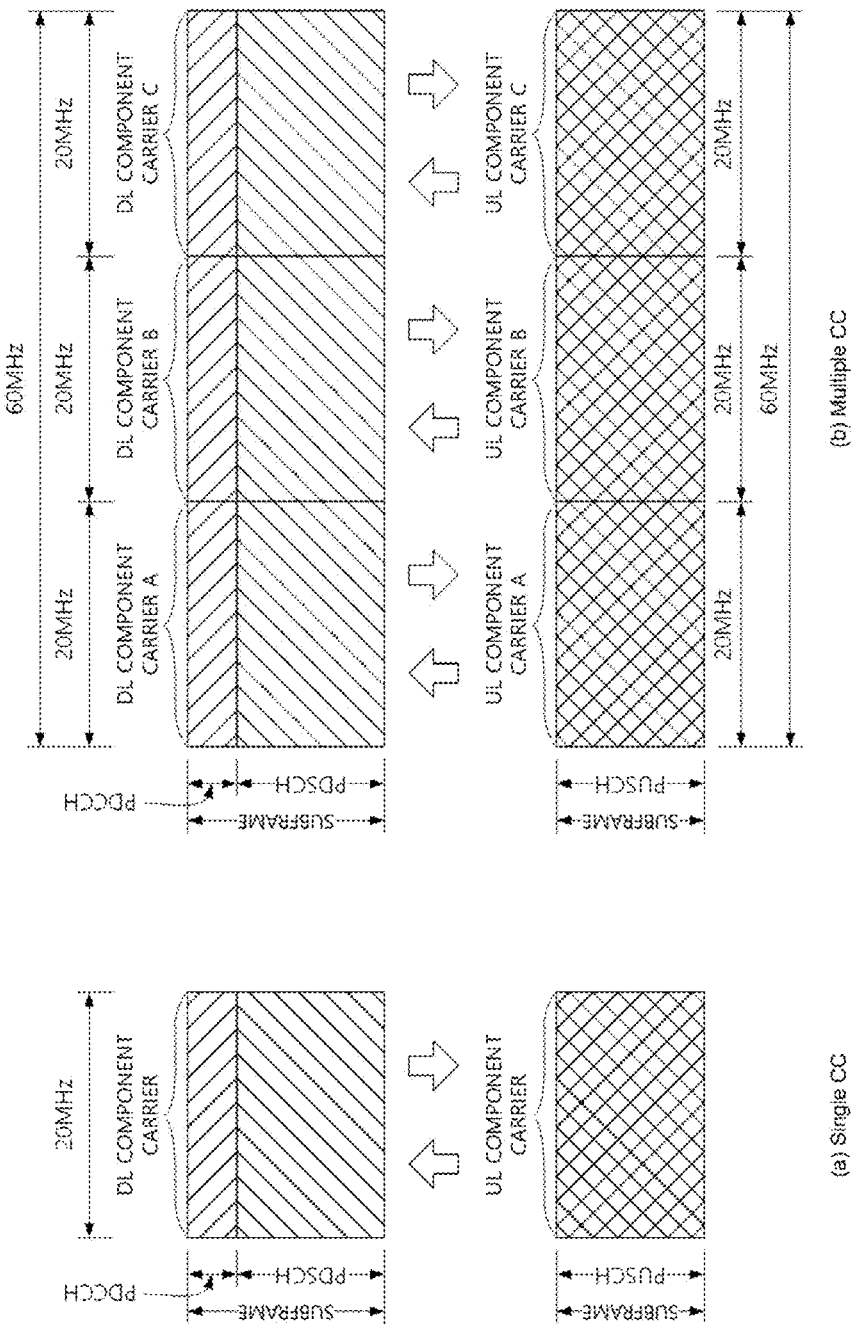
FIG. 7 is a diagram for explaining single carrier communication and multi-carrier communication.

FIG. 7 is a diagram for explaining single carrier communication and multi-carrier communication. Particularly, FIG. 7(a) shows a single carrier slot structure and FIG. 7(b) shows a multi-carrier slot structure.

Referring to FIG. 7(a), a general wireless communication system performs data transmission or reception (in a frequency division duplex (FDD) mode) through one DL band and one UL band corresponding thereto. In another specific embodiment, a wireless communication system may divide a radio frame into a UL time unit and a DL time unit in a time domain, and perform data transmission or reception (in time division duplex (TDD) mode) through the UL/DL time unit. In recent wireless communication systems, introduction of a carrier aggregation technique using a larger UL/DL bandwidth by collecting a plurality of UL and/or DL frequency blocks in order to use a wider frequency band is being discussed. Carrier aggregation differs from an orthogonal frequency division multiplexing (OFDM) system that performs DL or UL communication by placing a fundamental frequency band divided into a plurality of orthogonal subcarriers on one carrier frequency in that carrier aggregation performs DL or UL communications using multiple carrier frequencies. Hereinafter, each of the carriers aggregated by carrier aggregation is referred to as a component carrier (CC). Referring to FIG. 7(b), three 20 MHz CCs may be aggregated into UL and DL, respectively, so that a bandwidth of 60 MHz may be supported. Each CC may be adjacent or non-adjacent to one another in the frequency domain. FIG. 7(b) shows a case where the bandwidth of the UL CC and the bandwidth of the DL CC are the same and symmetric, but the bandwidth of each CC may be determined independently. In addition, asymmetric carrier aggregation with different number of UL CCs and DL CCs is possible. A DL/UL CC that is limited to a specific user equipment may be referred to as a configured serving UL/DL CC at a specific user equipment.

The base station may be used to communicate with the user equipment by activating some or all of the serving CCs configured in the user equipment, or by deactivating some CCs. The base station can change the CC to be activated/deactivated, and change the number of CCs to be activated/deactivated. If the base station allocates a CC available for the user equipment to a cell-specific or UE-specific, then at least one of the allocated CCs is deactivated, unless the CC allocation for the user equipment is completely reconfigured or the user equipment is handover. One CC that is not deactivated by the user equipment is called a Primary CC (PCC), and a CC that the base station can freely activate/deactivate is called a Secondary CC (SCC). PCC and SCC may be distinguished based on control information. For example, specific control information may be set to be transmitted and received only through a specific CC, and this specific CC may be referred to as PCC and the remaining CC(s) may be referred to as SCC(s).

Meanwhile, 3GPP NR uses the concept of a cell to manage radio resources. A cell is defined by a combination of DL resources and UL resources, that is, a combination of DL CC and UL CC. A cell may be configured with DL resources alone, or a combination of DL resources and UL resources. If carrier aggregation is supported, the linkage between the carrier frequency of the DL resource (or DL CC) and the carrier frequency of the UL resource (or UL CC) may be indicated by system information. In the case of user equipments that are in the RRC_CONNECTED state but not configured for carrier aggregation or that do not support carrier aggregation, there is only one serving cell configured with PCell.

As mentioned above, the term "cell" used in carrier aggregation is distinguished from the term "cell" which refers to a certain geographical area in which a communication service is provided by one base station or one antenna group. In order to distinguish between a cell referring to a certain geographical area and a cell of carrier aggregation, in the present invention, a cell of a carrier aggregation is referred to as a CC, and a cell of a geographical area is referred to as a cell.

When a plurality of CCs are aggregated and used in a 3GPP NR system, under the assumption that CCs that are not too far away from the frequency domain are aggregated, it is assumed that the UL/DL frame time synchronization of the SCC coincides with the time synchronization of the PCC. However, in the future, a plurality of CCs having user equipments that belong to different frequency bands or is far away on frequency, that is, different propagation characteristics, may be aggregated. In this case, assuming that the time synchronization of the PCC and the time synchronization of the SCC are the same as in the conventional case, the synchronization of the DL/UL signal of the SCC may be seriously adversely affected.

Figure 8:
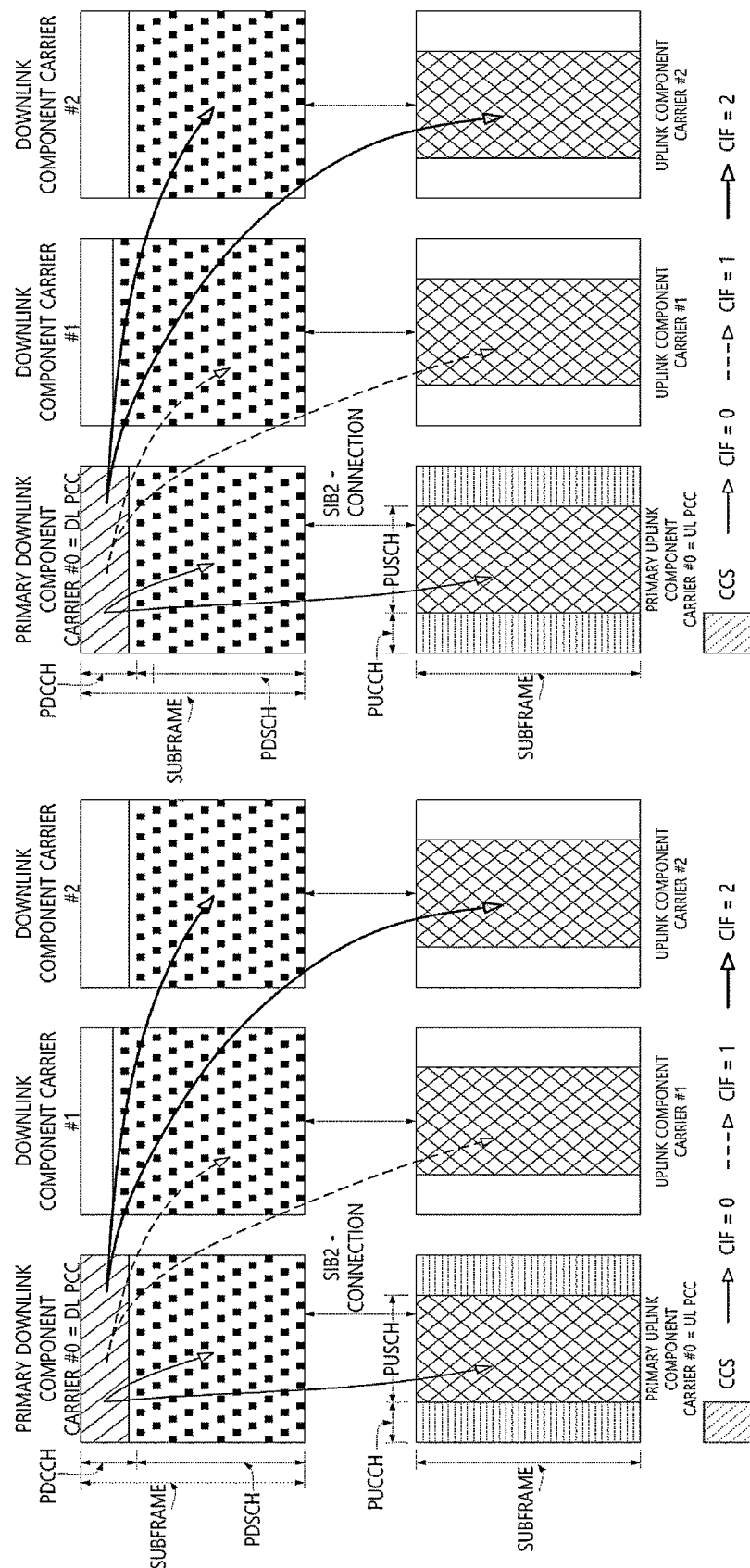
FIG. 8 is a diagram showing an example in which a cross carrier scheduling technique is applied.

FIG. 8 is a diagram showing an example in which a cross carrier scheduling technique is applied. In particular, in FIG. 8, the number of allocated cells (or component carriers) is 3, and cross carrier scheduling technique is performed using CIF as described above. Here, it is assumed that the DL cell #0 is a DL primary component carrier (i.e., Primary Cell (PCell)), and it is assumed that the remaining component carriers #1 and #2 are secondary component carriers (i.e., Secondary Cell (SCell)).

The present invention proposes a method of effectively managing UL resources for a primary component carrier (primary component carrier or primary cell or PCell) or a secondary component carrier (secondary component carrier or secondary cell or SCell) during a carrier aggregation operation of the user equipment. Hereinafter, the case where the user equipment operates by aggregating two component carriers is described, but it is obvious that the present invention can also be applied to the case of aggregating three or more component carriers.

Figure 9:
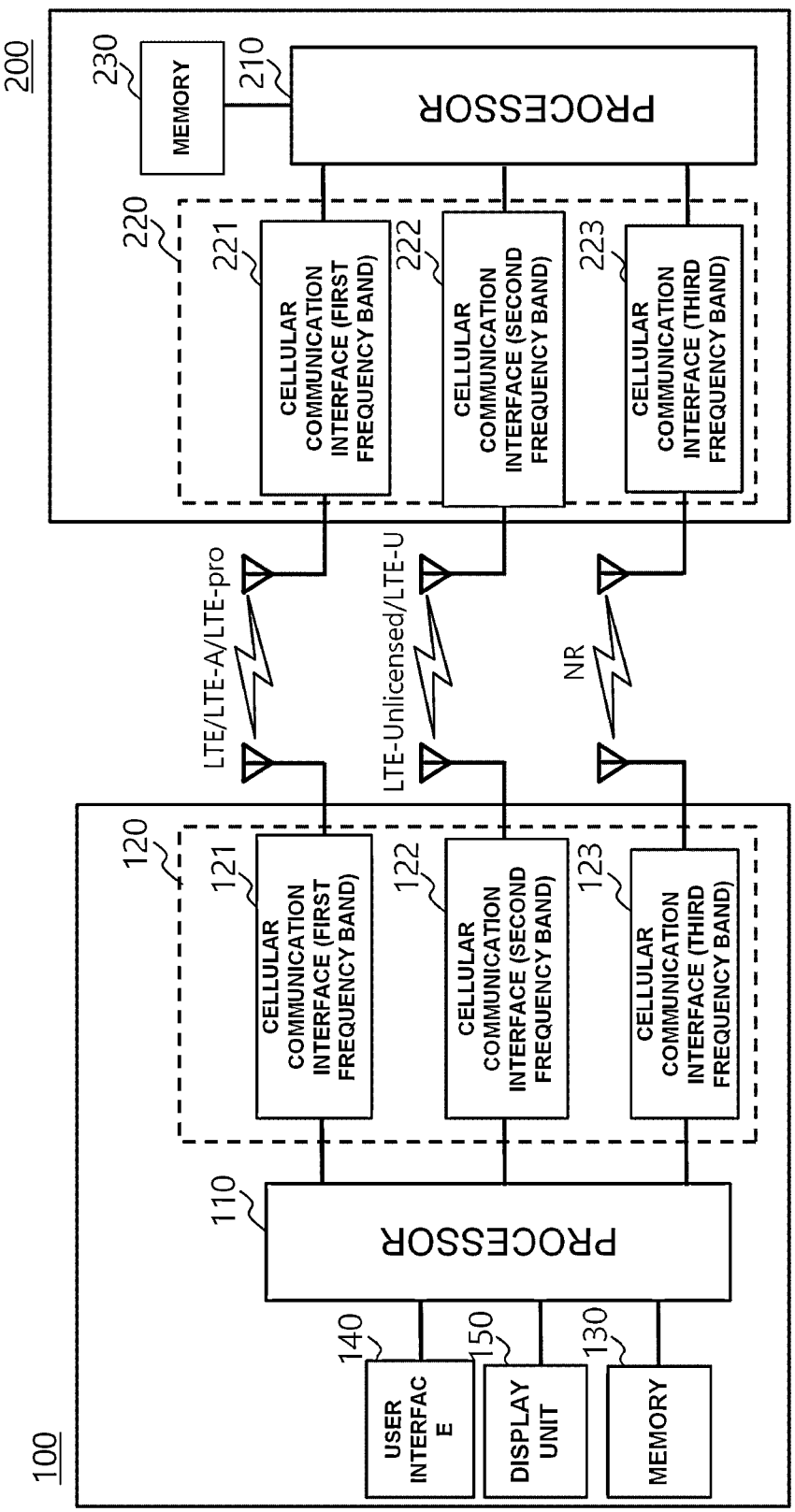
FIG. 9 is a block diagram showing the configurations of a user equipment and a base station according to an embodiment of the present invention.

FIG. 9 is a block diagram illustrating a configuration of a user equipment and a base station according to an embodiment of the present invention.

As shown in the drawing, a user equipment 100 according to an embodiment of the present invention may include a processor 110, a communication module 120, a memory 130, a user interface unit 140, and a display unit 150.

First, the processor 110 may execute various instructions or programs and process data within the user equipment 100. In addition, the processor 100 may control the entire operation including each unit of the user equipment 100, and may control the transmission/reception of data between the units.

Next, the communication module 120 may be an integration module for performing a wireless communication connection using a wireless communication network using at least one of a licensed band and an unlicensed band. For this, the communication module 120 may include a plurality of network interface cards internally or externally such as communication interface cards 121 and 122 using a licensed band and a communication interface card 123 using an unlicensed band. In FIG. 9, the communication module 120 is shown as an integral integration module, but unlike FIG. 9, each network interface card may be independently arranged according to circuit configuration or use.

The wireless communication interface card 121 for the first frequency band transmits and receives a radio signal to and from at least one of the base station 200, the external device, and the server using the mobile communication network, and provides a wireless communication service by the first frequency band based on the instruction of the processor 110. Here, the wireless signal may include various types of data or information such as a voice call signal, a video call signal, or a text/multimedia message.

According to an embodiment of the present invention, the wireless communication interface card 121 by the first frequency band may include at least one NIC module using LTE-Licensed frequency band or NR frequency band or LTE and NR common frequency band. According to an embodiment of the present invention, at least one NIC module performs wireless communication with at least one of the base station 200, the external device, and the server independently according to a wireless communication standard or protocol of a frequency band supported by the NIC module. The wireless communication interface card 121 may operate only one NIC module at a time or may operate a plurality of NIC modules at the same time according to the performance and requirements of the user equipment 100.

The wireless communication interface card 122 for the second frequency band transmits and receives a radio signal to and from at least one of the base station 200, the external device, and the server using the mobile communication network, and provides a wireless communication service by the second frequency band based on the instruction of the processor 110. According to an embodiment of the present invention, the wireless communication interface card 122 for the second frequency band may include at least one NIC module using an unlicensed band frequency band. For example, the unlicensed band frequency band may be a band of 2.4 GHz or a band of 5 GHz, or a band of 60 GHz. According to an embodiment of the present invention, at least one NIC module performs wireless communication with at least one of the base station 200, the external device, and the server independently according to a wireless communication standard or protocol of a frequency band supported by the NIC module. The wireless communication interface card 122 may operate only one NIC module at a time or may operate a plurality of NIC modules at the same time according to the performance and requirements of the user equipment 100.

The wireless communication interface card 123 for the second frequency band transmits and receives a radio signal to and from at least one of the base station 200, the external device, and the server through wireless access using an unlicensed band, and provides a wireless communication service by the second frequency band based on the instruction of the processor 110. According to an embodiment of the present invention, the wireless communication interface card 123 for the second frequency band may include at least one NIC module using an unlicensed band frequency band. For example, the unlicensed band frequency band may be an unlicensed radio band such as a band of 2.4 GHz or a band of 5 GHz, or a band of 60 GHz. According to an embodiment of the present invention, at least one NIC module performs wireless communication with at least one of the base station 200, the external device, and the server independently according to a wireless communication standard or protocol of a frequency band supported by the NIC module. The wireless communication interface card 123 may operate only one NIC module at a time or may operate a plurality of NIC modules at the same time according to the performance and requirements of the user equipment 100.

The wireless communication interface card 123 for the third frequency band transmits and receives a radio signal to and from at least one of the base station 200, the external device, and the server using the mobile communication network, and provides a wireless communication service by the third frequency band based on the instruction of the processor 110. Here, the wireless signal may include various types of data or information such as a voice call signal, a video call signal, or a text/multimedia message.

According to an embodiment of the present invention, the wireless communication interface card 121 for the third frequency band may include at least one NIC module using an NR frequency band. According to an embodiment of the present invention, at least one NIC module performs wireless communication with at least one of the base station 200, the external device, and the server independently according to a wireless communication standard or protocol of a frequency band supported by the NIC module. The cellular communication interface card 123 may operate only one NIC module at a time or may operate a plurality of NIC modules at the same time according to the performance and requirements of the user equipment 100.

According to an embodiment of the present invention, the processor 110 exchanges with the base station 200 information on whether or not the wireless communication service of the second frequency band is available and information on a predetermined period through a wireless communication channel of the first frequency band or a wireless communication channel of the third frequency band. Here, the information on the predetermined period is information set for receiving DL data from the base station 200 through the wireless communication channel of the second frequency band.

In addition, according to an embodiment of the present invention, since the base station 200 to be described later supports the wireless communication service, the processor 110 receives a base station coexistence message including information on a predetermined period through a wireless communication channel of a second frequency band from the base station 200.

Further, according to an embodiment of the present invention, as a response to the received base station coexistence message, the processor 110 transmits a user equipment coexistence message including information on a predetermined period to a neighboring user equipment capable of communicating with the base station 200 and the user equipment 100 through the wireless communication service of the second frequency band according to the standard or protocol specified in the wireless communication service of the second frequency band.

Also, according to an embodiment of the present invention, the processor 110 receives DL data from the base station 200 for a predetermined period through a wireless communication channel of a second frequency band.

Next, the memory 130 stores a control program used in the user equipment 100 and various data corresponding thereto. Such a control program may include a predetermined program required for the user equipment 100 to perform wireless communication with at least one of the base station 200, the external device, and the server.

Next, the user interface 140 includes various types of input/output means provided in the user equipment 100. That is, the user interface 140 may receive user input using various input means, and the processor 110 may control the user equipment 100 based on the received user input. In addition, the user interface 140 may perform output based on instructions of the processor 110 using various output means.

Next, the display unit 150 outputs various images on the display screen. The display unit 150 may output various display objects such as the content executed by the processor 110 or a user interface based on a control command of the processor 110.

Furthermore, as shown in FIG. 9, the base station 200 according to an embodiment of the present invention may include a processor 210, a communication module 220, and a memory 230.

First, the processor 210 may execute various instructions or programs and process data within the base station 200. In addition, the processor 210 can control the entire operation including each unit of the base station 200, and can control the transmission/reception of data between the units.

Next, the communication module 220 may be an integrated module for performing mobile communication and wireless connection using the mobile communication network, such as the communication module 120 of the user equipment 100 described above. For this, the communication module 120 may include a plurality of network interface cards internally or externally such as wireless communication interface cards 221 and 222 using a licensed band and an interface card 223 using an unlicensed band. In FIG. 9, the communication module 220 is shown as an integral integration module, but unlike FIG. 9, each network interface card may be independently arranged according to circuit configuration or use.

The wireless communication interface card 221 for the first frequency band transmits and receives a radio signal to and from at least one of the user equipment 100, the external device, and the server using the mobile communication network, and provides a wireless communication service by the first frequency band based on the instruction of the processor 210. Here, the wireless signal may include various types of data or information such as a voice call signal, a video call signal, or a text/multimedia message.

According to an embodiment of the present invention, the wireless communication interface card 221 for the first frequency band may include at least one NIC module using LTE-Licensed frequency band, NR licensed frequency band, or LTE and NR common frequency band. According to an embodiment of the present invention, at least one NIC module performs wireless communication with at least one of the user equipment 100, the external device, and the server independently according to a wireless communication standard or protocol of a frequency band supported by the NIC module. The wireless communication interface card 221 may operate only one NIC module at a time or may operate a plurality of NIC modules at the same time according to the performance and requirements of the base station 200.

The wireless communication interface card 223 for the third frequency band transmits and receives a radio signal to and from at least one of the user equipment 100, the external device, and the server using the mobile communication network, and provides a wireless communication service by the third frequency band based on the instruction of the processor 210. Here, the wireless signal may include various types of data or information such as a voice call signal, a video call signal, or a text/multimedia message.

According to an embodiment of the present invention, the wireless communication interface card 221 for the third frequency band may include at least one NIC module using an NR frequency band. According to an embodiment of the present invention, at least one NIC module performs wireless communication with at least one of the user equipment 100, the external device, and the server independently according to a wireless communication standard or protocol of a frequency band supported by the NIC module. The wireless communication interface card 223 may operate only one NIC module at a time or may operate a plurality of NIC modules at the same time according to the performance and requirements of the base station 200.

The wireless communication interface card 222 for the second frequency band transmits and receives a radio signal to and from at least one of the user equipment 100, the external device, and the server using the mobile communication network, and provides a wireless communication service by the second frequency band based on the instruction of the processor 210. According to an embodiment of the present invention, the wireless communication interface card 222 for the second frequency band may include at least one NIC module using an LTE-Unlicensed frequency band. For example, the LTE-Unlicensed frequency band may be a band in the 2.4 GHz, 5 GHz, and 60 GHz bands. According to an embodiment of the present invention, at least one NIC module performs wireless communication with at least one of the user equipment 100, the external device, and the server independently according to a wireless communication standard or protocol of a frequency band supported by the NIC module. The wireless communication interface card 222 may operate only one NIC module at a time or may operate a plurality of NIC modules at the same time according to the performance and requirements of the base station 200.

The wireless interface card 222 for the second frequency band transmits and receives a radio signal to and from at least one of the user equipment 100, the external device, and the server through wireless access, and provides a wireless communication service by the second frequency band based on the instruction of the processor 210. According to an embodiment of the present invention, the wireless access interface card 222 by the second frequency band may include at least one NIC module using an unlicensed band frequency band. For example, the wireless LAN frequency band may be an unlicensed radio band, such as bands in the 2.4 GHz, 5 GHz, and 60 GHz bands. According to an embodiment of the present invention, at least one NIC module performs wireless communication with at least one of the user equipment 100, the external device, and the server independently according to a wireless access standard or protocol of a frequency band supported by the NIC module. The wireless LAN interface card 222 may operate only one NIC module at a time or may operate a plurality of NIC modules at the same time according to the performance and requirements of the base station 200.

According to an embodiment of the present invention, the processor 210 exchanges with the user equipment 100 information on whether or not the wireless communication service of the second frequency band is available and information on a predetermined period through a wireless communication channel of the first frequency band. Here, the information on the predetermined period is information set for transmitting the DL data to the user equipment 100 through the wireless communication channel of the second frequency band.

Further, according to an embodiment of the present invention, the processor 210 transmits a base station coexistence message including information on a predetermined period according to a standard or a protocol defined in a wireless communication service of a second frequency band to the user equipment 100 and a peripheral user equipment capable of communicating with the base station 200 through the wireless communication service of the second frequency band, and transmits the DL data to the user equipment 100 for a predetermined period through the wireless communication channel of the second frequency band.

Also, according to an embodiment of the present invention, since the user equipment 100 supports the wireless communication service, the processor 210 receives a user equipment coexistence message in response to the base station coexistence message through the wireless communication channel of the second frequency band from the user equipment 100. Here, the user equipment coexistence message includes information on a predetermined period.

The user equipment 100 and the base station 200 shown in FIG. 9 are block diagrams according to an embodiment of the present invention, and the blocks separately displayed are logically distinguished from the elements of the device. Thus, the elements of the device described above may be mounted as one chip or as a plurality of chips depending on the design of the device. In addition, in the embodiment of the present invention, some components of the user equipment 100, such as the user interface 140 and the display unit 150, may be optionally provided in the user equipment 100. In addition, in the embodiment of the present invention, the user interface 140, the display unit 150, and the like may be additionally provided to the base station 200 as needed.

A wireless communication system includes a base station and a user equipment. In this specification, the term referring to both a base station and a user equipment uses a wireless communication device. The wireless communication device may demodulate the data channel based on the reference signal. Specifically, the wireless communication device can receive the reference signal and coherently demodulate the data channel based on the received reference signal. Here, the reference signal is referred to as a Designated Demodulation-Reference Signal (DM-RS). The DM-RS may be transmitted through a resource element (RE) at a predetermined location in a resource block (RB) or a slot. Unless otherwise specified herein, the RB refers to a Physical Resource Block (PRB). The location where the DM-RS is transmitted in the slot will be described with reference to FIG. 10.

Figure 10:
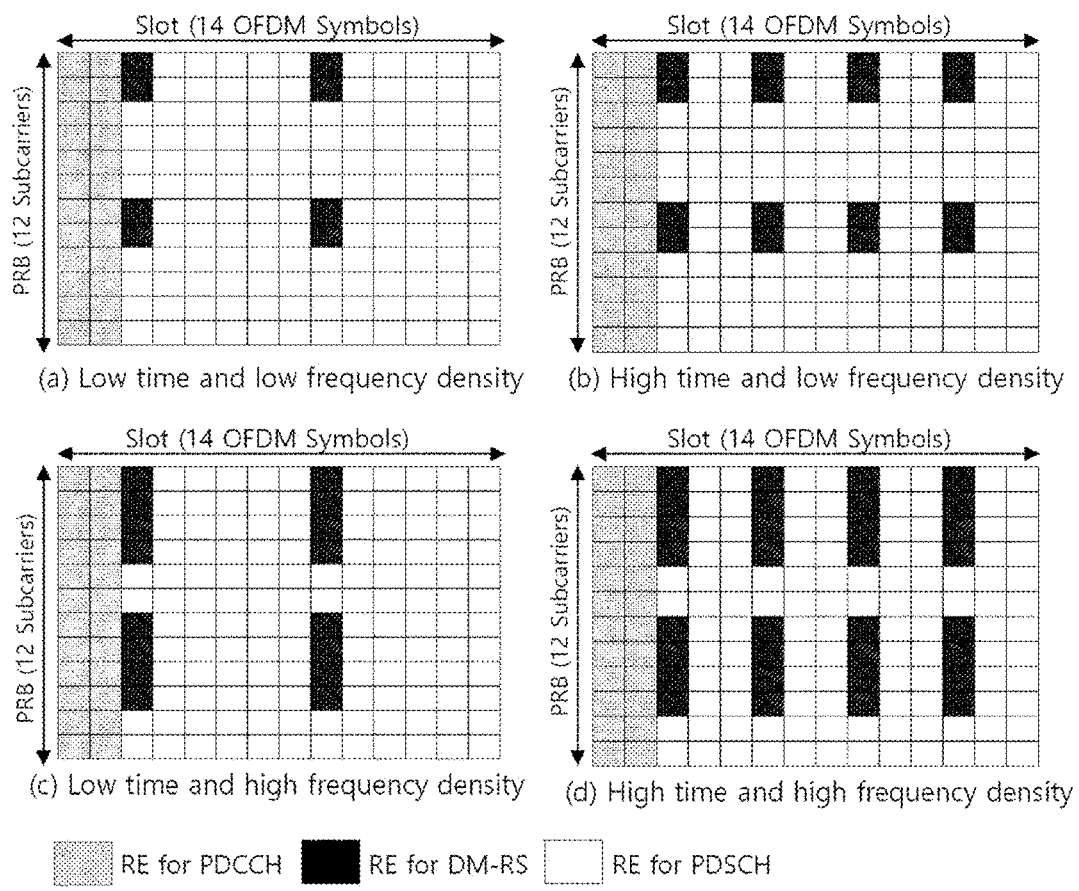
FIG. 10 shows a configuration of a slot according to an embodiment of the present invention.

FIG. 10 shows a configuration of a slot according to an embodiment of the present invention.

A slot used for DL transmission may include PDCCH, which is a control channel for transmitting control information, PDSCH, which is a data channel for transmitting DL data, and DM-RS, which is used for PDSCH reception. In this case, the PDCCH may include DL or UL control information. The base station can allocate resources in units of physical resource blocks (PRBs) including 12 subcarriers and 14 OFDM symbols in one slot. In this case, the base station can map the PDCCH to the first two OFDM symbols of the slot, and map the PDSCH and the DM-RS for PDSCH reception to the remaining 12 OFDM symbols. In another specific embodiment, the base station may map the PDCCH to the first OFDM symbol of the slot and map the PDSCH and the DM-RS for PDSCH reception to the remaining 12 OFDM symbols.

When a base station transmits a signal to a user equipment using two antenna ports, the base station may use the first DM-RS pattern. When the Doppler value of the user equipment is relatively high and the base station transmits a signal to the user equipment using two antenna ports, the base station can use the second DM-RS pattern. When the Doppler value of the user equipment is relatively low and the base station transmits a signal to the user equipment using four antenna ports, the base station can use the third DM-RS pattern. When the Doppler value of the user equipment is relatively high and the base station transmits a signal to the user equipment using four antenna ports, the base station can use the fourth DM-RS pattern. Specifically, the first DM-RS pattern to the fourth DM RS pattern may be as shown in FIGS. 10(a) to 10(d). When a base station transmits a DM-RS corresponding to a first DM-RS pattern or a third DM-RS pattern in one slot, the base station may map the DM-RS to the third OFDM symbol (index: 2) and the ninth OFDM symbol (index: 8) of the slot. Also, when a base station transmits a DM-RS corresponding to a second DM-RS pattern or a fourth DM-RS pattern in one slot, the base station maps the DM-RS to the third OFDM symbol (index: 2), the sixth OFDM symbol (index: 5), the ninth OFDM symbol (index: 8) and the twelfth OFDM symbol (index: 8). Also, when the base station transmits the DM-RS corresponding to the first DM-RS pattern or the second DM-RS pattern during one slot, the base station may map the DM-RS to the fifth, sixth, eleventh, and twelfth subcarriers of the PRB. Further, when the base station transmits the DM-RS corresponding to the third DM-RS pattern or the fourth DM-RS pattern during one slot, the base station may map the DM-RS to the third, fourth, fifth, sixth, ninth, tenth, eleventh and twelfth subcarriers of the PRB. In this embodiment, the first DM-RS pattern has the lowest overhead. Therefore, the data density of the slot including the first DM-RS pattern may be the highest among data densities of four slots including four DM-RS patterns, respectively. Also, the fourth DM-RS pattern has the largest overhead. Therefore, the data density of the slot including the fourth DM-RS pattern may be the lowest among data densities of four slots including four DM-RS patterns, respectively.

The base station may transmit information on the DM-RS to be used for demodulation by the user equipment using the PDCCH. Also, the base station may transmit information on the DM-RS to be used for demodulation by the user equipment using a Radio Resource Control (RRC) signal or a PBCH. In this case, the RRC signal may be a cell-specific RRC signal specific to the cell. The RRC signal may be a UE-specific RRC signal specific to the user equipment. The operation of the user equipment receiving the DM-RS will be described in detail with reference to FIG. 11 to FIG. 12.

Figure 11:
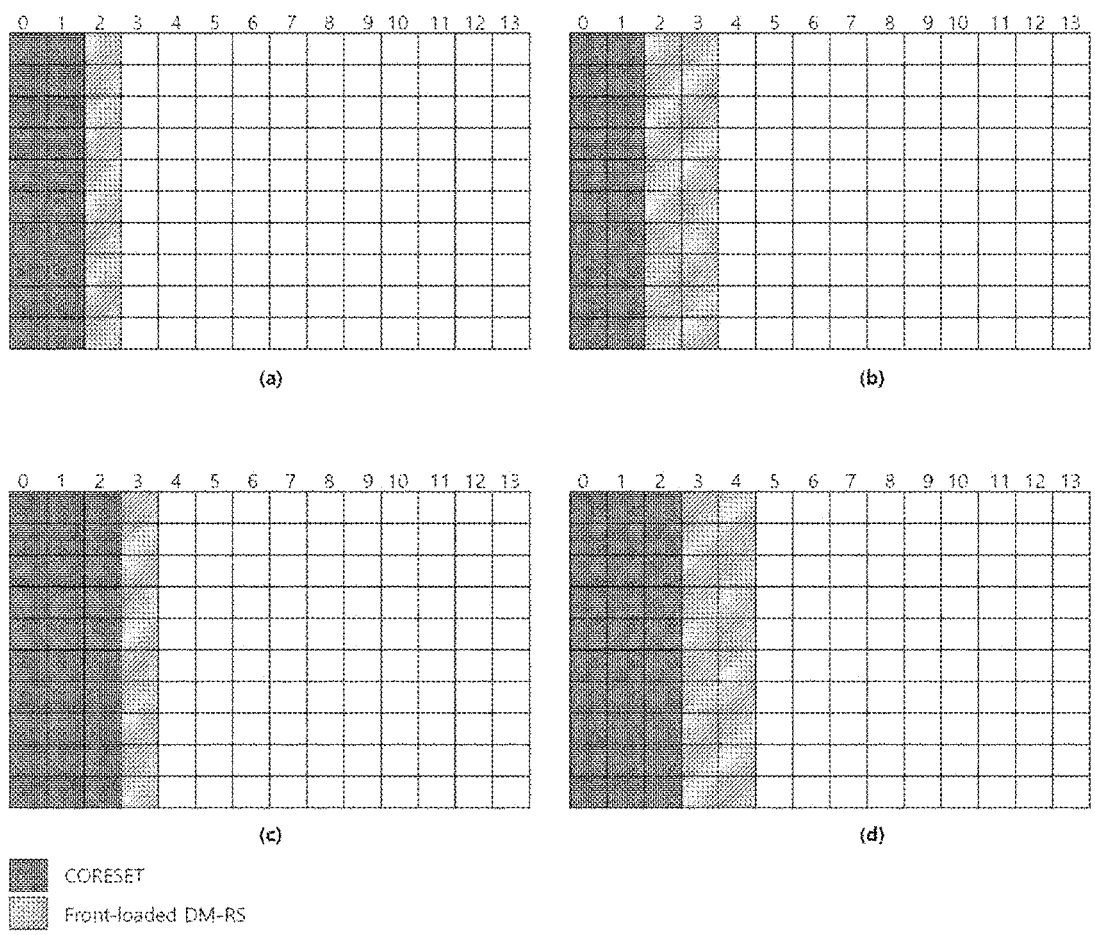
FIG. 11 shows a location where a wireless communication device according to an embodiment of the present invention transmits a front-loaded DM-RS and a Control Resource Set (CORESET) in one slot.

FIG. 11 shows a location where a wireless communication device according to an embodiment of the present invention transmits a front-loaded DM-RS and a Control Resource Set (CORESET) in one slot. A front-loaded DM-RS may indicate the first-loaded DM-RS among the DM-RS of the data channel. In FIG. 11, the location of the front-loaded DM-RS may be configured by the PBCH or may be determined according to the scheduling information of the data channel. When the location of the DM-RS is configured in the PBCH, when the location of the DM-RS in the slot is configured with the fourth OFDM symbol (index: 3), the number of symbols occupied by CORESET may be one of 1, 2, or 3. In addition, when the location of the DM-RS is configured in the PBCH, when the location of the DM-RS is configured with the third OFDM symbol (index: 2), the number of symbols occupied by CORESET may be one of 1 and 2. When the DM-RS location is determined according to the scheduling information of the data channel, a front-loaded DM-RS may be the first symbol of a scheduled data channel.

Figure 12:
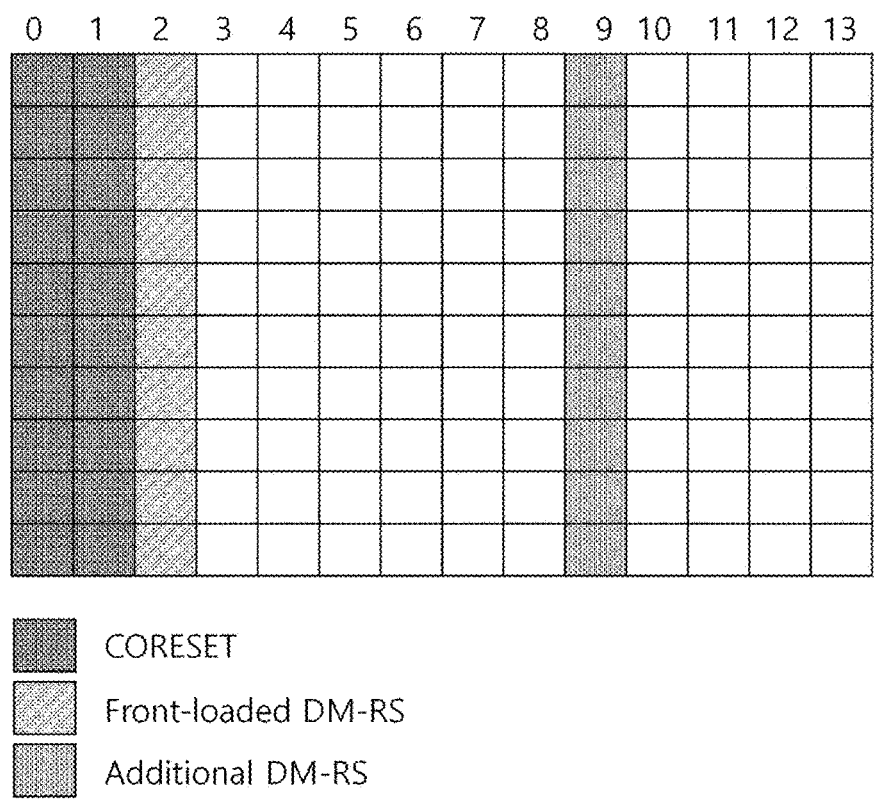
FIG. 12 shows a location where a wireless communication device according to an embodiment of the present invention transmits and receives a front-loaded DM-RS, an additional DM-RS, and a Control Resource Set (CORESET) in one slot.

FIG. 12 shows a location where a wireless communication device according to an embodiment of the present invention transmits and receives a front-loaded DM-RS, an additional DM-RS, and a Control Resource Set (CORESET) in one slot.

The DM-RS first transmitted in one slot may be referred to as a front-loaded DM-RS. A front-loaded DM-RS may be called the first DM-RS. The front-loaded DM-RS may be one symbol or two symbols, depending on the RRC configuration. In addition, a DM-RS transmitted after a front-loaded DM-RS in the corresponding slot may be referred to as an additional DM-RS. The base station may transmit the additional DM-RS to the channel having a large Doppler value. Through this, the base station can increase the demodulation performance of the user equipment.

The user equipment may identify the location of the CORESET, the front-loaded DM-RS, and the additional DM-RS in the slot based on the RRC signal or the PBCH. Accordingly, the user equipment may identify the location of the CORESET-mapped time-frequency resource allocated to the user equipment in the current slot based on the RRC signal or the PBCH. However, the user equipment may not be able to identify the location of the DM-RS mapped time-frequency resource allocated to another user equipment in the current slot. In addition, the user equipment may not be able to identify the location of the time-frequency resource where the PDCCH is dynamically mapped to the CORESET allocated to the user equipment in the slot to be transmitted in the future.

Also, the user equipment may identify the location of the OFDM symbol where the front-loaded DM-RS is mapped in the slot based on the Physical Broadcast Channel (PBCH) or the RRC signal. In this case, the RRC signal may be a UE-specific RRC signal for the corresponding user equipment. In the embodiment of FIG. 11, the user equipment receives allocated 12 OFDM symbols and 32 PRBs from the third OFDM symbol (index: 2) of the slot from the base station. In this case, the user equipment may identify that the DM-RS is mapped to the third OFDM symbol (index: 2) or the fourth OFDM symbol (index: 3) in the slot based on the PBCH or RRC signal. In the embodiments of FIGS. 11(a) and 11(b), the user equipment identifies that the DM-RS is mapped to the third OFDM symbol (index: 2) of the slot based on the PBCH or RRC signal. In this case, the user equipment may identify that the CORESET scheduled with the PDSCH is mapped to the first OFDM symbol (index: 0) and the second OFDM symbol (index: 1) of the slot. In addition, in the embodiments of FIG. 11(c) and FIG. 11(d), the user equipment identifies that the DM-RS is mapped to the fourth OFDM symbol (index: 3) of the slot based on the PBCH or RRC signal. In this case, the user equipment may identify that the CORESET scheduled with the PDSCH is mapped to the first and second OFDM symbols (index: 1) and the third OFDM symbol (index: 2) of the slot. In a specific embodiment, a front-loaded DM-RS may be transmitted through one or two OFDM symbols.

The user equipment may receive a configuration of additional DM-RSs from the base station through UE-specific RRC signals. In this case, the user equipment may identify at least one of the number and location of the additional DM-RS based on the UE-specific RRC signal. In addition, the user equipment may receive a configuration of additional DM-RSs from the base station through UE-specific RRC signals. In addition, the UE may dynamically receive at least one of the number and location of the additional DM-RS through the DCI from the base station. In the embodiment of FIG. 12, the user equipment identifies that an additional DM-RS is mapped to the tenth OFDM symbol (index: 11) of the slot based on the UE-specific RRC signal. The user equipment performs channel estimation using a front-loaded DM-RS and an additional DM-RS. The user equipment demodulates the PDSCH based on channel estimation. In the embodiment of FIG. 12, an additional DM-RS may be transmitted through one OFDM symbol, but may be transmitted through a plurality of OFDM symbols according to an embodiment.

The DM-RS may be relatively important compared to other signals because it is the information needed for the demodulation of data by the wireless communication device. Thus, if a time-frequency resource mapped to DM-RS transmission of a base station overlaps a time-frequency resource mapped to another purpose, it is a problem of whether the wireless communication device may use the resource mapped to DM-RS transmission for DM-RS transmission. Specifically, a time-frequency resource overlapping with a time-frequency resource mapped to DM-RS transmission may be a resource used for Ultra-Reliable and Low Latency Communications (URLLC) transmission. The time-frequency resource overlapping with the time-frequency resource mapped to DM-RS transmission may be a resource used for synchronization signal/physical broadcast (SS/PBCH) block transmission. A time-frequency resource overlapping overlaps with a time-frequency resource mapped to DM-RS transmission may be a resource used for physical random access channel (PRACH) block transmission. The PRACH block may be referred to as a PRACH transmission resource. A time-frequency resource overlapping with a time-frequency resource mapped to DM-RS transmission may be a resource that is reserved to support other services or future services. In this case, the transmission power used in the corresponding resource may be 0. For reference, a transmission power of 0 for the corresponding resource may indicate that the corresponding resource is not used.

Figure 13:
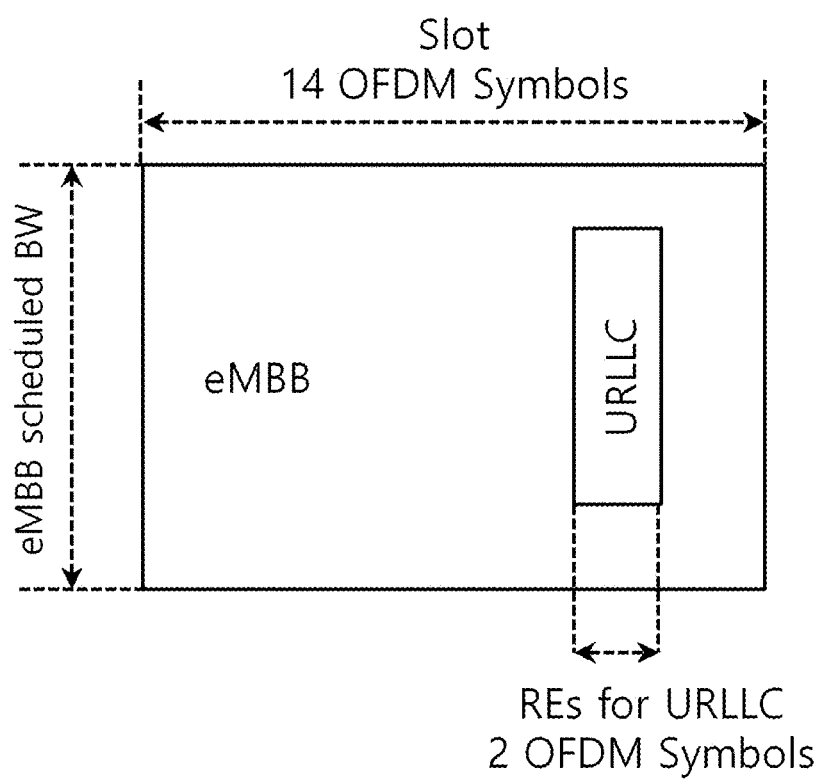
FIG. 13 shows a slot used for a URLLC by a base station according to an embodiment of the present invention.

The transmission of the URLLC will be described with reference to FIG. 13. FIG. 13 shows a slot used for a URLLC by a base station according to an embodiment of the present invention.

URLLC is a communication requiring very low latency. Thus, if a URLLC transmission is requested, the wireless communication device is required to schedule the URLLC transmission without delay. In this case, the wireless communication device may perform the URLLC transmission using a part of the slot scheduled for a transmission other than the URLLC transmission. Specifically, the wireless communication device may perform URLLC transmission using punctured time-frequency resources by puncturing some time-frequency resources of a slot scheduled for the transmission other than the URLLC transmission. The wireless communication device may perform the URLLC transmission using a part of the slot scheduled for the enhanced mobile broadband (eMBB) data transmission. The duration of a part of a slot used for URLLC transmission may correspond to any one of the duration of one OFDM symbol to the duration that is one less than the number of OFDM symbols included in the slot. In addition, the duration of a part of a slot used for URLLC transmission may be specified in units of two OFDM symbols. In yet another specific embodiment, the duration of a part of a slot used for URLLC transmission may be specified in units of seven OFDM symbols. In addition, the wireless communication device may perform the URLLC transmission using a relatively wide frequency bandwidth to increase the reliability of the URLLC transmission.

The base station may transmit PDCCH for URLLC, PDSCH for URLLC, and DM-RS for URLLC in the URLLC transmission. In the embodiment of FIG. 13, the base station schedules eMBB data transmission in a slot including 14 OFDM symbols. In this case, the base station performs URLLC transmission by puncturing resources corresponding to two OFDM symbols and a frequency band allocated for eMBB data transmission in a corresponding slot. In this case, the base station can transmit PDCCH for URLLC, PDSCH for URLLC, and DM-RS for URLLC through a punctured resource as described above.

For convenience of explanation, when a time-frequency resource mapped to DM-RS transmission overlaps with a time-frequency resource mapped to another purpose, a time-frequency resource overlapping with a time-frequency resource mapped to DM-RS transmission is referred to as a DM-RS overlap resource. Also, a signal transmitted through the DM-RS overlap resource is referred to as a DM-RS overlap signal. The DM-RS overlap signal may be a signal other than the above-mentioned URLLC, SS/PBCH, and PRACH. In addition, the DM-RS overlap resource may be a reserved resource as described above. In addition, the user equipment may receive signaling of the information on the DM-RS overlap resources from the base station through the RRC or the DCI. Specifically, the user equipment may receive signaling of the information on a time-frequency resource where the DM-RS overlap resource is mapped through the L1 signaling from the base station. In this case, the L1 signaling may refer to signaling for signaling information on the physical layer. For example, L1 signaling may include signaling in the DCI. In another specific embodiment, the time-frequency resource scheduled with the DM-RS overlap signal may be predetermined. In this case, the user equipment may determine the time-frequency resource where the DM-RS overlap signal is mapped without obtaining additional signaling information. For example, the user equipment may identify the resource where the SS/PBCH block is allocated without obtaining additional signaling information. In addition, the user equipment may receive the DCI and determine a time-frequency resource where the data channel may be mapped based on the information on the time-frequency resource allocation included in the DCI. In this case, the data channel may be a PDSCH or a PUSCH. Accordingly, the user equipment may determine presence of the DM-RS overlap resource in a PRB received by the user equipment or a PRB transmitted by the user equipment.

A DM-RS transmission or a DM-RS overlap signal transmission method selected by a wireless communication device when there is a DM-RS overlap resource will be described in detail with reference to FIG. 14.

Figure 14:
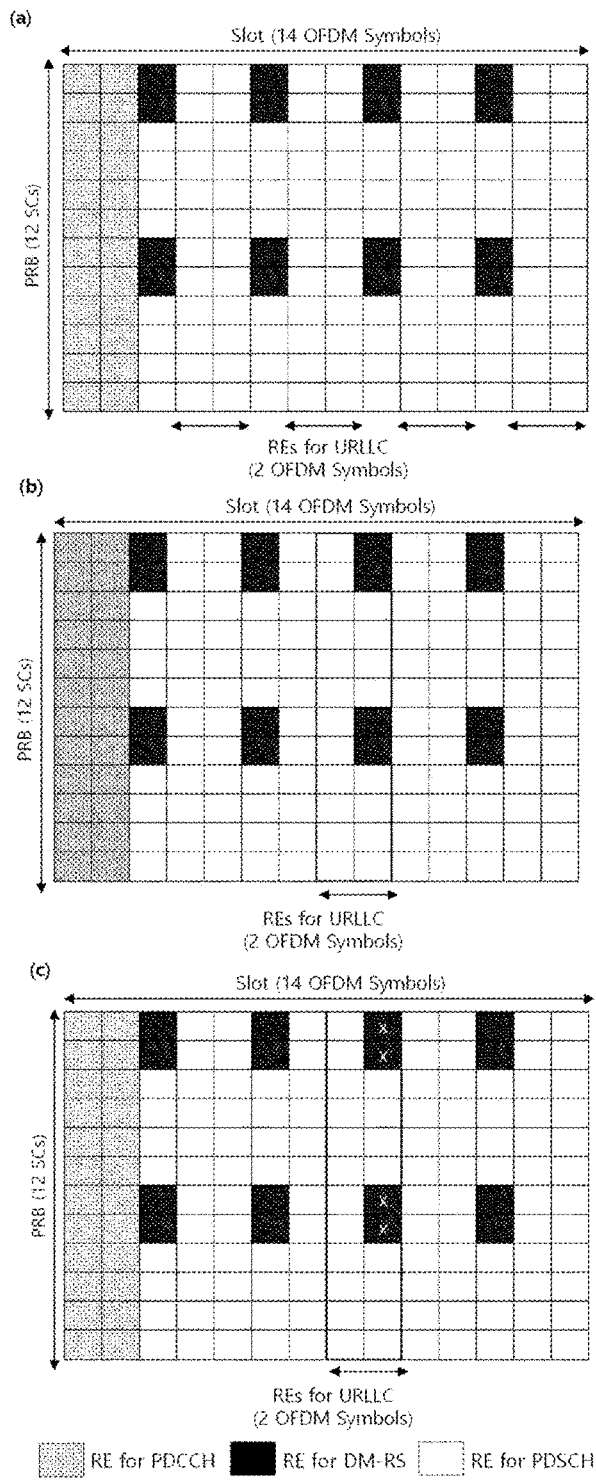
FIG. 14 shows that a base station performs URLLC transmission according to an embodiment of the present invention.

FIG. 14 shows that a base station performs URLLC transmission according to an embodiment of the present invention.

The wireless communication device may schedule the DM-RS overlap signal not to overlap the time-frequency resources mapped to DM-RS transmission. Specifically, the wireless communication device may schedule the DM-RS overlap signal to the RE corresponding to the OFDM symbol different from the OFDM symbol of the RE mapped with the DM-RS. In the embodiment of FIG. 14(*a*), the base station schedules a URLLC transmission to a part of a slot scheduled for another transmission. The base station schedules the URLLC transmission not to overlap the RE transmitted simultaneously with the RE mapped to the DM-RS transmission. In this embodiment, the user equipment may not expect the URLLC transmission to the OFDM symbol of the RE where the DM-RS is transmitted.

The wireless communication device may schedule the DM-RS overlap signal and may transmit the DM-RS in the RE where the DM-RS overlaps with the DM-RS. In this case, the wireless communication device rate-matches the DM-RS overlap signal to the remaining RE except for the RE where the DM-RS overlap signal and the DM-RS overlap in the time-frequency resource scheduled for the DM-RS overlap signal. Specifically, the wireless communication device may transmit the DM-RS and the DM-RS overlap signal together with the DM-RS overlap signal while using the DM-RS overlap signal as another RE transmitted at the same time point as the OFDM symbol of the RE mapped with the DM-RS. In the embodiment of FIG. 14(*b*), the base station schedules a URLLC transmission to a part of a slot scheduled for another transmission. The base station schedules the URLLC transmission to the remaining REs except for the RE mapped with the DM-RS in a time-frequency resource scheduled for URLLC transmission. In this case, the user equipment receiving the scheduled transmission before the URLLC transmission is scheduled can estimate the channel using all the DM-RSs as before the URLLC transmission is scheduled. In addition, the base station transmitting the URLLC may use a larger frequency band having the number of REs necessary for URLLC transmission when using remaining REs except for the REs mapped with the DM-RS. If the base station transmitting the URLLC can not use the large frequency band, the DM-RS can not use the mapped RE, and therefore the reliability of the URLLC transmission may be lowered.

When the wireless communication device needs to transmit a DM-RS overlap signal, the wireless communication device may transmit a DM-RS overlap signal instead of the DM-RS in a time-frequency resource mapped to DM-RS transmission. In the embodiment of FIG. 14(*c*), the base station schedules a URLLC transmission to a part of a slot scheduled for another transmission. In this case, the base station punctures the RE mapped with the DM-RS and schedules the URLLC transmission. The RE indicated by 'x' in FIG. 14(*c*) indicates that the RE is not used as a DM-RS but is punctured to be used for URLLC transmission.

When there is a DM-RS overlap resource, an embodiment in which the wireless communication device transmits a DM-RS overlap signal without puncturing the DM-RS will be described with reference to FIG. 15 to FIG. 21.

Figure 15:
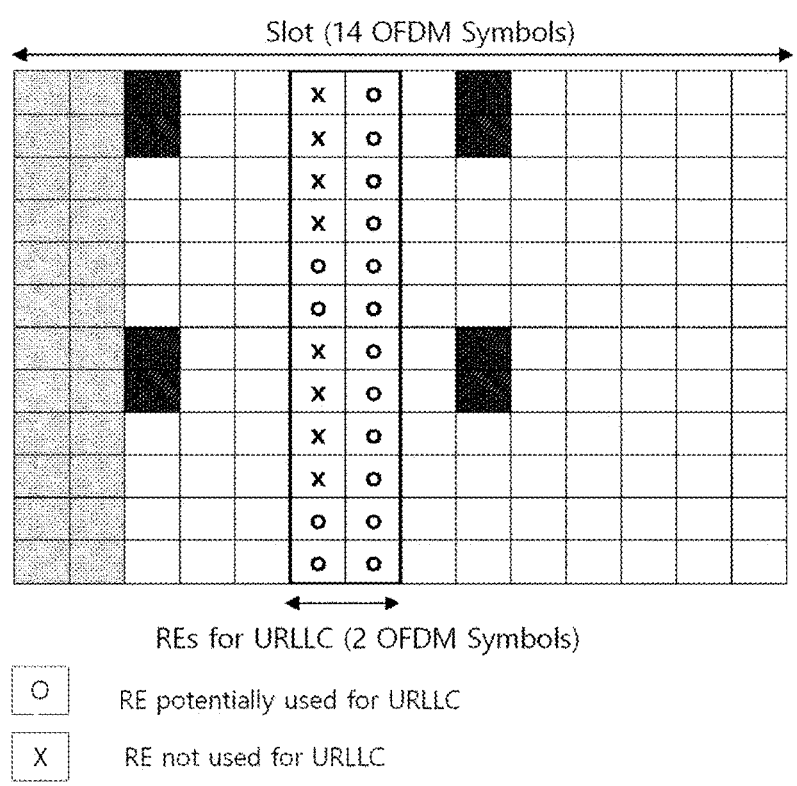
FIG. 15 shows a method of transmitting a DM-RS overlap signal by a wireless communication device according to an embodiment of the present invention.

FIG. 15 shows a method of transmitting a DM-RS overlap signal by a wireless communication device according to an embodiment of the present invention.

The wireless communication device may use the remaining REs except for REs where DM-RS may be transmitted potentially as a DM-RS overlap resource. Specifically, the wireless communication device may transmit a DM-RS overlap signal using the remaining REs except for the REs where the DM-RS may be potentially transmitted. As described above, the wireless communication device may transmit the DM-RS according to one or more transmission patterns. The wireless communication device determines the RE where the DM-RS may potentially be transmitted based on the transmission pattern of the DM-RS, and the device may transmit the DM-RS overlap signal using the remaining REs except for the REs where DM-RS may be potentially transmitted. In the embodiment of FIG. 15, the RE where DM-RS may be potentially mapped according to the transmission pattern of the DM-RS is denoted by "x". The base station schedules the URLLC transmission to a part of the slot where transmission other than the URLLC transmission is scheduled. In this case, the base station transmits the URLLC using the remaining REs except for the REs that are potentially DM-RS mapped. Specifically, the base station can transmit PDCCH for URLLC, DM-RS for URLLC, and PDSCH for URLLC by using the remaining REs except for the REs that are potentially DM-RS mapped.

When the wireless communication device transmits a DM-RS overlap signal without puncturing the DM-RS, in order for the wireless communication device receiving the DM-RS overlap signal to receive the DM-RS overlap signal, the wireless communication device receiving the DM-RS overlap signal may need information on the DM-RS pattern. Therefore, a wireless communication device transmitting a DM-RS overlap signal may be required to signal information on a DM-RS pattern to a user equipment receiving the DM-RS overlap signal. A method for the wireless communication device to signal the information on the DM-RS pattern to the user equipment receiving the DM-RS overlap signal will be described with reference to FIG. 16 to FIG. 19.

Figure 16:
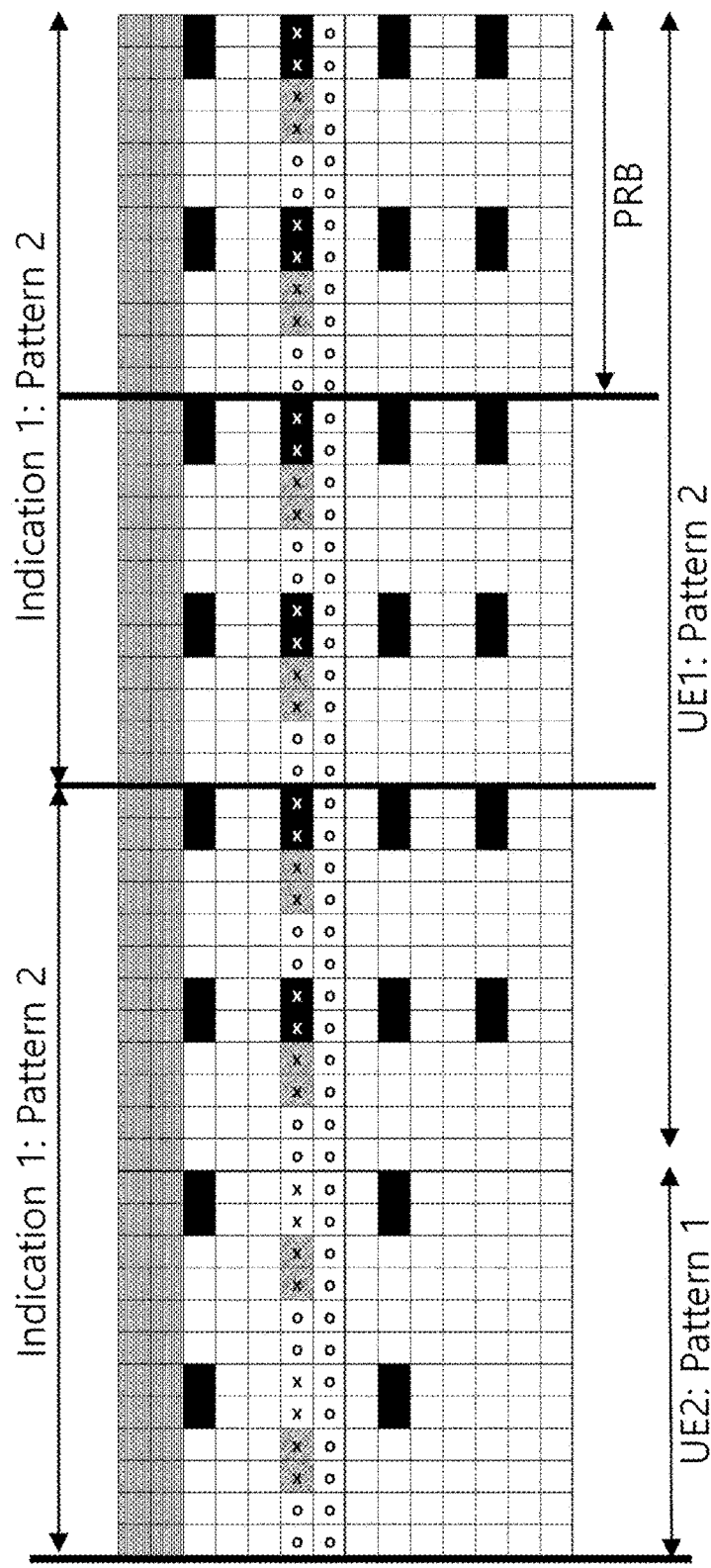
FIG. 16 shows a method of signaling information on a DM-RS pattern to a wireless communication device receiving a DM-RS overlap signal when a wireless communication device according to an embodiment of the present invention transmits a DM-RS overlap signal.

FIG. 16 shows a method of signaling information on a DM-RS pattern to a wireless communication device receiving a DM-RS overlap signal when a wireless communication device according to an embodiment of the present invention transmits a DM-RS overlap signal.

A wireless communication device transmitting a DM-RS overlap signal may determine an RE to be used for transmission of a DM-RS overlap signal based on a DM-RS transmission pattern having the largest overhead. This is because a wireless communication device that is to receive a DM-RS overlap signal cannot know a DM-RS pattern for transmission other than the DM-RS overlap signal transmission mapped to the slot scheduled with the DM-RS overlap signal. Specifically, the wireless communication device transmitting the DM-RS overlap signal may select an RE to be used for transmission of the DM-RS overlap signal among the remaining REs except for the REs that may be used for DM-RS transmission according to the DM-RS transmission pattern having the largest overhead. In a specific embodiment, a wireless communication device transmitting a DM-RS overlap signal may determine an RE to be used for transmission of a DM-RS overlap signal based on a DM-RS transmission pattern having the largest overhead among a plurality of RBs. For this, the base station may signal to the URLLC user equipment the information on the DM-RS transmission pattern having the largest overhead among the plurality of RBs. Here, a plurality of RBs may be RBs allocated to the PDSCH or PUSCH where the URLLC is scheduled. When the user equipment participating in the URLLC communication receives the PDSCH or transmits the PUSCH, it may be expected that the PDSCH or the PUSCH will not be transmitted through the corresponding RB according to the signaled DM-RS transmission pattern.

In the embodiment of FIG. 16, the base station allocates the first PRB PRB1 to the fourth PRB PRB4 to the first user equipment UE1 and the second user equipment UE2. The base station may signal the user equipment about the DM-RS pattern for each two PRBs. Specifically, the base station may signal information on the pattern of the DM-RS included in the first PRB PRB1 and the second PRB PRB2, and signal information on the pattern of the DM-RS included in the third PRB PRB3 and the fourth PRB PRB4. The base station schedules transmission for the first user equipment UE 1 to the first PRB PRB1 to the third PRB PRB3 and schedules transmission for the fourth user equipment UE 4 to the fourth PRB PRB4. In this case, in the transmission for the first user equipment UE 1, the base station transmits the DM-RS corresponding to the second DM-RS pattern, and in the transmission for the second user equipment UE 2, transmits the DM-RS corresponding to the first DM-RS pattern. In this case, the base station signals that the second DM-RS pattern is used in the PDCCH for URLLC transmission signaling information on the first PRB PRB1 and the second PRB PRB2. This is because the second DM-RS pattern is used in both the first PRB PRB2 and the second PRB PRB2. In addition, the base station signals that the second DM-RS pattern is used in the PDCCH for URLLC transmission signaling information on the third PRB PRB3 and the fourth PRB PRB4. This is because the second DM-RS pattern is used in the third PRB PRB3, the first DM-RS pattern is used in the fourth PRB PRB4, and the second DM-RS pattern has a larger overhead than the first DM-RS pattern. The user equipment requesting the URLLC communication may determine the RE allocated to the URLLC transmission based on the information on the DM-RS pattern signaled by the base station. Specifically, the second user equipment UE2 may expect to perform the URLLC transmission through the remaining RE except for the RE mapped to the second DM-RS pattern.

Figure 17:
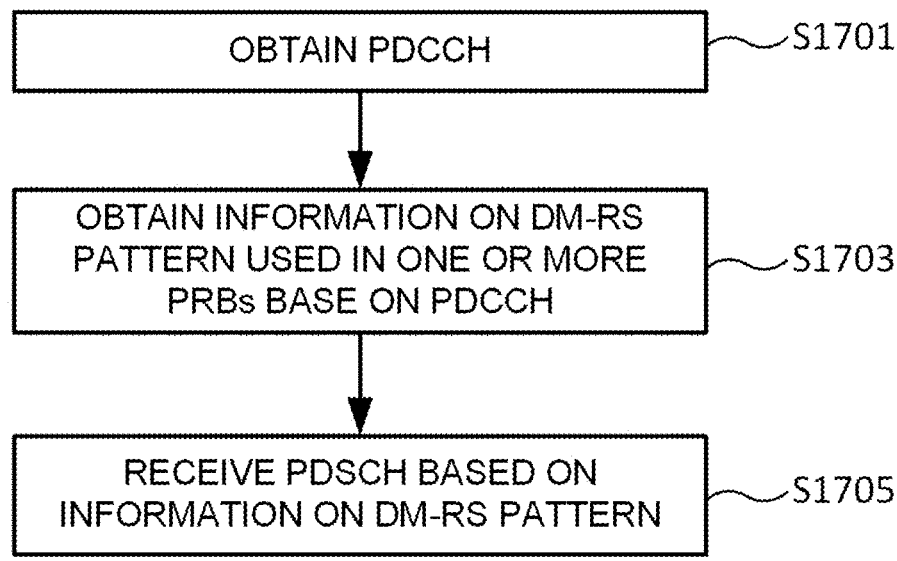
FIG. 17 shows a method of signaling information on a DM-RS pattern to a wireless communication device receiving a DM-RS overlap signal when a wireless communication device according to an embodiment of the present invention transmits a DM-RS overlap signal.

FIG. 17 shows a method for obtaining information on a DM-RS pattern when a wireless communication device according to an embodiment of the present invention receives a DM-RS overlap signal.

The wireless communication device receiving the DM-RS overlap signal receives the PDCCH (S1701). The wireless communication device receiving the DM-RS overlap signal obtains information on the DM-RS pattern used for one or more PRBs based on the PDCCH (S1703). Specifically, a wireless communication device receiving a DM-RS overlap signal may obtain information on a DM-RS pattern used for one or more PRBs from the PDCCH. The wireless communication device receiving the DM-RS overlap signal receives the PDSCH based on the obtained information on the DM-RS pattern (S1705). In this case, the wireless communication device receiving the DM-RS overlap signal may receive the DM-RS for exception signal transmission. The wireless communication device receiving the DM-RS overlap signal may estimate the channel based on the received DM-RS. The wireless communication device receiving the DM-RS overlap signal may demodulate the PDCCH and the PDSCH based on channel estimation.

Figure 18:
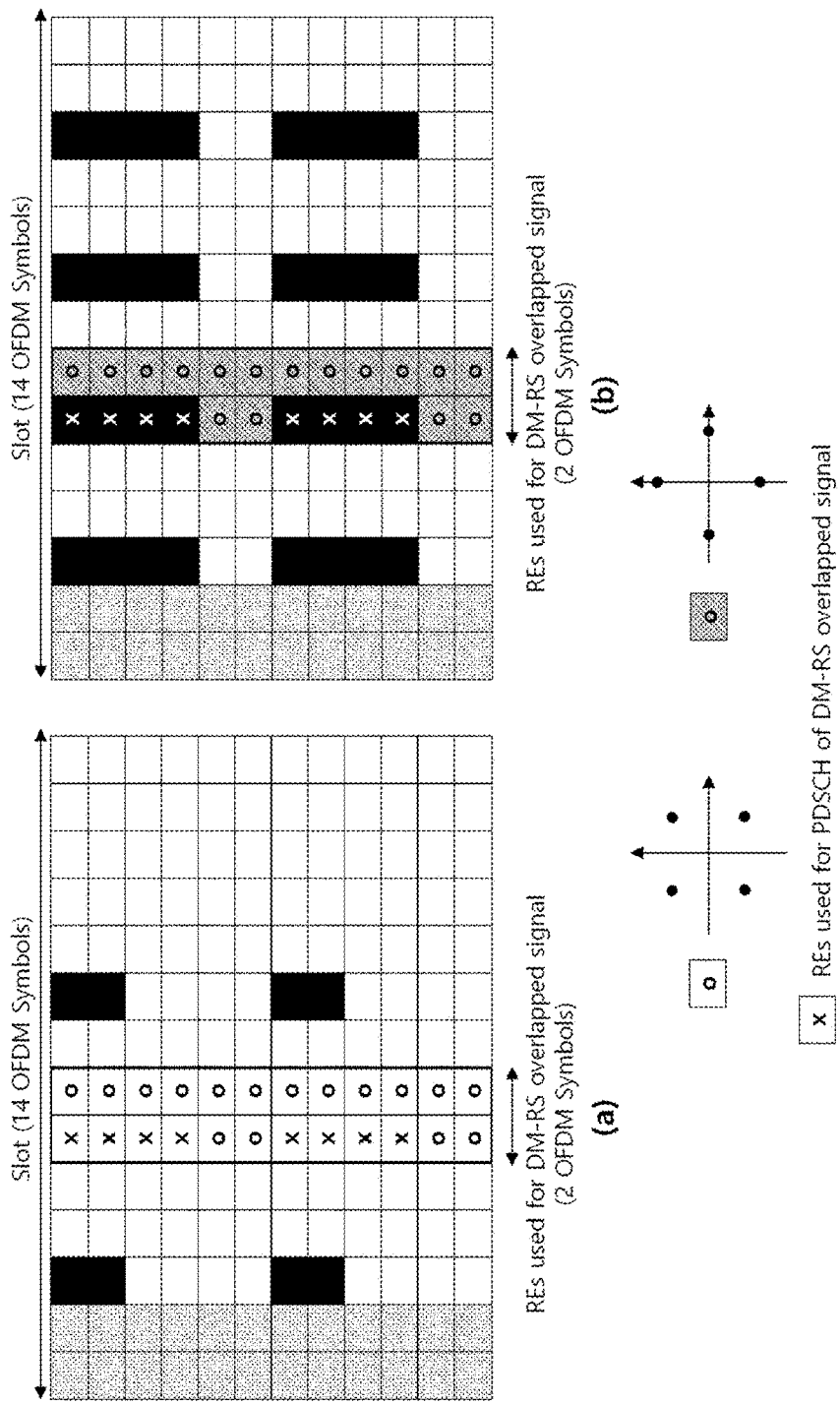
FIG. 18 shows a method of signaling information on a DM-RS pattern to a wireless communication device receiving a DM-RS overlap signal when a wireless communication device according to another embodiment of the present invention transmits a DM-RS overlap signal.

FIG. 18 shows a method of signaling information on a DM-RS pattern to a wireless communication device receiving a DM-RS overlap signal when a wireless communication device according to another embodiment of the present invention transmits a DM-RS overlap signal.

A wireless communication device transmitting a DM-RS overlap signal may signal information on the DM-RS pattern using a constellation phase rotation value of the RE scheduled with the DM-RS overlap signal. Specifically, a wireless communication device transmitting a DM-RS overlap signal may determine a constellation phase rotation value of the RE scheduled with the DM-RS overlap signal depending on the DM-RS pattern used in the scheduled slot of the DM-RS overlap signal. The wireless communication device receiving the DM-RS overlap signal may determine the DM-RS pattern to be used in the slot scheduled with the DM-RS overlap signal based on the constellation phase rotation value of the RE scheduled with the DM-RS overlap signal.

In the embodiment of FIG. 18($a$), the base station sets the constellation phase of the RE scheduled with the URLLC transmission to QPSK to perform the URLLC transmission. Through this, the base station signals that the DM-RS pattern used in the slot scheduled with the URLLC transmission is the first DM-RS pattern. The user equipment determines that the DM-RS pattern used in the slot scheduled with the URLLC transmission is the first DM-RS pattern based on that the constellation phase of the RE scheduled with the URLLC transmission is QPSK. In the embodiment of FIG. 18($b$), the base station sets the constellation phase of the RE scheduled with the URLLC transmission to be rotated by $\pi/4$ in QPSK to perform the URLLC transmission. Through this, the base station signals that the DM-RS pattern used in the slot scheduled with the URLLC transmission is the fourth DM-RS pattern. The user equipment determines that the DM-RS pattern used in the slot scheduled with the RLLC transmission is the fourth DM-RS pattern based on that the constellation phase of the RE scheduled with the URLLC transmission is a value rotated by $\pi/4$ in QPSK.

In the embodiment of FIG. 18($a$), the URLLC user equipment may determine that the constellation phase is QPSK using RE indicated by 'o'. In this case, the user equipment may determine that the first DM-RS pattern of the DM-RS is used and the URLLC transmission is performed to the REs indicated by 'x'. In the embodiment of FIG. 18(b), the URLLC user equipment may determine that the constellation phase is QPSK rotated by $\pi/4$ using RE indicated by 'o'. In this case, the user equipment may determine that the fourth DM-RS pattern is used and the DM-RS is located in the REs indicated by 'x', so that the URLLC transmission is not performed. The user equipment may expect that the DM-RS is not allocated to the RE determining the phase rotation information according to the embodiment of FIG. 18 or the RE indicated by 'o'.

Figure 19:
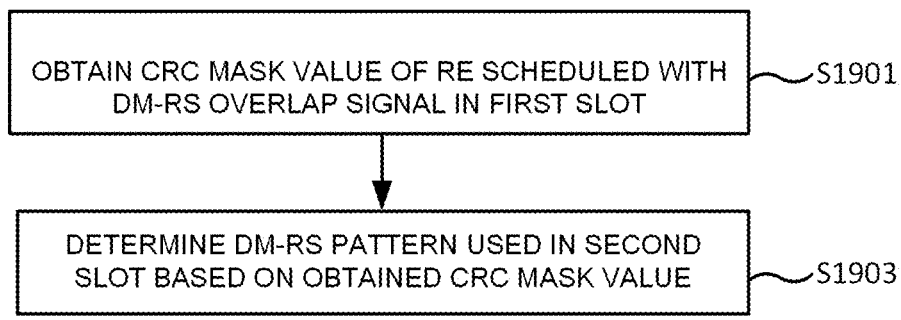
FIG. 19 shows a method of signaling information on a DM-RS pattern to a wireless communication device receiving a DM-RS overlap signal when a wireless communication device according to another embodiment of the present invention transmits a DM-RS overlap signal.

FIG. 19 shows a method of signaling information on a DM-RS pattern to a wireless communication device receiving a DM-RS overlap signal when a wireless communication device according to another embodiment of the present invention transmits a DM-RS overlap signal.

A wireless communication device transmitting a DM-RS overlap signal may signal information on the DM-RS pattern used in the second slot using a cyclic redundancy check (CRC) mask value of the RE scheduled with the DM-RS overlap signal in the first slot. In this case, the first slot, as a slot scheduled with the DM-RS overlap signal, may be a slot positioned before the second slot. Specifically, a wireless communication device transmitting a DM-RS overlap signal may determine a CRC mask value of the RE scheduled with the DM-RS overlap signal in a first slot depending on the DM-RS pattern used in the second slot scheduled with the DM-RS overlap signal. For example, when the DM-RS pattern used in the second slot scheduled with the DM-RS overlap signal is the first DM-RS pattern, the wireless communication device transmitting the DM-RS overlap signal may set the CRC mask value of the RE scheduled with the DM-RS overlap signal to CRC0 in the first slot. When the DM-RS pattern used in the second slot scheduled with the DM-RS overlap signal is the second DM-RS pattern, the wireless communication device transmitting the DM-RS overlap signal may set the CRC mask value of the RE scheduled with the DM-RS overlap signal to CRC1 in the first slot. When the DM-RS pattern used in the second slot scheduled with the DM-RS overlap signal is the third DM-RS pattern, the wireless communication device transmitting the DM-RS overlap signal may set the CRC mask value of the RE scheduled with the DM-RS overlap signal to CRC2 in the first slot. When the DM-RS pattern used in the second slot scheduled with the DM-RS overlap signal is the first DM-RS pattern, the wireless communication device transmitting the DM-RS overlap signal may set the CRC mask value of the RE scheduled with the DM-RS overlap signal to CRC3 in the fourth slot.

The wireless communication device receiving the DM-RS overlap signal may determine the DM-RS pattern to be used in the second slot scheduled with the DM-RS overlap signal based on the CRC mask value of the RE scheduled with the DM-RS overlap signal in the first slot. Specifically, the wireless communication device receiving the DM-RS overlap signal may obtain the CRC mask value of the RE scheduled with the DM-RS overlap signal in the first slot (S1901) and determine the DM-RS pattern used in the second slot based on the obtained CRC mask value (S1903). In this case, the wireless communication device receiving the DM-RS overlap signal can determine which CRC mask value is applied to the RE scheduled with the DM-RS overlap signal in the first slot by applying a plurality of CRC mask values to the RE scheduled with the DM-RS overlap signal in the first slot. When there is no CRC mask matching the RE scheduled with the DM-RS overlap signal in the first slot of the plurality of CRC mask values, the wireless communication device receiving the DM-RS overlap signal may determine that the DM-RS overlap signal in the first slot fails to receive the scheduled RE.

As described above, a wireless communication device transmitting a DM-RS overlap signal may signal a DM-RS pattern having the largest overhead among all DM-RS patterns used in all slots scheduled with the DM-RS overlap signal. Also, a wireless communication device transmitting a DM-RS overlap signal may signal information on a DM-RS pattern used in a plurality of slots scheduled with a DM-RS overlap signal at one time. In addition, the wireless communication device receiving the DM-RS overlap signal may perform a hybrid automatic repeat request (HARQ) process for each slot.

Figure 20:
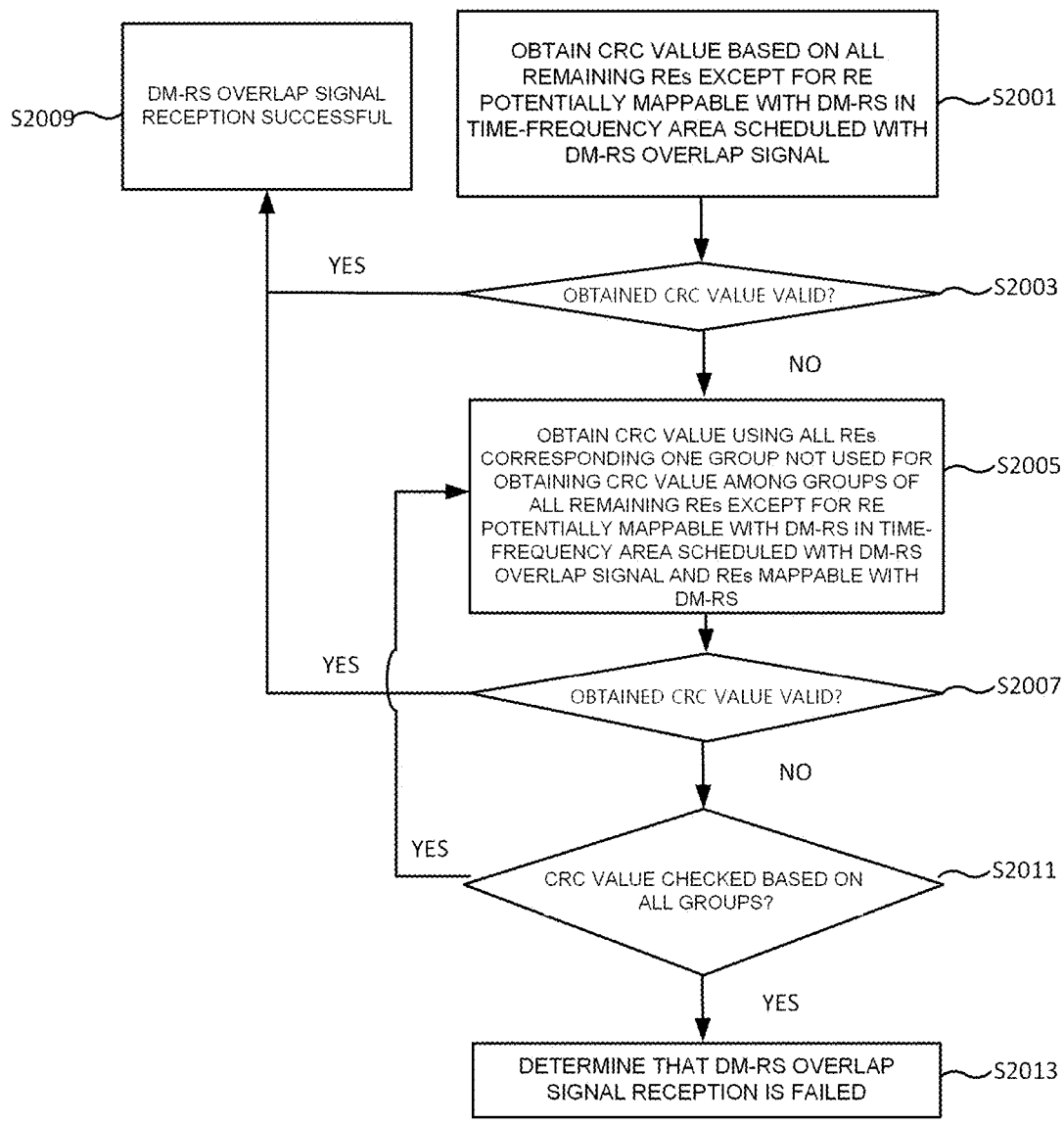
FIG. 20 shows a method for transmitting additional parity bits when a wireless communication device transmits a DM-RS overlap signal according to another embodiment of the present invention.
Figure 21:
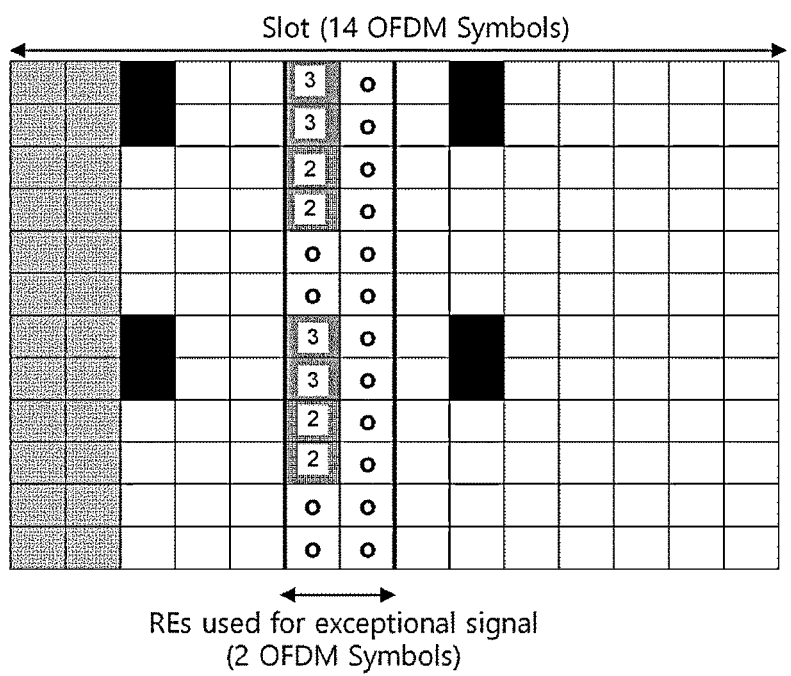
FIG. 21 shows that a user equipment according to another embodiment of the present invention receives a URLLC transmission using an additional parity bit.

FIG. 20 shows a method for transmitting additional parity bits when a wireless communication device transmits a DM-RS overlap signal according to another embodiment of the present invention. FIG. 21 shows that a user equipment according to another embodiment of the present invention receives a URLLC transmission using an additional parity bit.

A wireless communication device transmitting a DM-RS overlap signal may transmit an additional parity bit to the RE scheduled with the DM-RS overlap signal in the slot scheduled with the DM-RS overlap signal. Specifically, the wireless communication device transmitting the DM-RS overlap signal may transmit an additional parity bit to the RE mapped with the DM-RS overlap signal among the REs to which the DM-RS is capable of being potentially mapped in the slot scheduled with the DM-RS overlap signal. The wireless communication device receiving the DM-RS overlap signal may receive the DM-RS overlap signal based on the additional parity bits of the RE to which the DM-RS is capable of being potentially mapped. Specifically, the wireless communication device receiving the DM-RS overlap signal may classify REs, to which DM-RSs are capable of being potentially mapped, into a plurality of groups according to the DM-RS pattern, and determine whether the RE corresponding to each group includes additional parity bits. In this case, the wireless communication device receiving the DM-RS overlap signal may check the CRC value by including an additional parity bit of the RE to which the DM-RS is capable of potentially mapped. If the obtained CRC value, including the additional parity bits of the RE to which the DM-RS is capable of being potentially mapped, is valid, the wireless communication device receiving the DM-RS overlap signal may determine that the DM-RS overlap signal is mapped to the RE to which the DM-RS is capable of being potentially mapped. Specifically, if the obtained CRC value, including the additional parity bits of the RE to which the DM-RS is potentially capable of being mapped, is valid, the wireless communication device receiving the DM-RS overlap signal may determine that the DM-RS overlap signal is mapped according to the DM-RS pattern corresponding to the RE to which the DM-RS is capable of being potentially mapped.

Specifically, a wireless communication device receiving a DM-RS overlap signal may operate as in the embodiment of FIG. 20. In the embodiment of FIG. 20, the wireless communication device receiving the DM-RS overlap signal checks whether a CRC value obtained using all the remaining REs except for the RE to which the DM-RS is capable of being potentially mapped in a time-frequency resource scheduled with a DM-RS overlap signal is valid (S2001, S2003). When the CRC value is not valid, the wireless communication device receiving the DM-RS overlap signal checks whether the CRC value obtained by using all REs corresponding to any one group not used for CRC value acquisition in the group of all the remaining REs except for the REs to which the DM-RS may be mapped and the REs to which the DM-RSs may be mapped is valid (S2005, S2007). The wireless communication device receiving the DM-RS overlap signal may repeat the CRC value check until obtaining a valid CRC value or there is no more group to be checked (S2011, S2005). When the wireless communication device receiving the DM-RS overlap signal fails to obtain a valid CRC value until the check of all groups is completed, the wireless communication device receiving the DM-RS overlap signal may determine that the reception of the DM-RS overlap signal is failed (S2013). When the wireless communication device receiving the DM-RS overlap signal obtains a valid CRC value, the wireless communication device receiving the DM-RS overlap signal may determine that the reception of the DM-RS overlap signal is successful (S2009).

For example, in the embodiment of FIG. 21, a user equipment receiving a URLLC transmission may obtain a CRC value using a RE (RE indicated by 0) except for REs to which DM-RS is capable of being potentially mapped in a time-frequency resource scheduled with the URLLC transmission and determines whether the obtained CRC value is valid. If the obtained CRC value is valid, the user equipment determines that the URLLC transmission is successfully received. If the obtained CRC value is not valid, the user equipment obtains the CRC value using all REs except for the REs to which the DM-RS may be potentially mapped and all REs (REs indicated by 2) corresponding to the first group in a time-frequency resource scheduled with URLLC transmission, and determines whether the obtained CRC value is valid (second decoding). If the obtained CRC value is valid, the user equipment determines that the URLLC transmission is successfully received. If the obtained CRC value is not valid, the user equipment obtains the CRC value using all REs except for the REs to which the DM-RS may be potentially mapped and all REs (REs indicated by 3) corresponding to the second group in a time-frequency resource scheduled with URLLC transmission, and determines whether the obtained CRC value is valid (third decoding). If the obtained CRC value is valid, the user equipment determines that the URLLC transmission is successfully received. If the obtained CRC value is not valid, the user equipment determines that the reception of the URLLC transmission fails.

Figure 22:
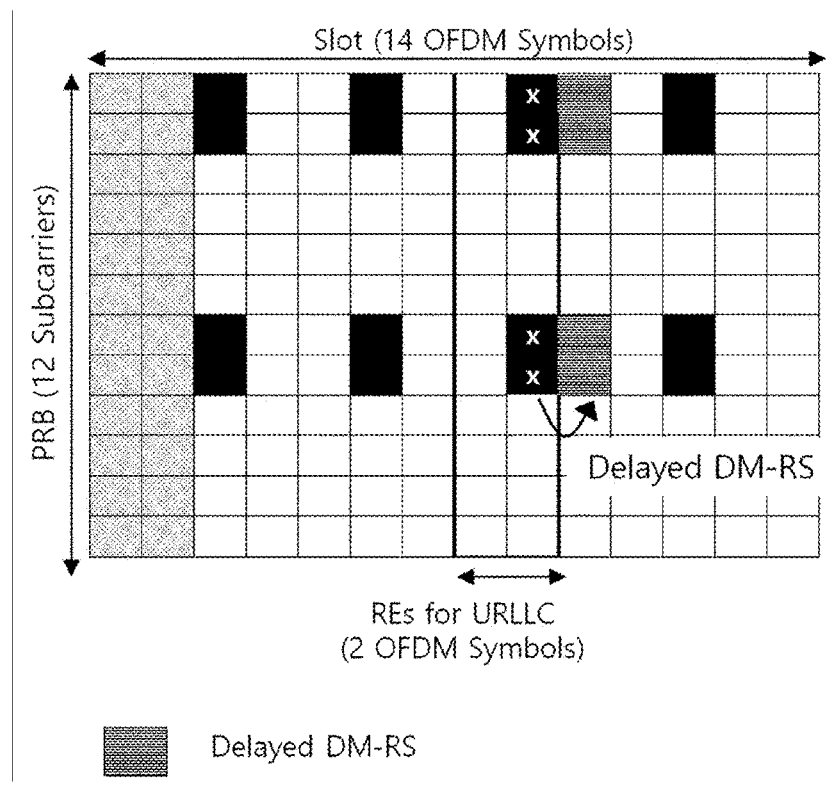
FIG. 22 shows that when a DM-RS overlap resource is present, a base station according to an embodiment of the present invention transmits a DM-RS through a time-different frequency resource from a time-frequency resource mapped to DM-RS transmission.

An embodiment, in which a wireless communication device uses a time-frequency resource mapped to DM-RS transmission as a DM-RS overlap resource when a DM-RS overlap resource is present, is described from FIG. 22.

FIG. 22 shows that when a DM-RS overlap resource is present, a base station according to an embodiment of the present invention transmits a DM-RS through a time-frequency resource other than a time-frequency resource mapped to DM-RS transmission.

A wireless communication device transmitting a DM-RS overlap signal may transmit the DM-RS in a time-frequency resource different from the time-frequency resource mapped to the DM-RS transmission. Specifically, the wireless communication device may use the time-frequency resource mapped to the DM-RS transmission as a DM-RS overlap resource, and transmit the DM-RS in a time-frequency resource different from the time-frequency resource mapped to the DM-RS transmission. In this case, the wireless communication device may transmit the DM-RS in the OFDM symbol immediately after the OFDM symbol mapped with the DM-RS overlap resource. In addition, the wireless communication device may transmit the DM-RS using a subcarrier corresponding to a time-frequency resource mapped to DM-RS transmission. Also, the wireless communication device may transmit the same DM-RS sequence as the punctured DM-RS sequence due to the DM-RS overlap resource.

When there is a DM-RS overlap resource, the wireless communication device expecting to receive the DM-RS may not expect to receive the DM-RS from resource elements overlapping with the DM-RS overlap resources in the time-frequency resources mapped to transmission of the DM-RS. In addition, when there is a DM-RS overlap resource, a wireless communication device expecting to receive a DM-RS may monitor the DM-RS in an OFDM symbol after transmission for a DM-RS overlap resource.

Specifically, when there is a DM-RS overlap resource, a wireless communication device expecting to receive a DM-RS may monitor the DM-RS in an OFDM symbol after a DM-RS overlap resource. In a specific embodiment, when there is a DM-RS overlap resource, a wireless communication device expecting to receive a DM-RS may monitor the DM-RS in an OFDM symbol located immediately after the OFDM symbol mapping the DM-RS overlap signal. In addition, when there is a DM-RS overlap resource, a wireless communication device expecting to receive a DM-RS may monitor the DM-RS on subcarriers corresponding to the time-frequency resources mapped to the DM-RS transmission.

In the embodiment of FIG. 22, the base station punctures the DM-RS in a time-frequency resource mapped to DM-RS transmission and performs a URLLC transmission. Specifically, the base station punctures the DM-RS in the ninth OFDM symbol mapped to DM-RS transmission. A UE expecting to receive a DM-RS does not receive a DM-RS in the ninth OFDM symbol mapped to DM-RS transmission and detects a URLLC transmission. Then, the user equipment expecting to receive a DM-RS monitors the DM-RS in a subcarrier corresponding to a time-frequency resource mapped to DM-RS transmission. The base station transmits the same DM-RS sequence as the punctured DM-RS sequence in the ninth OFDM symbol in the tenth OFDM symbol of the subcarrier corresponding to the time-frequency resource mapped to DM-RS transmission. The user equipment receives the DM-RS from the tenth OFDM symbol of the subcarrier corresponding to the time-frequency resource mapped to DM-RS transmission.

Figure 23:
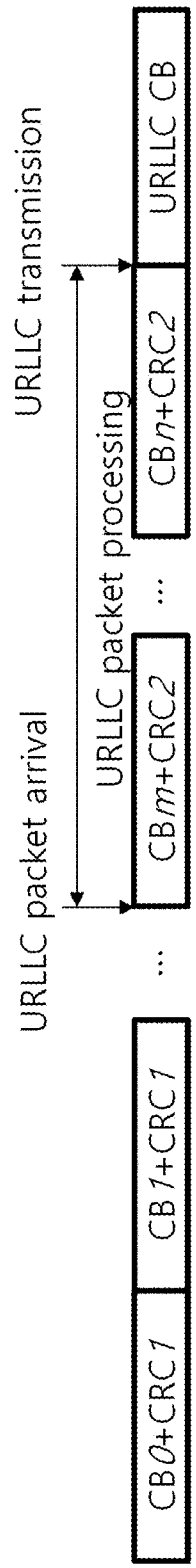
FIG. 23 shows a method of a base station to signal information on different time-frequency resources when a base station according to an embodiment of the present invention transmits a DM-RS through a different time-frequency resource from a time-frequency resource mapped to DM-RS transmission.

FIG. 23 shows a method of a base station to signal information on different time-frequency resources when a base station according to an embodiment of the present invention transmits a DM-RS through a time-frequency resource other than a time-frequency resource mapped to DM-RS transmission.

The wireless communication device may signal that the DM-RS is transmitted through a time-frequency resource other than the time-frequency resource mapped to the DM-RS transmission using the CRC value of the code block (CB). Specifically, when a DM-RS is transmitted in a time-frequency resource mapped to DM-RS transmission, the wireless communication device may transmit the CB using the first CRC mask. In this case, when the DM-RS is transmitted in a different time-frequency resource without being transmitted in the mapped time-frequency resource due to the DM-RS overlap resource, the wireless communication device transmits the CB using the second CRC mask so that it is possible to signal that the DM-RS is transmitted through a time-frequency resource other than the time-frequency resource mapped to the DM-RS transmission. A wireless communication device expecting to receive a DM-RS may determine that the DM-RS is transmitted through a time-frequency resource other than the time-frequency resource mapped to DM-RS transmission based on the CRC mask of the CB. Specifically, when a wireless communication device expecting to receive a DM-RS receives a CB using a first CRC mask, the wireless communication device expecting to receive a DM-RS may determine that the DM-RS is transmitted through a time-frequency resource mapped to DM-RS transmission. When a wireless communication device expecting to receive a DM-RS receives a CB using a second CRC mask, the wireless communication device expecting to receive a DM-RS may determine that the DM-RS is transmitted through a time-frequency resource other than the time-frequency resource mapped to DM-RS transmission.

In the embodiment of FIG. 23, until the URLLC packet reaches the base station, the base station transmits the CB using the first CRC mask CRC1. After the URLLC packet reaches the base station, the base station transmits the CB using the second CRC mask CRC2 to signal that the DM-RS is transmitted through a time-frequency resource other than the time-frequency resource mapped to DM-RS transmission. Specifically, until the base station transmits the URLLC packet, the base station may transmit the CB using the second CRC mask CRC2.

Figure 24:
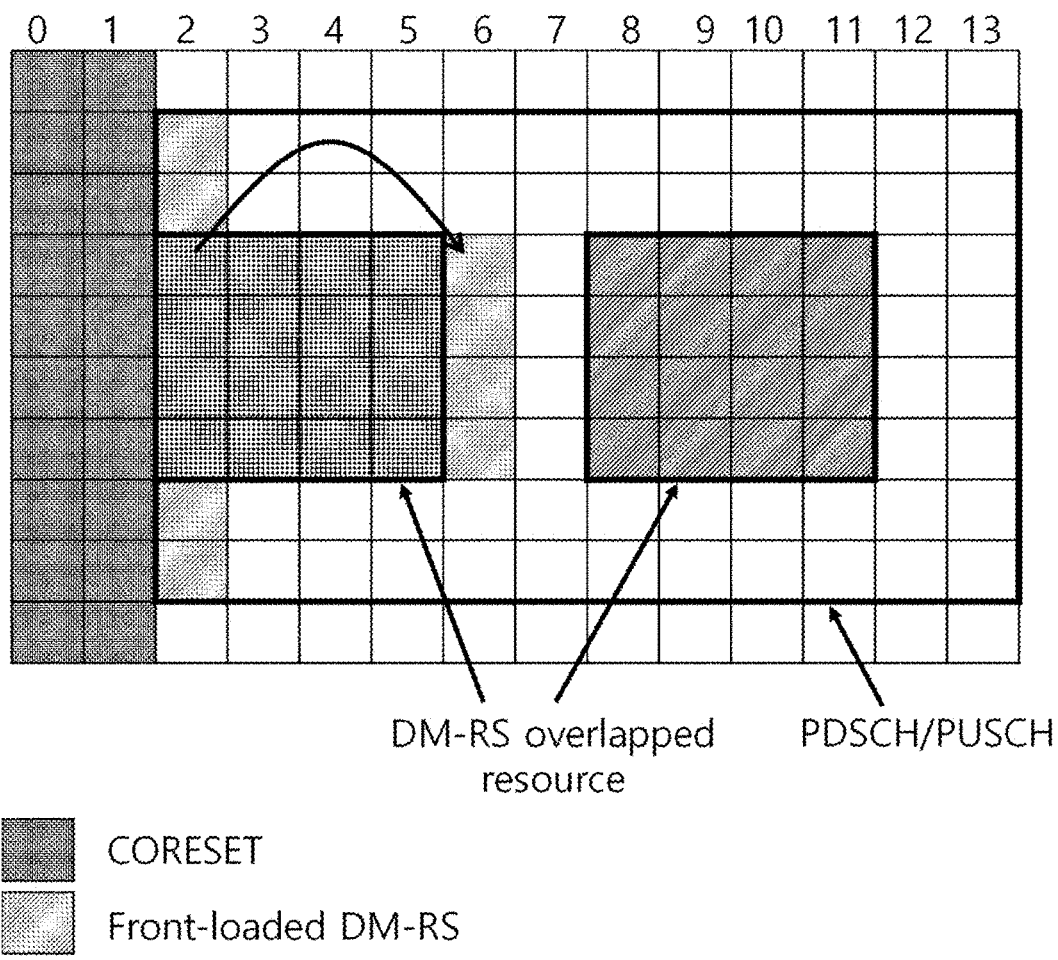
FIG. 24 shows a method of a wireless communication device to determine a different time frequency resource from a time-frequency resource mapped to DM-RS transmission when a wireless communication device according to an embodiment of the present invention transmits a DM-RS through the different time-frequency resource.

FIG. 24 shows a method of a wireless communication device to determine other time frequency resources when a wireless communication device according to an embodiment of the present invention transmits a DM-RS through a time-frequency resource other than a time-frequency resource mapped to DM-RS transmission.

When there is a DM-RS overlap resource, the wireless communication device may transmit DM-RS using a time-frequency resource that is different from a time-frequency resource mapped to DM-RS transmission and does not overlap with the DM-RS overlap resource. Specifically, the wireless communication device punctures the DM-RS corresponding to the RE overlapped with the DM-RS overlap resource, and uses the time-frequency resource different from the time-frequency resource mapped to the DM-RS transmission to transmit the punctured DM-RS. For convenience of description, the DM-RS corresponding to the RE overlapped with the DM-RS overlap resource is referred to as an overlap part of the DM-RS. In this case, the wireless communication device may transmit the DM-RS overlap part using resources located after the DM-RS overlap resource. Specifically, the wireless communication device may transmit the overlap part of the punctured DM-RS using the RE immediately after the RE mapped to the DM-RS overlap resource. In a specific embodiment, the wireless communication device may transmit the overlap part of the punctured DM-RS that is not transmitted due to the DM-RS overlap resource in the third OFDM symbol (index: 2) in the seventh OFDM symbol (index: 6).

When there is a DM-RS overlap resource, the wireless communication device expecting DM-RS reception may not expect to receive the DM-RS in the DM-RS overlap part. Also, when there is a DM-RS overlap resource, a wireless communication device expecting to receive a DM-RS may monitor the time-frequency resource that is different from the time-frequency resource mapped to DM-RS transmission and does not overlap with DM-RS overlap resources to receive a DM-RS. Specifically, a wireless communication device expecting to receive a DM-RS may monitor the DM-RS overlap part in a resource located after the DM-RS overlap resource. In a specific embodiment, a wireless communication device expecting to receive a DM-RS may monitor the DM-RS overlap part in the RE immediately after the RE mapped to the DM-RS overlap resource.

A wireless communication device expecting to receive a DM-RS may receive the DM-RS from the time-frequency resource that is different from the time-frequency resource mapped to DM-RS transmission and does not overlap with the DM-RS overlap resource. As also described above, the user equipment may also determine a presence of a DM-RS overlap resource based on the L1 signaling and the RRC signal. Specifically, the user equipment may determine a time-frequency resource mapped with the DM-RS overlap resource based on at least one of the L1 signaling and the RRC signal. In this case, the L1 signaling refers to signaling for signaling information on the physical layer, and may include downlink control information (DCI) and physical control channel (PDCCH). In another specific embodiment, the time-frequency resource where the DM-RS overlap resource is scheduled may be predetermined. In this case, the user equipment may determine the time-frequency resource where the DM-RS overlap resource is mapped without obtaining additional signaling information.

In the embodiment described above, the DM-RS may be a front-loaded DM-RS.

In the embodiment of FIG. 24, the base station punctures the overlap part of the DM-RS that is front-loaded, and uses the RE corresponding to the overlap part of the punctured DM-RS as the DM-RS overlap resource. The base station transmits the punctured DM-RS using the seventh (OFDM symbol index: 6) OFDM symbol of the PRB and the subcarrier mapped with the punctured DM-RS. The user equipment monitors the DM-RS overlap part in the OFDM symbol located immediately after the DM-RS overlap resource in the subcarrier mapped with the punctured DM-RS.

Figure 25:
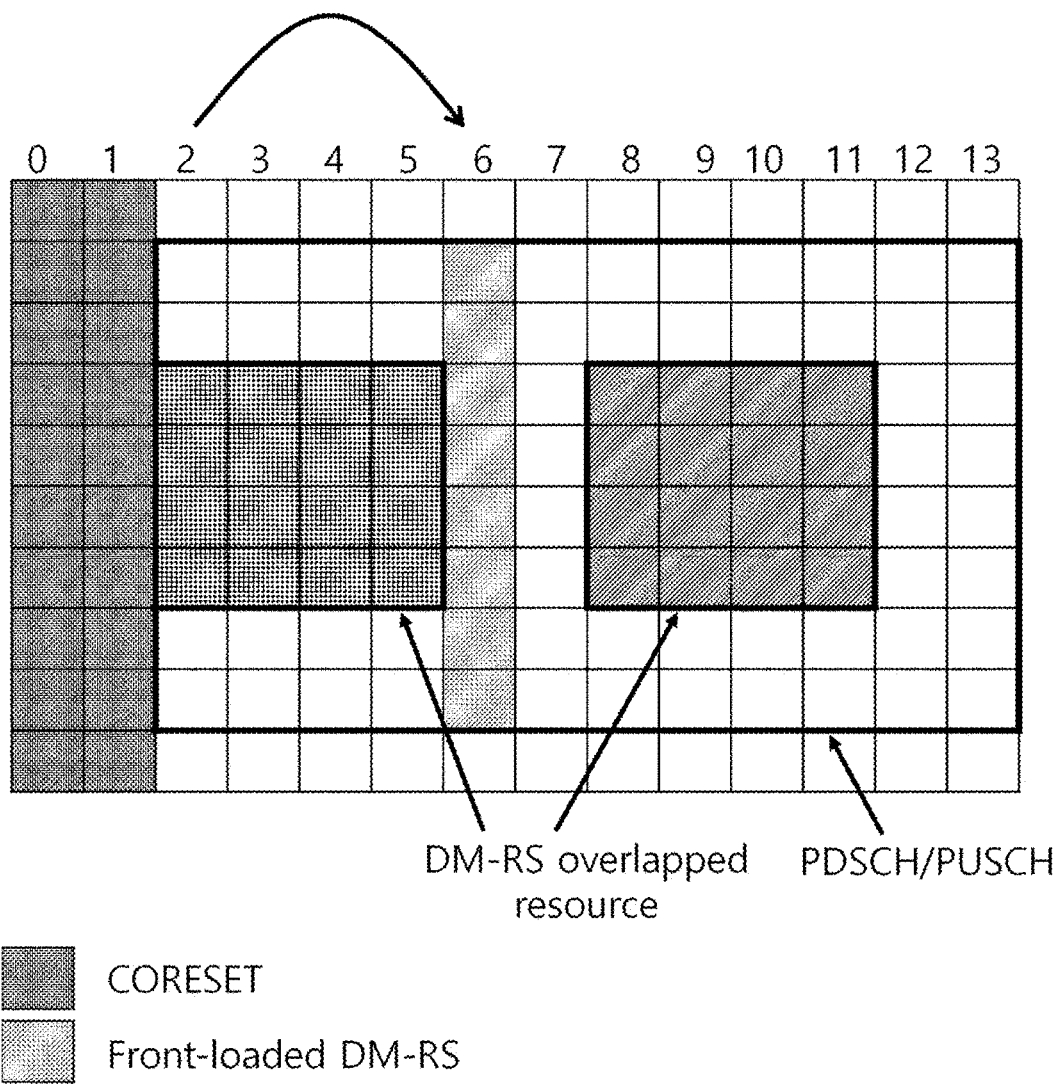
FIG. 25 shows a method of a wireless communication device to determine different time frequency resource from a time-frequency resource mapped to DM-RS transmission when a wireless communication device according to an embodiment of the present invention transmits a DM-RS through the different time-frequency resource.

FIG. 25 shows a method of a wireless communication device to determine other time frequency resources when a wireless communication device according to an embodiment of the present invention transmits a DM-RS through a time-frequency resource other than a time-frequency resource mapped to DM-RS transmission.

In the embodiment described with reference to FIG. 24, a method in which a wireless communication device punctures the DM-RS corresponding to the RE overlapping with the DM-RS overlap resource, and transmits the overlap part of the punctured DM-RS using a time-frequency resource other than the time-frequency resource mapped to DM-RS transmission was described. The wireless communication device may puncture the DM-RS mapped to the RE corresponding to the same OFDM symbol index as the OFDM symbol index of the RE overlapping with the DM-RS overlap resource in the time-frequency resource mapped to the DM-RS transmission. In this case, the wireless communication device may transmit a DM-RS mapped to the same OFDM symbol index as the OFDM symbol index of the RE where the overlap part of the DM-RS is punctured in addition to the overlap part of the DM-RS using a time-frequency resource other than the time-frequency resource mapped to DM-RS transmission.

When there is a DM-RS overlap resource, a wireless communication device waiting for DM-RS reception may not expect DM-RS reception in the RE corresponding to the same OFDM symbol index as the OFDM symbol index of the RE overlapping with DM-RS overlap resource. In this case, the wireless communication device can monitor the DM-RS mapped to the RE corresponding to the same OFDM symbol index as the OFDM symbol index of the RE overlapping with the DM-RS overlap resource in the resource located after the DM-RS overlap resource. Specifically, the wireless communication device may monitor the DM-RS mapped to the RE corresponding to the same OFDM symbol index as the OFDM symbol index of the RE overlapping with the DM-RS overlap resource in the OFDM symbol located immediately after the RE mapped to the DM-RS overlap resource.

Other operations of the wireless communication device may be the same as those in the embodiment described with reference to FIG. 24. In addition, the wireless communication device may transmit a PDSCH or a PUSCH using an RE to which a DM-RS other than the overlap part of the DM-RS is mapped.

In the embodiment of FIG. 25, the base station changes the location of the front-loaded DM-RS and transmits the front-loaded DM-RS when a part of REs of the front-loaded DM-RS overlap with the DM-RS overlap resources. The base station may transmit the front-loaded DM-RS using the REs corresponding to the seventh (OFDM symbol index: 6) OFDM symbol of the PRB. Specifically, the base station transmits the front-loaded DM-RS using the RE corresponding to the seventh (OFDM symbol index: 6) OFDM symbol.

In the embodiments described with reference to FIGS. 24 to 25, the wireless communication device may transmit the front-loaded DM-RS using the RE mapped to additional DM-RS transmission. Specifically, the wireless communication device may transmit the DM-RS that is not transmitted due to the DM-RS overlap resource as the front-loaded DM-RS using a RE mapped to additional DM-RS transmissions.

Figure 26:
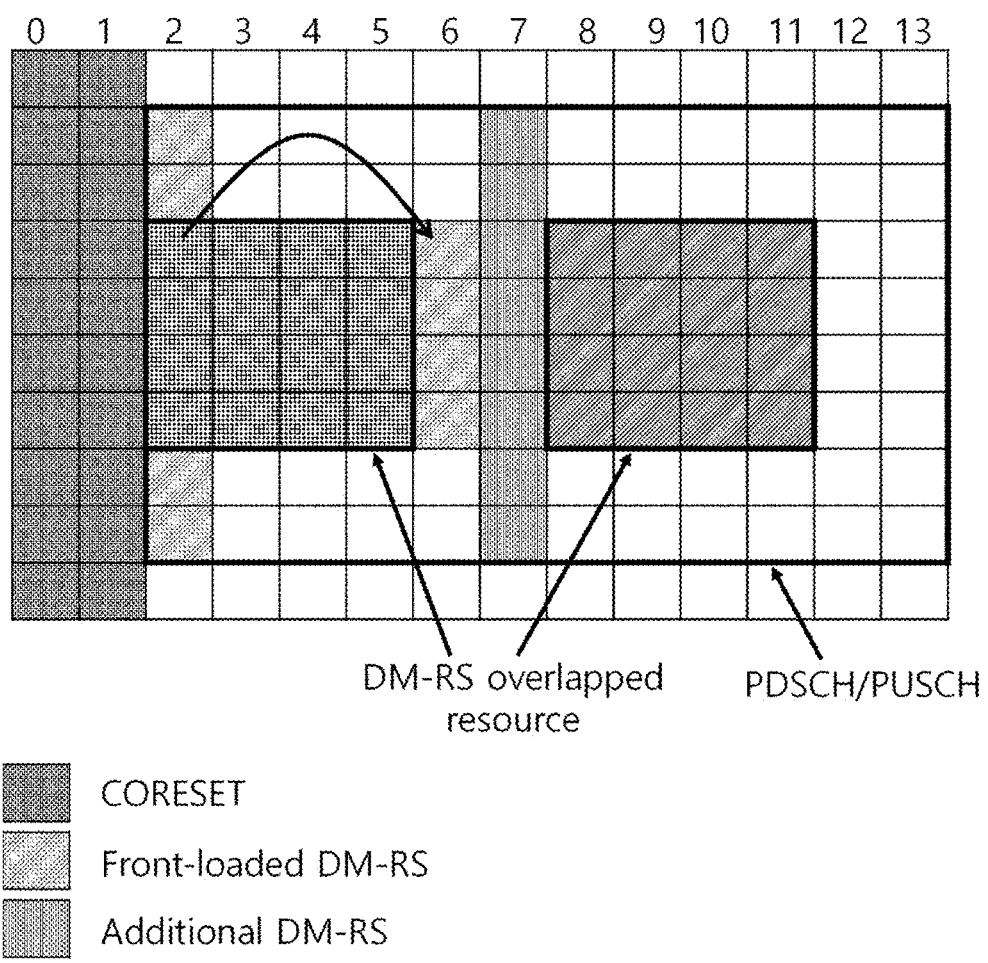
FIG. 26 shows that a wireless communication device transmits an additional DM-RS when a wireless communication device according to an embodiment of the present invention transmits a DM-RS through a different time-frequency resource from a time-frequency resource mapped to DM-RS transmission.

FIG. 26 shows a method of a wireless communication device to transmit an additional DM-RS when a wireless communication device according to an embodiment of the present invention transmits a DM-RS through a time-frequency resource other than a time-frequency resource mapped to DM-RS transmission.

In the embodiments described with reference to FIGS. 24 to 25, the wireless communication device may transmit an additional DM-RS following the front-loaded DM-RS. In this case, the wireless communication device may determine the location of the RE mapped with the front-loaded DM-RS, regardless of the location of the RE mapped with the additional DM-RS. Specifically, the wireless communication device may determine the location of the RE to which the front-loaded DM-RS is mapped according to the embodiment described with reference to FIGS. 24 to 25. Also, the wireless communication device may determine the location of the RE to which the additional DM-RS is mapped, regardless of the location of the RE mapped to the front-loaded DM-RS. Specifically, the wireless communication device may transmit an additional DM-RS using the RE immediately after the RE to which the DM-RS overlap resource is mapped. In a specific embodiment, the wireless communication device may transmit an additional DM-RS using an OFDM symbol transmitted immediately after the DM-RS overlap resource.

In addition, the wireless communication device may signal the location of the RE to which the additional DM-RS is mapped using the L1 signaling or the RRC signal. A wireless communication device expecting a DM-RS reception may receive an additional DM-RS based on the L1 signaling or the RRC signal. Specifically, the wireless communication device expecting to receive a DM-RS may obtain the location of an RE to which an additional DM-RS is mapped based on the L1 signaling or the RRC signal, and receive an additional DM-RS based on the obtained location of the RE.

In the embodiment of FIG. 26, the base station punctures the overlap part of the front-loaded DM-RS, and uses it as a DM-RS overlap resource instead of the punctured overlap part of the DM-RS. The base station transmits the punctured overlap part of the DM-RS using the seventh (OFDM symbol index: 6) OFDM symbol of the PRB and the subcarrier to which the punctured overlap part of the DM-RS is mapped. Further, the base station transmits the additional DM-RS using the REs of the PRB corresponding to the eighth OFDM symbol index (OFDM symbol index: 7). In the embodiment of FIG. 26, when the base station determines to puncture the overlap part of the front-loaded DM-RS and to use the RE mapped with the punctured overlap part of the DM-RS as the DM-RS overlap resource, the base station may determine to use the RE to which the overlap part of the punctured DM-RS is mapped as the DM-RS overlap resource regardless of whether or not an additional DM-RS is allocated to the slot.

Figure 27:
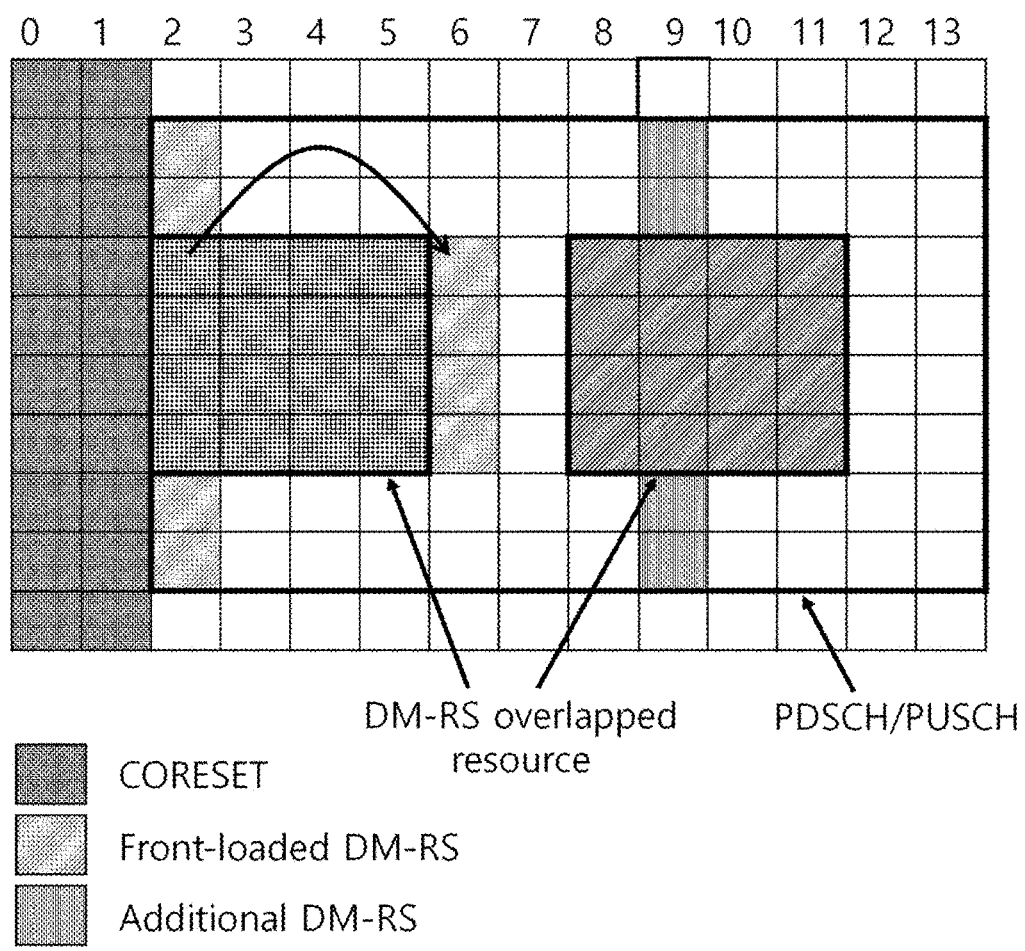
FIG. 27 shows that a wireless communication device transmits an additional DM-RS when a wireless communication device according to another embodiment of the present invention transmits a DM-RS through a different time-frequency resource from a time-frequency resource mapped to DM-RS transmission.

FIG. 27 shows a method of a wireless communication device to transmit an additional DM-RS when a wireless communication device according to another embodiment of the present invention transmits a DM-RS through a time-frequency resource other than a time-frequency resource mapped to DM-RS transmission.

When the front-loaded DM-RS overlaps with the DM-RS overlap resource, the wireless communication device may puncture the overlap part of the front-loaded DM-RS. In this case, the wireless communication device may transmit the punctured overlap part of the DM-RS using a time-frequency resources that is different from the time-frequency resource mapped to DM-RS transmission and does not overlap with DM-RS overlap resources. Also, when the additional DM-RS overlaps with the DM-RS overlap resource, the wireless communication device may puncture the overlap part of the additional DM-RS. In this case, the wireless communication device may not transmit the punctured overlap part of the additional DM-RS. Other operations of the wireless communication device may be the same as those in the embodiments described with reference to FIGS. 24 to 26.

In the embodiment of FIG. 27, the base station punctures the overlap part of the front-loaded DM-RS, and uses the RE mapped to the punctured overlap part of the DM-RS as a DM-RS overlap resource. The base station transmits the punctured overlap part of the DM-RS using the seventh (OFDM symbol index: 6) OFDM symbol of the PRB and the subcarrier to which the punctured overlap part of the DM-RS is mapped. Also, the base station punctures the overlap part of the additional DM-RS and uses the RE mapped to the punctured overlap part of the additional DM-RS as the DM-RS overlap resource. In this case, the base station does not transmit the punctured overlap part of the additional DM-RS.

Figure 28:
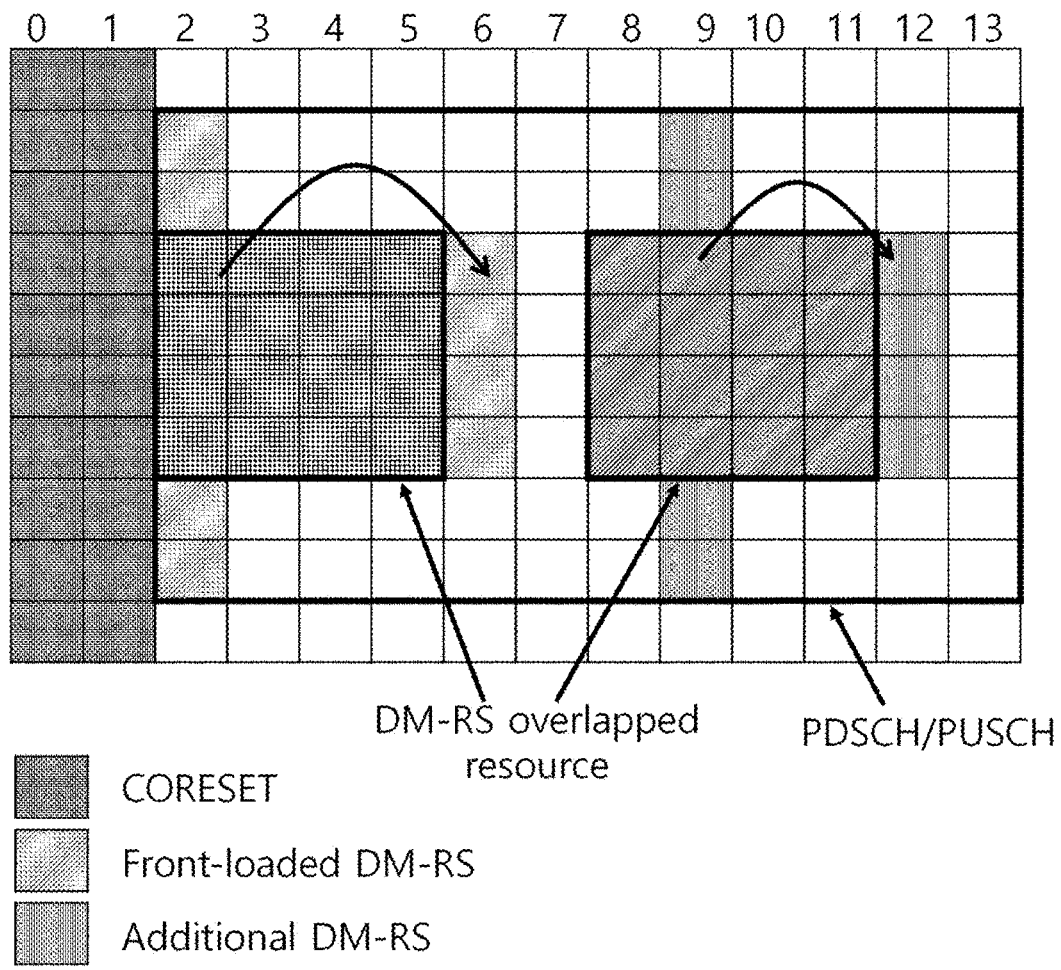
FIG. 28 shows that a wireless communication device according to an embodiment of the present invention transmits an additional DM-RS through a different time-frequency resource from a time-frequency resource mapped to DM-RS transmission.

FIG. 28 shows that a wireless communication device according to an embodiment of the present invention transmits an additional DM-RS through a time-frequency resource other than a time-frequency resource mapped to DM-RS transmission.

In the embodiment described with reference to FIG. 27, when the additional DM-RS overlaps with the DM-RS overlap signal, the wireless communication device may puncture the overlap part of the additional DM-RS. In this case, the wireless communication device may transmit the punctured overlap part of the additional DM-RS using a time-frequency resource that is different from the time-frequency resource mapped to DM-RS transmission and does not overlap with DM-RS overlap resources. Other operations of the wireless communication device may be the same as those in the embodiments described with reference to FIGS. 24 to 27.

In the embodiment of FIG. 28, the base station punctures the overlap part of the front-loaded DM-RS, and uses the RE mapped to the punctured overlap part of the DM-RS as a DM-RS overlap resource. The base station transmits the punctured overlap part of the DM-RS using the seventh (OFDM symbol index: 6) OFDM symbol of the PRB and the subcarrier to which the punctured overlap part of the DM-RS is mapped. Also, the base station punctures the overlap part of the additional DM-RS and uses the RE mapped to the punctured overlap part of the additional DM-RS as the DM-RS overlap resource. In this case, the base station transmits the punctured overlap part of the additional DM-RS using the thirteenth (OFDM symbol index: 12) OFDM symbol of the PRB and the subcarrier to which the overlap part of the additional DM-RS is mapped.

The wireless communication device may puncture the overlap part of the DM-RS overlapping with the DM-RS overlap resource, and may not transmit the punctured overlap part of the DM-RS. This will be described with reference to FIGS. 29 to 33.

Figure 29:
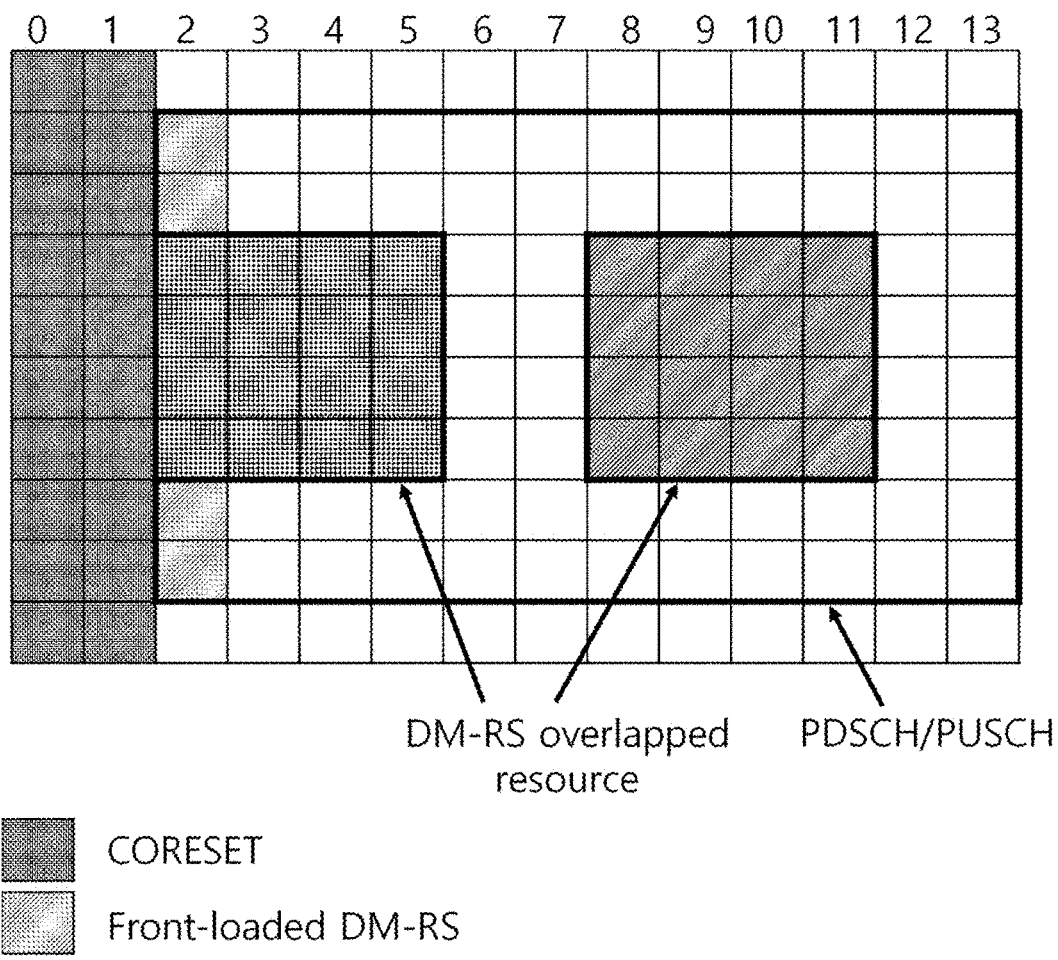
FIG. 29 shows that a wireless communication device according to an embodiment of the present invention punctures an overlap part of a DM-RS overlapping with a DM-RS overlapped resource and does not transmit the punctured overlap part of the DM-RS.

FIG. 29 shows that a wireless communication device according to an embodiment of the present invention punctures the overlap part of the DM-RS overlapping with the DM-RS overlap resource, and does not transmit the punctured overlap part of the DM-RS.

The wireless communication device may puncture the overlap part of the DM-RS overlapping with the DM-RS overlap resource, and may not transmit the punctured overlap part of the DM-RS. In this case, the wireless communication device expecting to receive the DM-RS may receive the unpunctured DM-RS and demodulate the data channel based on the received DM-RS. Specifically, a wireless communication device expecting to receive a DM-RS may estimate a channel based on the received DM-RS, and demodulate the data channel based on channel estimation. In a specific embodiment, the wireless communication device expecting to receive a DM-RS may demodulate a data channel included in the punctured PRB of the DM-RS based on the unpunctured DM-RS.

Also, the wireless communication device may not transmit a data channel for a wireless communication device that receives the corresponding DM-RS to the PRB where the DM-RS is punctured. A wireless communication device expecting to receive a DM-RS may assume that the data channel is not transmitted through the PRB where the DM-RS is punctured. In this case, as described above, the PRB may include 12 subcarriers and 14 OFDM symbols in one slot.

The wireless communication device may receive the data channel based on the signal quasi-co-located with the port of the DM-RS punctured to the corresponding PRB. In this case, the signal that is quasi-co-located with the port of the DM-RS may be a DM-RS overlap signal. In a specific embodiment, the wireless communication device may receive a data channel based on a DM-RS overlap signal instead of the DM-RS. Before describing this in detail, the concept of quasi-co-locate will be described first.

The user equipment may receive data from a plurality of transmission points (TP). In addition, the user equipment may receive data transmitted from one TP through one or a plurality of beams. Data transmitted from each of the plurality of TPs or each of the plurality of beams may be transmitted through channels which are different from each other. Accordingly, the user equipment may estimate the channel state for each of a plurality of channels. In this case, the user equipment may treat one or a plurality of antennas using the same channel estimation value as one antenna port. In this case, the antenna port is an abstract concept and may be distinguished from the antenna, which is a physical concept. Also, different reference signals may be used for each antenna port. The wireless communication device may obtain information on the channel state corresponding to one antenna port from the information on the channel state corresponding to the antenna port quasi-co-located with the corresponding antenna port. In this case, the information on the channel state may be information on a large-scale property. More specifically, the information on the channel state includes information on at least one of a delay spread, a Doppler spread, a Doppler shift, an average gain, and an average delay. In addition, the user equipment may not infer information on the channel state corresponding to another antenna port that is not quasi-co-located, from the information on the channel state corresponding to one antenna port.

Specifically, a wireless communication device expecting to receive a DM-RS may perform channel estimation based on a DM-RS overlap signal instead of a DM-RS. In a specific embodiment, a wireless communication device expecting to receive a DM-RS may determine that the DM-RS overlap signal is quasi-co-located with the port of the DM-RS. Specifically, the wireless communication device may demodulate the data channel based on the PSS or SSS of the transmitted SS/PBCH block or the DM-RS of the PBCH instead of the DM-RS for data channel transmission/reception. In this case, the wireless communication device may determine that the PSS or SSS of the SS/PBCH block is quasi-co-located with the port of the punctured DM-RS. In addition, the wireless communication device may demodulate the data channel based on the DM-RS of the PBCH transmitted instead of the DM-RS. In this case, the wireless communication device may determine that the DM-RS of the PBCH is quasi-co-located with the port of the punctured DM-RS.

Also, the wireless communication device may transmit information indicating a signal quasi-co-located with the port of the punctured DM-RS. Specifically, the wireless communication device may transmit information indicating a signal quasi-co-located with the port of the DM-RS to the DCI of the PDCCH. Thus, the wireless communication device may indicate that the punctured DM-RS and DM-RS overlap signals are quasi-co-located.

The above-described data channel may be either a PDSCH or a PUSCH.

In the embodiment of FIG. 29, the base station punctures the overlap part of the front-loaded DM-RS, and transmits a DM-RS overlap signal instead of the punctured overlap part of the DM-RS. The user equipment receives the PDSCH based on the DM-RS overlap signal. Specifically, the user equipment performs channel estimation based on the DM-RS overlap signal, and demodulates the data channel based on the channel estimation.

Figure 30:
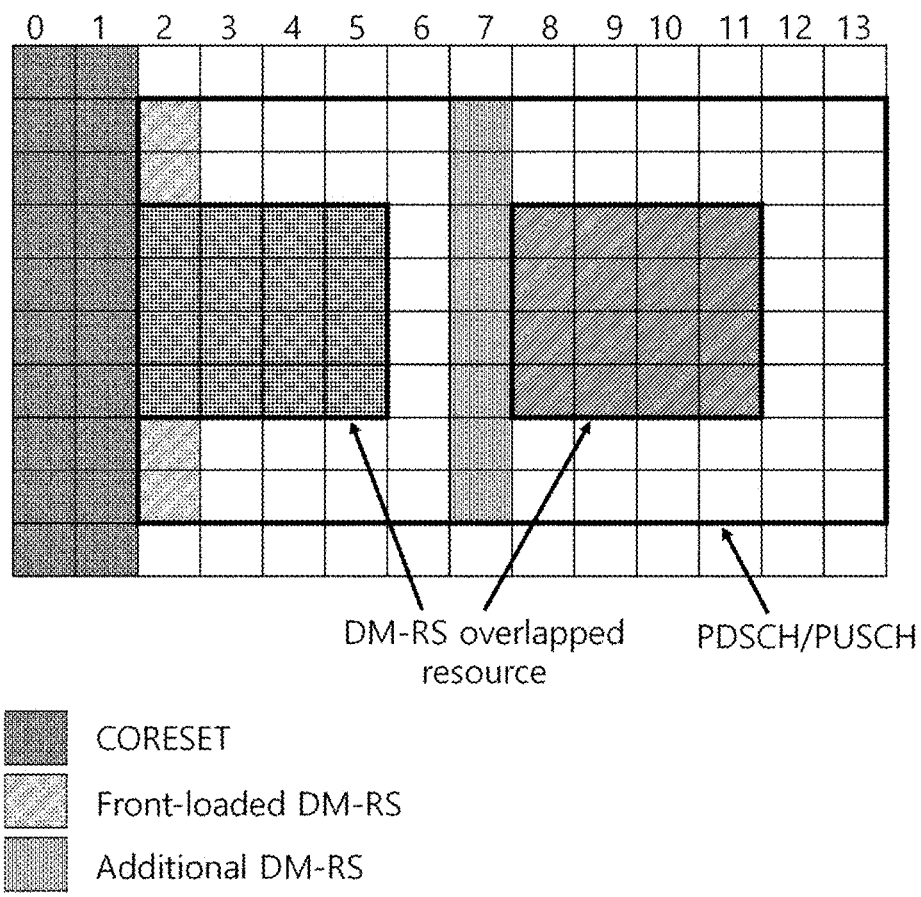
FIG. 30 shows that a wireless communication device according to an embodiment of the present invention punctures an overlap part of a DM-RS overlapping with a DM-RS overlapped resource and does not transmit the punctured overlap part of the DM-RS.

FIG. 30 shows that a wireless communication device according to an embodiment of the present invention punctures the overlap part of the DM-RS overlapping with the DM-RS overlap resource, and does not transmit the punctured overlap part of the DM-RS.

When additional DM-RS transmissions of the wireless communication device are scheduled and scheduled additional DM-RS transmissions are available, the wireless communication device may puncture the overlap part of the front-loaded DM-RS overlapping with the DM-RS overlap resource, and may not transmit the punctured overlap part of the front-loaded DM-RS. The wireless communication device may puncture the overlap part of the front-loaded DM-RS overlapping with the DM-RS overlap resource, and transmit additional DM-RSs without transmitting the punctured overlap part of the front-loaded DM-RS. A wireless communication device expecting to receive a DM-RS may receive a data channel based on an additional DM-RS instead of a punctured front-loaded DM-RS. Specifically, the wireless communication device expecting to receive a DM-RS may perform channel estimation based on the additional DM-RS and demodulate the data channel based on channel estimation. The base station may signal the time-frequency resource to which the additional DM-RS is mapped using the RRC signal or the L1 signaling. The user equipment may be signaled with a time-frequency resource mapped with the additional DM-RS from the base station through the RRC signal or the L1 signaling. In addition, the base station may transmit L1 signaling so that the user equipment can select one of the RRC configurations as a time-frequency resource to which the additional DM-RS is mapped. The user equipment may be instructed by the base station to select one of the RRC configurations through L1 signaling as a time-frequency resource to which the additional DM-RS is mapped.

When the DM-RS is not scheduled on at least one subcarrier due to the DM-RS overlap resource, the wireless communication device may determine whether the data channel may be received from the frequency resource based on a presence of a signal quasi-co-located with a punctured overlap part of the DM-RS in the frequency resource including the corresponding subcarrier. In this case, the signal quasi-co-located with the punctured overlap part of the DM-RS may be additional DM-RS. When a front-loaded DM-RS is not scheduled for a specific frequency resource due to a DM-RS overlap resource, the wireless communication device may determine whether the wireless communication device is capable of receiving a data channel on the frequency resource based on whether an additional DM-RS is included in the frequency resource. Specifically, even if a front-loaded DM-RS is not scheduled on a specific frequency resource, when the frequency resource includes an additional DM-RS, the wireless communication device may determines that the wireless communication device is capable of receiving a data channel from the corresponding frequency resource. When the front-loaded DM-RS is not scheduled and the corresponding frequency resource does not include additional DM-RS and there is no signal quasi-co-located with the port of the DM-RS in the corresponding frequency resource, the wireless communication device determines that the wireless communication device is not capable of receiving a data channel from the corresponding frequency resource. Also, when the wireless communication device determines that the wireless communication device is not capable of receiving the data channel from the frequency resource, when the wireless communication device receives a data channel, the wireless communication device may exclude the corresponding frequency resource from the scheduled data channel. Specifically, the wireless communication device may exclude the corresponding frequency resource from the data channel allocation resources indicated by the DCI that schedules the data channel. In this case, the wireless communication device may receive the data channel only through the PDSCH allocation resources not excluded. In one embodiment, the frequency resource may be a PRB where a DM-RS is not scheduled on a subcarrier due to a DM-RS overlap resource.

In these embodiments, the DM-RS may be an additional DM-RS as well as a front-loaded DM-RS.

In a specific embodiment, a wireless communication device expecting to receive a DM-RS may determine a presence of a signal quasi-co-located with the port of the punctured DM-RS based on signaling information. When a wireless communication device expecting to receive a DM-RS fails to receive scheduling information on a signal quasi-co-located with the port of the DM-RS, it may be determined that there is no signal quasi-co-located with the port of the punctured DM-RS. Also, a wireless communication device expecting to receive a DM-RS may determine whether an additional DM-RS is transmitted based on the signaling information. Specifically, when the wireless communication device expecting to receive a DM-RS fails to receive information on additional DM-RS scheduling, the wireless communication device expecting to receive the DM-RS may determine that no additional DM-RS is transmitted.

As described above, a wireless communication device expecting to receive a DM-RS may determine a presence of a DM-RS overlap resource based on at least one of an L1 signaling and an RRC signal. Specifically, a wireless communication device expecting to receive a DM-RS may determine a time-frequency resource mapped with a DM-RS overlap resource based on at least one of an L1 signaling and an RRC signal. In another specific embodiment, the time-frequency resource where the DM-RS overlap resource is scheduled may be predetermined. In this case, the wireless communication device expecting to receive a DM-RS may determine the time-frequency resource mapped with the DM-RS overlap resource without obtaining additional signaling information. Also, the wireless communication device expecting to receive a DM-RS may receive a DCI and may determine a time-frequency resource to which the PDSCH may be mapped based on information on time-frequency resource allocation included in the DCI. Therefore, the wireless communication device expecting to receive a DM-RS may determine the presence of the DM-RS overlap resource.

Also, in a specific embodiment, it may not correspond to a case where the wireless communication device expecting to receive a DM-RS is able to receive a data channel without receiving a punctured DM-RS overlap part according to the embodiment described with reference to FIGS. 29 and 30. In this case, the wireless communication device transmitting the DM-RS may transmit the DM-RS overlap part as in the embodiment described with reference to FIG. 22 to FIG. 28. Specifically, when there is no signal quasi-co-located with the port of the punctured DM-RS, the wireless communication device may transmit the DM-RS overlap part to a time-frequency resource different from the time-frequency resource mapped to DM-RS transmission. In addition, when the additional DM-RS is not transmitted, the wireless communication device may transmit the DM-RS overlap part to a time-frequency resource different from the time-frequency resource mapped to DM-RS transmission. In addition, when there is a signal quasi-co-located with the port of the punctured DM-RS, the wireless communication device expecting to receive a DM-RS may demodulate the data channel based on a signal quasi-co-located with the port of the DM-RS.

The specific operation in which the wireless communication device expecting to receive the DM-RS receives the data channel will be described with reference to FIG. 31 to FIG. 35.

Figure 31:
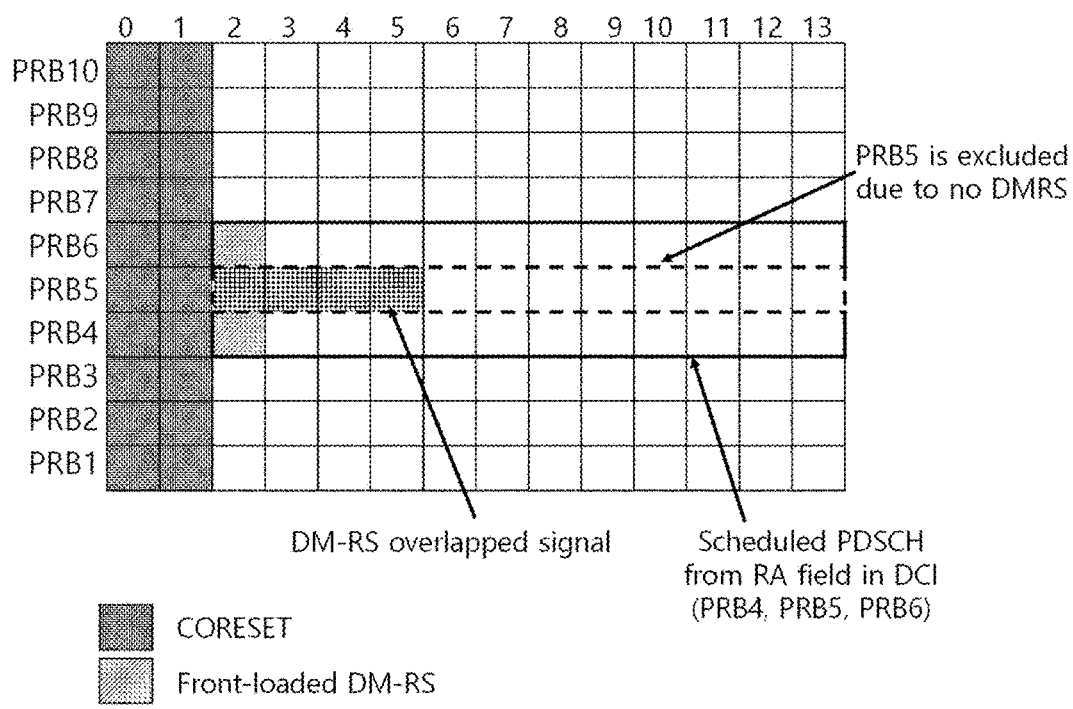
FIG. 31 shows an operation in which a user equipment according to an embodiment of the present invention receives a PDSCH in a slot in which a DM-RS overlap signal is scheduled.

FIG. 31 shows an operation in which a user equipment according to an embodiment of the present invention receives a PDSCH in a slot in which a DM-RS overlap signal is scheduled.

When the DM-RS is punctured due to a DM-RS overlap resource, the wireless communication device may not transmit the data channel to the PRB including the punctured DM-RS due to the DM-RS overlap resource. When a wireless communication device expecting to receive a DM-RS receives a data channel, the wireless communication device expecting to receive a DM-RS may assume that a data channel is not transmitted in a PRB that includes a punctured DM-RS due to a DM-RS overlap resource. In this case, as described above, the PRB may include 12 subcarriers and 14 OFDM symbols in one slot. Specifically, a wireless communication device expecting to receive a DM-RS may determine that the data channel is rate-matched to the remaining PRBs except for the PRB including the punctured DM-RS due to the DM-RS overlap resource among the PRBs where data channel transmission for the corresponding wireless communication device is scheduled. The wireless communication device expecting to receive a DM-RS may receive a data channel based on this determination.

In the embodiment of FIG. 31, the base station signals that the PDSCH is scheduled from the fourth PRB PRB 4 to the sixth PRB PRB 6 and a DM-RS overlap signal is transmitted through a part of the sixth PRB PRB 6 using the DCI. In this case, the base station punctures the front-loaded DM-RS in the sixth PRB PRB 6 and transmits the DM-RS overlap signal. Since the front-loaded DM-RS is punctured in the sixth PRB PRB 6, the user equipment receives the PDSCH from the base station with an assumption that the PDSCH is not transmitted through the sixth PRB PRB 6.

As described above, a wireless communication device expecting to receive a DM-RS may receive a data channel based on an additional DM-RS even when a front-loaded DM-RS is punctured. In this case, the operation of the wireless communication device expecting to receive the DM-RS will now be described with reference to FIG. 32.

Figure 32:
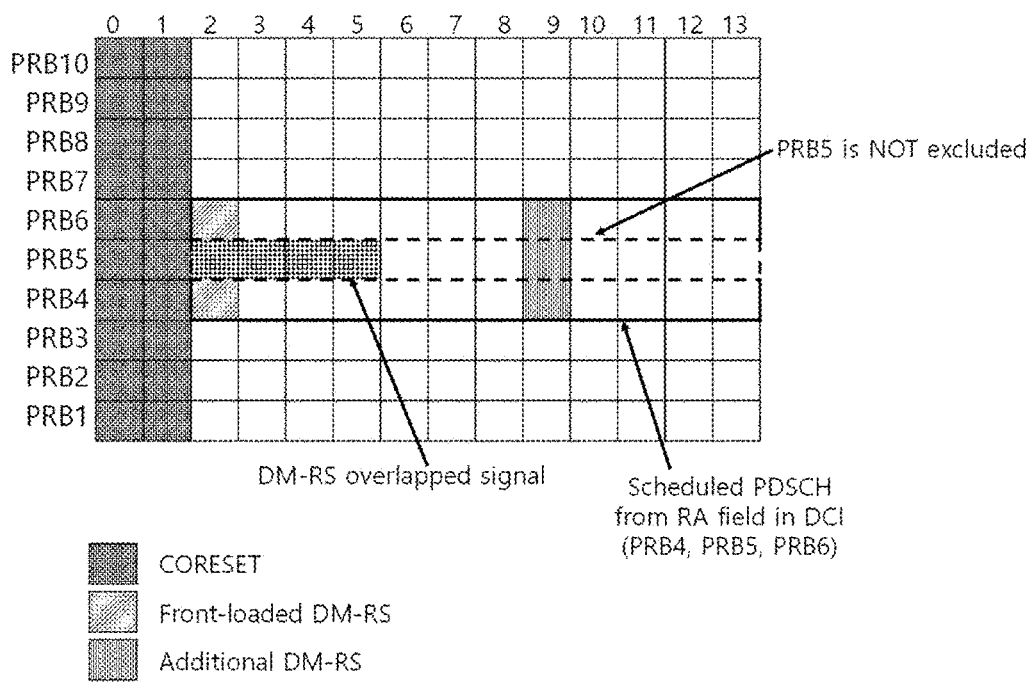
FIG. 32 shows an operation in which a user equipment according to an embodiment of the present invention receives a PDSCH based on an additional DM-RS in a slot in which a DM-RS overlap signal is scheduled.

FIG. 32 shows an operation in which a user equipment according to an embodiment of the present invention receives a PDSCH based on an additional DM-RS in a slot in which a DM-RS overlap signal is scheduled.

When a front-loaded DM-RS is punctured due to DM-RS overlap resources, a wireless communication device expecting to receive a DM-RS may demodulate the data channel based on the additional DM-RS. Also, even if the wireless communication device punctures a front-loaded DM-RS and transmits a DM-RS overlap signal, the wireless communication device may not transmit the overlap part of the punctured front-loaded DM-RS.

In the embodiment of FIG. 32, the base station signals that the PDSCH is scheduled from the fourth PRB PRB 4 to the sixth PRB PRB 6 and a DM-RS overlap signal is transmitted through a part of the fifth PRB PRB 5 using the DCI. In this case, the base station punctures the front-loaded DM-RS in the fifth PRB PRB 5 and transmits the DM-RS overlap signal. Further, the base station transmits the additional DM-RS to the fifth PRB PRB 5. Since the front-loaded DM-RS is punctured in the fifth PRB PRB 5 but the additional DM-RS is transmitted, the user equipment assumes that the PDSCH is transmitted through the fifth PRB PRB 5. The user equipment receives the PDSCH from the base station based on this assumption.

As described above, a wireless communication device expecting to receive a DM-RS may receive a data channel based on a signal quasi-co-located with the port of the punctured DM-RS. In this case, the operation of the wireless communication device expecting to receive the DM-RS will now be described with reference to FIG. 33.

Figure 33:
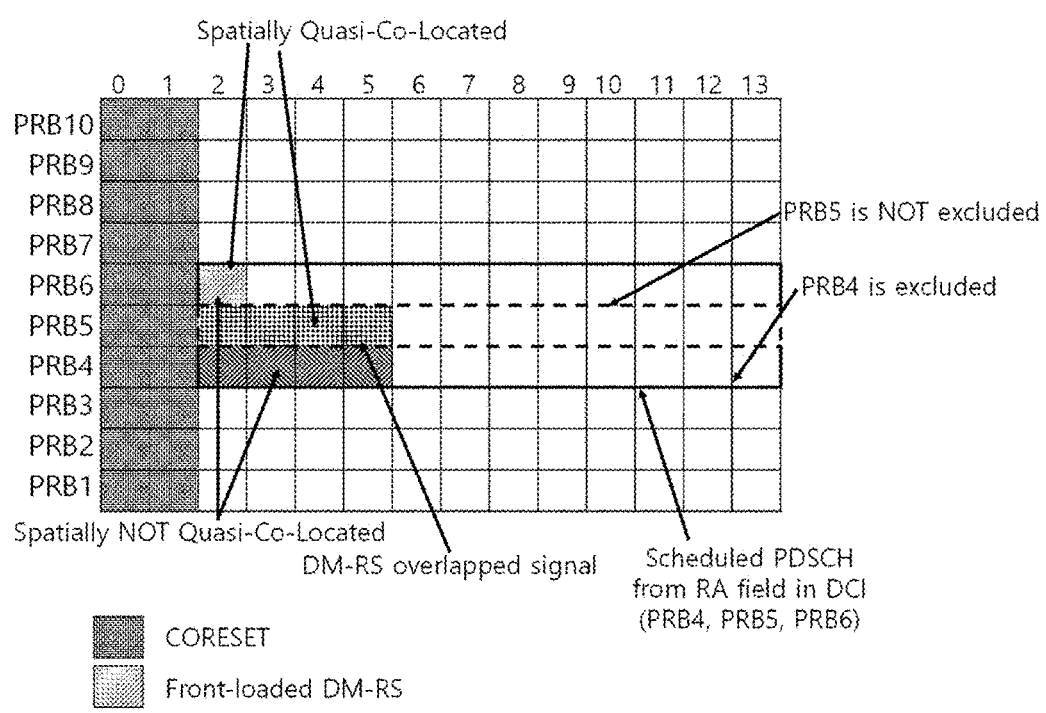
FIG. 33 shows an operation in which a user equipment according to another embodiment of the present invention receives a PDSCH in a slot in which a DM-RS overlap signal is scheduled.

FIG. 33 shows an operation in which a user equipment according to another embodiment of the present invention receives a PDSCH in a slot in which a DM-RS overlap signal is scheduled.

A wireless communication device expecting to receive a DM-RS may receive a data channel based on a signal quasi-co-located with the port of the punctured DM-RS. Specifically, when the DM-RS is punctured due to the DM-RS overlap resource, a wireless communication device expecting to receive a DM-RS may determine that the DM-RS overlap signal and the port of the punctured DM-RS are quasi-co-located. In another specific embodiment, when it is signaled that the DM-RS is punctured due to a DM-RS overlap resource and the port of the DM-RS and the DM-RS overlap signal are quasi-co-located, a wireless communication device expecting to receive a DM-RS may determine that the DM-RS overlap signal and the port of the punctured DM-RS are quasi-co-located. In this case, the wireless communication device expecting to receive a DM-RS may determine whether the DM-RS is punctured due to the DM-RS overlap resource and the port of the DM-RS and the DM-RS overlap signal are quasi-co-located based on at least one of transmission configuration information (TCI) of the DCI and RRC signal.

When the wireless communication device expecting to receive a DM-RS determines that the port of the punctured DM-RS and the DM-RS overlap signal are quasi-co-located, the wireless communication device expecting to receive a DM-RS may assume that a data channel is transmitted on a PRB where the DM-RS is punctured. The wireless communication device expecting to receive a DM-RS may receive a data channel based on this assumption. Specifically, when the wireless communication device expecting to receive a DM-RS determines that the port of the punctured DM-RS and the DM-RS overlap signal are quasi-co-located, the wireless communication device expecting to receive a DM-RS may demodulate a data channel based on the DM-RS overlap signal. Specifically, the wireless communication device expecting to receive a DM-RS may perform channel estimation based on the DM-RS overlap signal and demodulate the data channel based on channel estimation. When the wireless communication device expecting to receive a DM-RS does not determine that the port of the punctured DM-RS and the DM-RS overlap signal are quasi-co-located, the wireless communication device expecting to receive a DM-RS may assume that a data channel is not transmitted through a PRB where the DM-RS is punctured.

In the embodiment of FIG. 33, the base station signals that the PDSCH is scheduled to the fourth PRB PRB 4 to the sixth PRB PRB 6 and a DM-RS overlap signal is transmitted through a part of the fourth PRB PRB4 and the fifth PRB PRB 5 using the DCI. In this case, the base station punctures the front-loaded DM-RS in the fourth PRB PRB4 and the fifth PRB PRB 5 and transmits a DM-RS overlap signal. In this case, the DM-RS port of the PDSCH and the DM-RS overlap signal transmitted through the fifth PRB PRB 5 are quasi-co-located. In addition, the DM-RS port of the PDSCH and the DM-RS overlap signal transmitted through the fourth PRB PRB 4 are not quasi-co-located. Therefore, the base station rate-matches the PDSCH to the remaining time-frequency resources except for the time-frequency resource where the DM-RS overlap signal is mapped to the fifth PRB PRB 5. Also, the base station does not transmit the PDSCH through the fourth PRB PRB 4. Since the DM-RS port of the PDSCH and the DM-RS overlap transmitted through the fifth PRB PRB 5 are quasi-co-located, the user equipment assumes that the PDSCH is transmitted in the remaining time-frequency resources except for the time-frequency resource where the DM-RS overlap signal is mapped to the fifth PRB PRB 5. In addition, since the DM-RS port of the PDSCH and the DM-RS overlap signal transmitted through the fourth PRB PRB 4 are not quasi-co-located, the user equipment assumes that the PDSCH is not transmitted through the fourth PRB PRB 4. The user equipment receives the PDSCH from the base station based on this assumption.

In the embodiments described with reference to FIGS. 31 to 33, when the DM-RS is punctured due to a DM-RS overlap resource, the wireless communication device may transmit the data channel to the remaining time-frequency resources except for the time-frequency resource mapped to the DM-RS overlap signal in the PRB including the punctured DM-RS due to the DM-RS overlap resource. When a wireless communication device expecting to receive a DM-RS receives a data channel, the wireless communication device expecting to receive a DM-RS may assume that the data channel is transmitted in the remaining time-frequency resources except for the time-frequency resource mapped to the DM-RS overlap signal. Specifically, the wireless communication device expecting to receive a DM-RS may determine that the data channel is rate-matched in the remaining time-frequency resources except for the time-frequency resource to which the DM-RS overlap signal is mapped in the PRB including the punctured DM-RS due to DM-RS overlap resources. The wireless communication device expecting to receive a DM-RS may receive a data channel based on this determination. The wireless communication device expecting to receive a DM-RS may estimate a channel by interpolating the DM-RS of a PRB other than the PRB including the DM-RS punctured due to the DM-RS overlap resource. In this case, the wireless communication device expecting to receive a DM-RS may demodulate the scheduled data channel in the PRB including the DM-RS punctured due to the DM-RS overlap resource based on the estimated channel.

In the above-described embodiment, the base station may indicate by L1 signaling that the data channel is scheduled to the time-frequency resource overlapping with the DM-RS overlap resource. When a data channel is scheduled in a time-frequency resource overlapping with a time-frequency resource to which a DM-RS overlap resource is mapped, the DCI scheduling the data channel may include an indicator indicating whether the DM-RS is mapped to the time-frequency resource overlapping with the time-frequency resource to which the DM-RS overlap resource is mapped. In addition, when the data channel is scheduled in a time-frequency resource overlapping with a time-frequency resource to which a DM-RS overlap resource is mapped, the DCI scheduling the data channel may include an indicator indicating whether the data is mapped to a time-frequency resource overlapping with a time-frequency resource to which the DM-RS overlapped resource is mapped. In the above embodiments, the DCI that schedules the data channel may be a group-common DCI. The group-common DCI may refer to a DCI that a plurality of user equipments monitor with the common RNTI. In another specific embodiment, the user equipment may receive the PDSCH assuming that it can always be used even if there is a time-frequency resource overlapping with the DM-RS overlap resource without the help of L1 signaling.

Although the PDSCH is described with reference to FIGS. 31 to 33, the embodiments described with reference to FIGS. 31 to 33 may also be applied to the PUSCH transmission. In this case, the user equipment may transmit the PUSCH using CP-OFDM or DFT-s-OFDM. In a DFT-s-OFDM transmission, when the PUSCH transmission is limited to the continuity in the frequency axis, it may not be allowed for the DM-RS overlap signal to be transmitted instead of the DM-RS. In the DFT-s-OFDM transmission, if the PUSCH transmission is limited to the continuity in the frequency axis, the PUSCH is not transmitted and punctured in the OFDM symbol to which the DM-RS overlap signal is allocated. The user equipment may select a time-frequency resource mapped to the PRB(s) (or RE(s)) which are continuous and the most on the frequency axis in the time-frequency resources to which the PUSCH is allocated. In this case, the user equipment may transmit the PUSCH using the selected time-frequency resource. In addition, the DM-RS overlap resource as described above may be a PRACH block or a reserved resource.

In the embodiment described in FIGS. 31 to 33, when a DM-RS overlap signal is transmitted instead of the DM-RS, a method of excluding a PRB including a DM-RS overlap part in a scheduled PDSCH is described. When the PRB including the DM-RS overlap part is excluded from the scheduled PDSCH, the user equipment may determine the Transport Block Size (TBS) using the PRBs that are not excluded. More specifically, the user equipment may determine the TBS using the number of REs included in the PRBs not excluded, and the modulation method and the code rate indicated in the modulation and coding scheme (MCS) field of the DCI. In yet another embodiment, even if the PRB including the DM-RS overlap part is excluded from the scheduled PDSCH, the user equipment may determine the Transport Block Size (TBS) using the entirely scheduled PRB including the excluded PRBs. More specifically, even if the PRB including the DM-RS overlap part is excluded from the PDSCH, the user equipment may determine the TBS using the number of REs included in all the scheduled PRBs including the excluded PRBs, and the modulation method and the code rate indicated in the Modulation and coding scheme (MCS) field of the DCI.

As described above, the user equipment may determine the PRB to which the data channel is scheduled based on the DCI transmitted by the base station. This will be described with reference to FIGS. 34 to 35.

Figure 34:
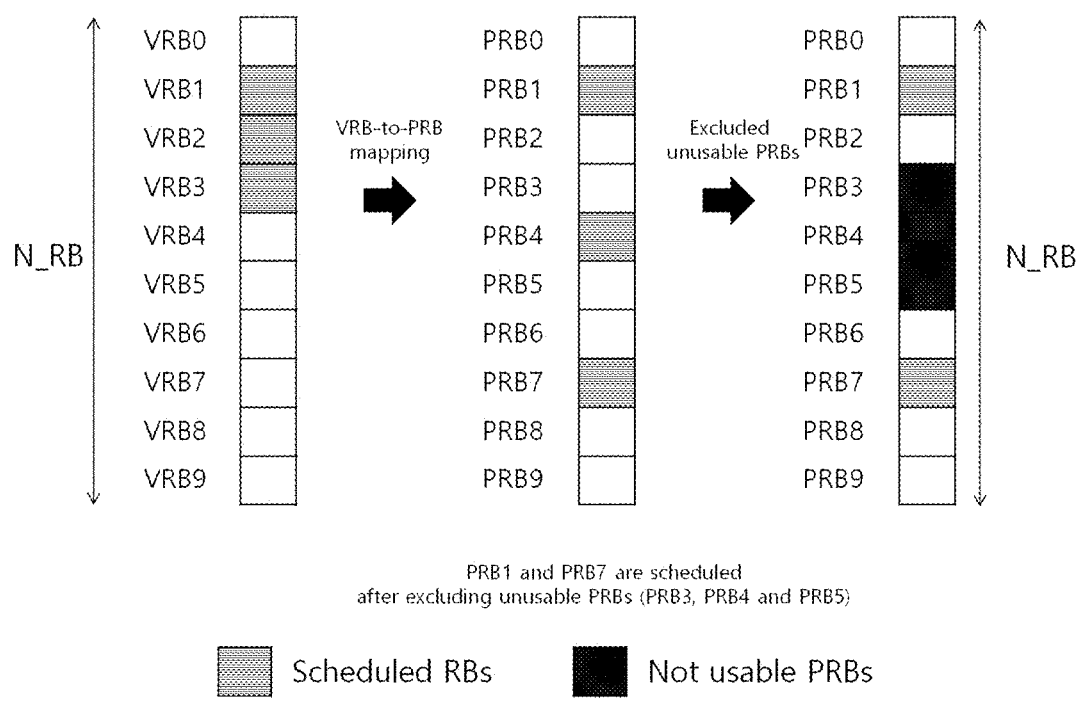
FIGS. 34 to 35 show a method of determining a PRB where a data channel is scheduled based on DCI by a user equipment according to an embodiment of the present invention.
Figure 35:
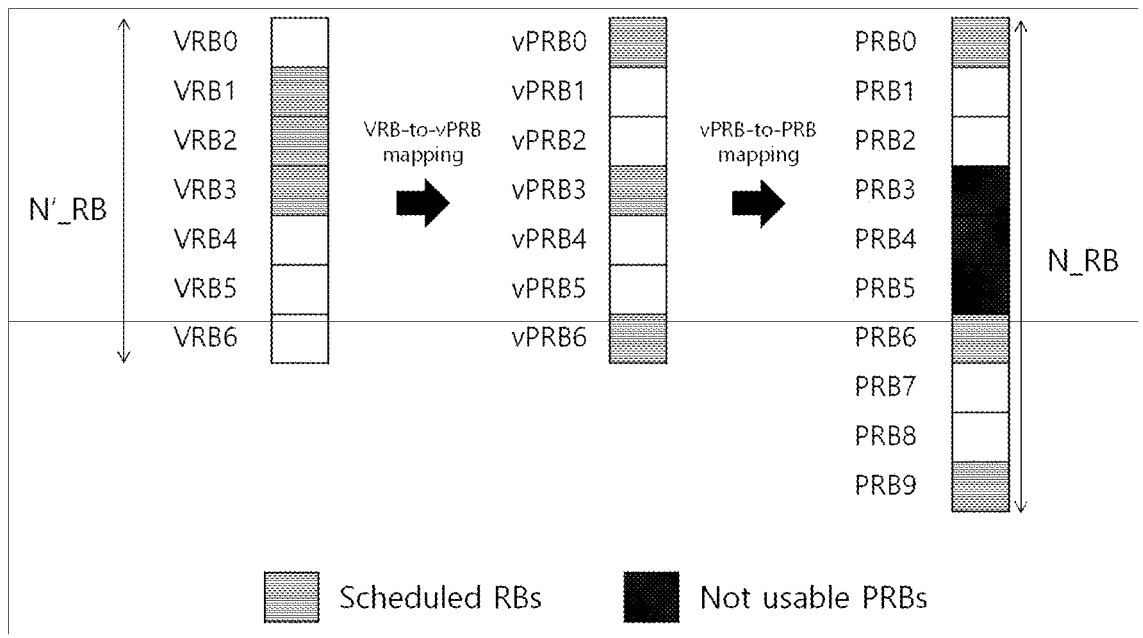

FIGS. 34 to 35 show a method of determining a PRB where a data channel is scheduled based on DCI by a user equipment according to an embodiment of the present invention.

When the base station instructs the user equipment to receive the PDSCH of the user equipment or to transmit the PUSCH of the user equipment using the DCI, the base station may indicate the PRB(s) allocated to the PDSCH reception of the UE or the PUSCH transmission of the UE using a resource indication value (RIV). The RIV may indicate the start index of the VRB (virtual RB) to which the PDSCH or PUSCH is mapped and the length of the VRB mapped to the PDSCH or PUSCH. The user equipment may determine the PRB(s) allocated to the PDSCH reception of the user equipment or the PUSCH transmission of the user equipment based on the RIV. In this case, a 1-bit VRB-to-PRB of the RIV may indicate a mapping relationship between VRB and PRB. When a 1-bit VRB-to-PRB indicates that the VRB is localized, the index of the VRB may be directly mapped to the PRB index. Therefore, the index RB_i of the VRB may be the same as the index PRB_j of the PRB. When a 1-bit VRB-to-PRB indicates localization, the PDSCH or PUSCH is continuous on the frequency axis. When a 1-bit VRB-to-PRB indicates distribution, the index of the VRB may be distributed through the interleaver and mapped to the PRB index. Therefore, the index PRB_j of the PRB may be an index obtained by distributing the index VRB_f (i) of the VRB using an interleaver. Here, f(i) represents an interleaver function applied to the VRB. When a 1-bit VRB-to-PRB indicates distribution, the PDSCH or PUSCH may be distributed non-contiguously on the frequency axis. When a 1-bit VRB-to-PRB indicates distribution, the user equipment and the base station may obtain a frequency diversity gain.

In order to obtain additional frequency diversity gain, the base station may additionally indicate frequency hopping. When the wireless communication device receives an indication for additional frequency hopping, the wireless communication device may divide the PDSCH or PUSCH into two parts on the time axis. In addition, the wireless communication device may allocate the first part to the first PRB group and allocate the second part to the second PRB group. The first PRB group may be a set of PRBs obtained through the VRB-to-PRB mapping, and the second PRB group may be a set of PRBs that move the PRB of the first PRB group by a specified offset. The index of the first PRB group and the index of the second PRB group may be expressed as the following equation.

$$b\_1=a\_1+\text{offset} \mod Z, b\_2=a\_2+\text{offset} \mod Z, \ldots, b\_K=a\_K+\text{offset} \mod Z$$

a_1, a_2, ..., a_K represents the index of the first PRB group. Also, b_1, b_2, ..., b_K represents the index of the second PRB group. Also, Z represents the number of RBs. mod represents the remaining operations. In this case, when the RIV indicates a PRB to be mapped to the PDSCH, the number of RBs may indicate the number of RBs included in the active DL BWP. For reference, the user equipment may receive an instruction for the index of the active DL BWP from the base station through the DCI scheduling PDSCH. When the RIV indicates a PRB to be mapped to the PUSCH, the number of RBs may indicate the number of RBs included in the active UL BWP. The user equipment can receive an instruction for the index of the active UL BWP from the base station through the DCI scheduling PUSCH. In addition, the offset represents the designated offset described above. The offset value may be configured by the RRC signal. In yet another specific embodiment, the offset value may be determined based on Z. For example, the value of the offset may be determined according to any one of the following two equations.

$$\text{Offset}=\text{floor}(Z/2)$$

$$\text{Offset}=\text{ceil}(Z/2)$$

floor(x) represents the largest integer less than or equal to x. ceil(x) represents the smallest integer number greater than or equal to x.

In yet another specific embodiment, the value of the offset may be determined to be an integer closest to Z/2 among multiples of P^2. In this case, P may be the size of a resource block group (RBG) that the base station indicates to the user equipment for each BWP. When a 1-bit VRB-to-PRB indicates distribution, the interleaver function applied to the VRB may be a block interleaver. In this case, when the number of columns is A, the number of rows may be ceil(N_RB/A/P)*P. N_RB represents the number of PRBs included in the BWP. P represents the size of the RBG that the base station indicates to the user equipment for each BWP as described above. In addition, the indexes of the VRBs may be written in the order of the rows, and may be read in the order of the columns. In this case, the number of columns may be 4. In addition, the number of rows may be configured by the RRC signal from the base station for each BWP. In addition, the number of rows may be determined according to the number of PRBs included in the BWP. Specifically, the number of columns may be determined according to the following equation.

$$A=B*\text{ceil}(N\_RB/N\_\text{ref})$$

N_ref is the number of PRBs to be referenced. B may be 4. The N_ref for the PDSCH may be determined according to the number of PRBs included in the initial active downlink frequency bandwidth. Also, the N_ref for the PUSCH may be determined according to the number of PRBs included in the initial active uplink frequency bandwidth.

When the user equipment determines a PRB where a data channel is scheduled based on DCI, the operation of the user equipment may vary according to the order of an operation of mapping the VRB and PRB according to the RIV and an operation of excluding the PRB where the data channel can not be transmitted due to the DM-RS overlap resource. The user equipment may decode the scheduling information on the data channel assuming that all PRBs can be used for PDSCH transmission. Specifically, the user equipment may obtain the scheduling information on the data channel by decoding the RIV transmitted from the DCI regardless of the number and location of PRBs where the data channel is not transmitted. Thereafter, the user equipment may determine that the data channel is scheduled to the remaining PRBs except for the PRB where the data channel can not be transmitted among the PRBs where the data channel indicated by the scheduling information is scheduled. The user equipment may receive the data channel based on the PRB where the determined data channel is scheduled. The user equipment may transmit the data channel based on the PRB where the determined data channel is scheduled. The number of VRBs and the number of PRBs may be the same. In addition, the mapping between the VRB and the PRB may follow the above-described embodiment.

In the embodiment of FIG. 34, the number of RBs included in the BWP is 10. The user equipment decodes the RIV. The RIV indicates the second VRB VRB1, the third VRP VRB2, and the fourth VRB VRB3, and the second VRB VRB1, the third VRP VRB2, and the fourth VRB VRB3 are mapped to the second PRB PRB1, the fifth PRB PRB4, and the eighth PRB PRB7, respectively. In this case, the fourth PRB PRB3, the fifth PRB PRB4, and the sixth PRB PRB5 can not be used for data channel transmission. Therefore, the user equipment may determine that the data channel is scheduled to the second PRB PRB1 and the eighth PRB PRB7 among the second PRB PRB1, the fifth PRB PRB4, and the eighth PRB PRB7, which are PRBs indicated by RIV. The user equipment may transmit the data channel according to this determination. Specifically, the user equipment may transmit the PUSCH according to the determination. Further, the user equipment may receive the data channel according to this determination. Specifically, the user equipment can receive the PDSCH according to the determination.

The user equipment may decode information on data channel scheduling in consideration of the PRB where the data channel can not be transmitted. Specifically, when the user equipment determines the PRB where the data channel is scheduled, the user equipment may map the VRB to the PRB based on the PRB where the data channel can not be transmitted. The number of VRBs may be different from the number of RBs in the active BWP. Therefore, the user equipment can map the VRB to the remaining PRBs except for the PRB where the data channel can not be transmitted. The user equipment can obtain the scheduling information of the data channel using the number of RBs $N'\_RB$ included in the active BWP other than the number of RBs ($N\_RB$) included in the BWP. The user equipment may use the interleaver to distribute the indexes of the VRBs corresponding to the number of RBs included in the active BWP, and to match the indexes of the PRBs with the distributed indexes. The number of RBs that the user equipment may use for PDSCH reception among the active DL BWPs or the number of RBs that the user equipment may use for PUSCH reception among the active UL BWPs is denoted by $N'\_RB$. The PRB index is denoted by $\{i1, i2, \ldots, i\_N'\_RB\}$ in ascending order. The user equipment may generate $N'\_RB$ VRBs and use the interleaver to obtain the VRB index as the vPRB index. In this case, the user equipment may obtain the vPRB index in correspondence to $N'\_RB$. The interleaving process may be the same as the interleaving method described above. The user equipment may map the vPRB index to the PRB index. The user equipment may map the k-th smallest vPRB index to the k-th smallest usable PRB index PRB i_k according to the ascending order. The user equipment may receive the data channel based on the obtained PRB index. The user equipment may transmit the data channel based on the obtained PRB index.

The base station may set frequency hopping for additional diversity gain. In this case, the base station may divide the data channel into two parts on the time axis. In addition, the base station may allocate the first part to the first vPRB group and the second part to the second vPRB group. The first PRB group may be a set of vPRBs obtained through the VRB-to-vPRB mapping, and the second vPRB group may be a set of vPRBs that move the vPRB of the first vPRB group by a specified offset. In this case, the offset value may be a value determined based on $N\_RB$ regardless of $N'\_RB$. Further, it may be the same as the value of the offset obtained according to the embodiments described with reference to FIG. 34. In another specific embodiment, depending on the number of PRBs where the PDSCH is not transmitted, user equipment may determine the number of rows and the offset of the interleaver used in the VRB-to-vPRB operation. The user equipment may determine the number of rows of the VRB-to-vPRB interleaver and the value of the offset based on the value of $N'\_RB$.

In the embodiment of FIG. 35, the number of RBs included in the BWP is 10. In this case, the fourth PRB PRB3, the fifth PRB PRB4, and the sixth PRB PRB5 can not be used for data channel transmission. Therefore, the user equipment decodes the RIV based on the fact that seven ($N'\_RB=7$) RBs can be used for data channel reception or data channel transmission. The RIV indicates the second VRB VRB1, the third VRB VRB2, and the fourth VRB VRB3, and the third VRB VRB1, the third VRB VRB2, and the fourth VRB VRB3 are mapped to the first vPRB vPRB0, the fourth vPRB vPRB3, and the seventh vPRB vPRB6, respectively. The user equipment may determine the PRB where the data channel is scheduled as the first vPRB vPRB0, the fourth vPRB vPRB3, and the seventh vPRB vPRB6. The user equipment may transmit the data channel according to this determination. Specifically, the user equipment may transmit the PUSCH according to the determination. Further, the user equipment may receive the data channel according to this determination. Specifically, the user equipment may receive the PDSCH according to the determination.

Figure 36:
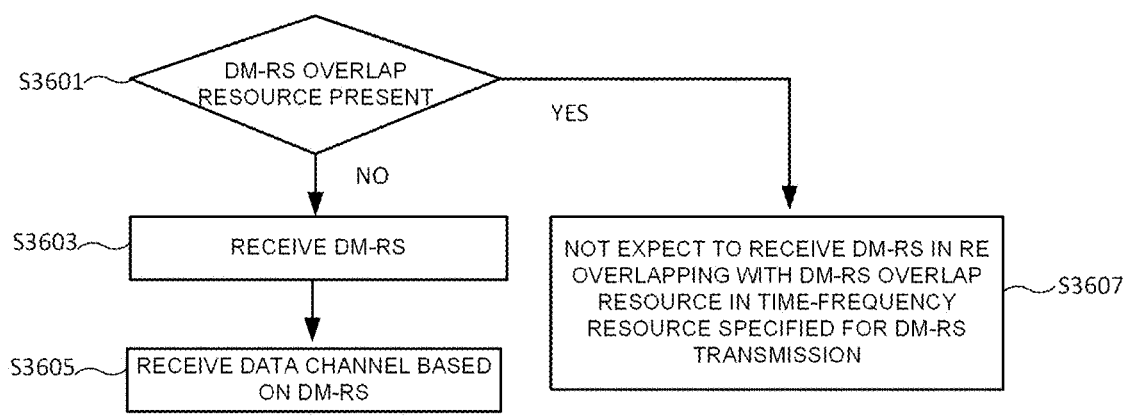
FIG. 36 shows the operation of a wireless communication device according to an embodiment of the present invention.

FIG. 36 is a flowchart showing an operation of a wireless communication device according to an embodiment of the present invention.

When the time-frequency resource mapped to transmission of the DM-RS of the data channel does not overlap with the time-frequency resource mapped to the different purpose from the transmission of the DM-RS (S3601), the wireless communication device receives the DM-RS in the time-frequency resource mapped to transmission of the DM-RS (S3603), and receives the data channel based on the DM-RS (S3605).

When the time-frequency resource mapped to transmission of the DM-RS of the data channel overlaps with the time-frequency resource mapped to the different purpose from the transmission of the DM-RS (S3601), it is not expected to receive the DM-RS in a RE that overlaps with a time-frequency resource mapped to the different purpose in the time-frequency resources mapped to the DM-RS transmission (S3603).

In this case, the time-frequency resource mapped to the different purpose from the DM-RS transmission may be the DM-RS overlap resource described above. In addition, the DM-RS overlap resource may be a resource for URLLC transmission as described above. In addition, the DM-RS overlap resource may be an SS/PBCH block. In addition, the DM-RS overlap resource may be a resource that is emptied without transmission. Specifically, it may be a reserved resource reserved for future services and purposes. Also, it may be a reserve resource reserved to prevent the data channel from being mapped to the user equipment for CORESET transmission. In addition, the DM-RS overlap resource may be a PRACH block.

In addition, when the time-frequency resource mapped to transmission of the DM-RS of the data channel overlaps with the time-frequency resource mapped to the different purpose from the transmission of the DM-RS, the wireless communication device may not expect to receive the DM-RS in the RE corresponding to the same OFDM symbol index as the OFDM symbol index of the RE overlapping with the time-frequency resource mapped to the different purpose among the time-frequency resources mapped to the DM-RS transmission. Specifically, the wireless communication device may operate as in the embodiments described with reference to FIG. 25.

When the time-frequency resource mapped to transmission of the DM-RS of the data channel overlaps with the time-frequency resource mapped to the different purpose from the transmission of the DM-RS, the wireless communication device may monitor a punctured DM-RS that is not transmitted due to a time-frequency resource mapped to the different purpose in a resource located behind a time-frequency resource mapped to the different purpose. Specifically, the wireless communication device may monitor a punctured DM-RS in an OFDM symbol immediately behind a time-frequency resource mapped to the different purpose. In a specific embodiment, the wireless communication device may operate as in the embodiments described with reference to FIGS. 24 to 28.

The DM-RS may be the first DM-RS of the data channel. The first DM-RS of the data channel may represent the front-loaded DM-RS described above. Also, the DM-RS may be an additional DM-RS. When the DM-RS overlapping with the time-frequency resource mapped to the different purpose is a front-loaded DM-RS, the wireless communication device may determine whether to monitor the punctured DM-RS in a resource transmitted after the transmission of the time-frequency resource mapped to the different purpose based on the presence of additional DM-RSs in the data channel. Specifically, if there is an additional DM-RS of the data channel, the wireless communication device may not monitor the front-loaded DM-RS in the resource transmitted after the transmission of the time-frequency resource mapped to the different purpose. In this case, the wireless communication device may receive the data channel based on the additional DM-RS.

In addition, the wireless communication device may determine whether to monitor the punctured DM-RS in a resource transmitted after the transmission of the time-frequency resource mapped to the different purpose based on the presence of a signal quasi-co-localized with the port of the M-RS. When there is a signal quasi-co-located with the port of the DM-RS, the wireless communication device may not monitor the punctured DM-RS in a resource that is transmitted after the transmission of the time-frequency resource mapped to the different purpose. In this case, the wireless communication device may receive the data channel based on the signal quasi-co-located with the port of the DM-RS.

As described above, the punctured DM-RS is a DM-RS mapped to the RE corresponding to the same OFDM symbol index as the OFDM symbol index of the RE overlapping with a time-frequency resource mapped to the different purpose among the time-frequency resources mapped to DM-RS transmission. In another specific embodiment, the punctured DM-RS is a DM-RS mapped to the RE overlapping with the time-frequency resources mapped to DM-RS transmission among the time-frequency resources mapped to DM-RS transmission.

The wireless communication device may determine that the DM-RS overlap signal transmitted through the time-frequency resource mapped to the different purpose is quasi-co-located with the port of the DM-RS. In this case, the wireless communication device may receive the data channel based on the DM-RS overlap signal. Specifically, the wireless communication device may estimate the state of the channel through which the data channel is transmitted based on the DM-RS overlap signal. In addition, the wireless communication device may demodulate the data channel based on the estimated channel state. In a specific embodiment, the wireless communication device may estimate at least one of a delay spread, a Doppler spread, a Doppler shift, an average gain, and an average delay of a channel through which a data channel is transmitted based on the DM-RS overlap signal. Specifically, the wireless communication device may operate as in the embodiment described with reference to FIGS. 29 to 33.

Also, the data channel may be either a PDSCH or a PUSCH.

The above-mentioned description of the present invention is for illustrative purposes only, and it will be understood that those of ordinary skill in the art to which the present invention belongs may make changes to the present invention without altering the technical ideas or essential characteristics of the present invention and the invention may be easily modified in other specific forms. Therefore, the embodiments described above are illustrative and are not restricted in all aspects. For example, each component described as a single entity may be distributed and implemented, and likewise, components described as being distributed may also be implemented in an associated fashion.

The scope of the present invention is defined by the appended claims rather than the above detailed description, and all changes or modifications derived from the meaning and range of the appended claims and equivalents thereof are to be interpreted as being included within the scope of present invention.

The invention claimed is:

1. A user equipment configured to operate in a wireless communication system, the user equipment comprising:
a processor configured to:
when a time-frequency resource predetermined for a transmission of a demodulation reference signal (DM-RS) of a data channel does not overlap with a time-frequency resource allocated for a transmission from a base station of the wireless communication system, other than the transmission of the DM-RS, receive the DM-RS in the time-frequency resource predetermined for the transmission of the DM-RS of the data channel,
when the time-frequency resource predetermined for the transmission of the DM-RS of the data channel overlaps with the time-frequency resource allocated for the transmission from the base station of the wireless communication system, other than the transmission of the DM-RS, receive the DM-RS in an orthogonal frequency division multiplexing (OFDM) symbol that is located immediately after the time-frequency resource allocated for the transmission from the base station of the wireless communication system, other than the transmission of the DM-RS, and
receive the data channel based on the received DM-RS of the data channel,
wherein the DM-RS is a reference signal specific to the user equipment,
wherein the DM-RS is a front loaded DM-RS of the data channel, and
wherein the data channel is a physical downlink shared channel (PDSCH).

2. The user equipment of claim 1, wherein, when the time-frequency resource predetermined for the transmission of the DM-RS of the data channel overlaps with the time-frequency resource allocated for the transmission from the base station of the wireless communication system, other than the transmission of the DM-RS, the processor is configured to determine whether to receive the DM-RS in a resource element (RE) located after the time-frequency resource allocated for the transmission from the base station of the wireless communication system, other than the transmission of the DM-RS, based on whether an additional DM-RS of the data channel is present.

3. The user equipment of claim 1, wherein when the time-frequency resource predetermined for the transmission of the DM-RS of the data channel overlaps with the time-frequency resource allocated for the transmission, from the base station of the wireless communication system, other than the transmission of the DM-RS, the processor is configured to determine whether to receive the DM-RS based on whether a signal quasi-co-located with a port of the DM-RS is present.

4. The user equipment of claim 3, wherein the processor is configured to determine that a signal transmitted through the time-frequency resource allocated for the transmission from the base station of the wireless communication system, other than the transmission of the DM-RS, is quasi-co-located with the port of the DM-RS, and receive the data channel based on the signal.

5. The user equipment of claim 4, wherein the processor is configured to estimate a state of a channel through which the data channel is transmitted based on the signal transmitted through the time-frequency resource allocated for the transmission from the base station of the wireless communication system, other than the transmission of the DM-RS, and demodulate the data channel based on the state of the channel.

6. The user equipment of claim 5, wherein the processor is configured to estimate at least one of a delay spread, a Doppler spread, a Doppler shift, an average gain, and an average delay of a channel through which the data channel is transmitted, based on the signal transmitted through the time-frequency resource allocated for the transmission, from the base station of the wireless communication system, other than the transmission of the DM-RS.

7. The user equipment of claim 1, wherein the time-frequency resource allocated for the transmission from the base station of the wireless communication system, other than the transmission of the DM-RS, is a resource emptied without transmission.

8. The user equipment of claim 1, wherein the time-frequency resource allocated for the transmission, from the base station of the wireless communication system, other than the transmission of the DM-RS, is a synchronization signal/physical broadcast channel (SS/PBCH) block,
wherein the SS/PBCH block comprises a synchronization signal and information on the wireless communication system.

9. A method of operating a user equipment of a wireless communication system, the method comprising:
when a time-frequency resource predetermined for a transmission of a demodulation reference signal (DM-RS) of a data channel does not overlap with a time-frequency resource allocated for a transmission from a base station of the wireless communication system, other than the transmission of the DM-RS, receiving the DM-RS of the data channel in the time-frequency resource predetermined for the transmission of the DM-RS of the data channel,
when the time-frequency resource predetermined for the transmission of the DM-RS of the data channel overlaps with the time-frequency resource allocated for the transmission from the base station of the wireless communication system, other than the transmission of the DM-RS, receiving the DM-RS in an orthogonal frequency division multiplexing (OFDM) symbol that is located immediately after the time-frequency resource allocated for the transmission from the base station of the wireless communication system, other than the transmission of the DM-RS, and
receiving the data channel based on the received DM-RS of the data channel,
wherein the DM-RS is a reference signal specific to the user equipment,
wherein the DM-RS is a front loaded DM-RS of the data channel, and
wherein the data channel is a physical downlink shared channel (PDSCH).

10. The method of claim 9, wherein the receiving the DM-RS comprises determining whether to receive the DM-RS, based on whether an additional DM-RS of the data channel is present.

11. The method of claim 9, wherein the time-frequency resource allocated for the transmission from the base station of the wireless communication system, other than the transmission of the DM-RS, is a resource emptied without transmission.

12. The method of claim 9, wherein the time-frequency resource allocated for the transmission from the base station of the wireless communication system, other than the transmission of the DM-RS, is a synchronization signal/physical broadcast channel (SS/PBCH) block,
wherein the SS/PBCH block comprises a synchronization signal and information on the wireless communication system.

* * * * *